United States Patent [19]
Edelman

[11] Patent Number: 6,064,986
[45] Date of Patent: *May 16, 2000

[54] COMPUTER ASSISTED AND/OR IMPLEMENTED PROCESS AND ARCHITECTURE FOR CUSTOMER ACCOUNT CREATION, MAINTENANCE AND ADMINISTRATION FOR AN INVESTMENT AND/OR RETIREMENT PROGRAM

[75] Inventor: Fredric M. Edelman, Great Falls, Va.

[73] Assignee: Edelman Financial Services, Inc., Fairfax, Va.

[ * ] Notice: This patent is subject to a terminal disclaimer.

[21] Appl. No.: 09/233,169

[22] Filed: Jan. 19, 1999

Related U.S. Application Data

[63] Continuation-in-part of application No. 08/936,020, Sep. 23, 1997.

[51] Int. Cl.[7] .................................................. G06F 19/00
[52] U.S. Cl. .................. 705/36; 705/35; 705/37; 705/40
[58] Field of Search ................. 705/35, 36, 40, 705/37

[56] References Cited

U.S. PATENT DOCUMENTS

| | | | |
|---|---|---|---|
| 4,346,442 | 8/1982 | Musmanno | 705/36 |
| 4,376,978 | 3/1983 | Musmanno | 705/36 |
| 4,722,055 | 1/1988 | Roberts | 705/36 |
| 4,752,877 | 6/1988 | Roberts et al. | 705/35 |
| 4,953,085 | 8/1990 | Atkins | 705/36 |
| 5,214,579 | 5/1993 | Wolfberg et al. | 705/36 |
| 5,644,727 | 7/1997 | Atkins | 705/40 |
| 5,689,649 | 11/1997 | Altman et al. | 705/36 |
| 5,775,734 | 7/1998 | George, Jr. | 283/57 |
| 5,787,404 | 7/1998 | Fernandez-Holmann | 705/35 |
| 5,802,500 | 9/1998 | Ryan et al. | 705/36 |
| 5,809,484 | 9/1998 | Mottola et al. | 705/38 |
| 5,839,118 | 11/1998 | Ryan et al. | 705/36 |
| 5,852,811 | 12/1998 | Atkins | 705/36 |
| 5,864,685 | 1/1999 | Hagan | 705/35 |
| 5,875,437 | 2/1999 | Atkins | 705/40 |

OTHER PUBLICATIONS

Edelman, Ric. "The Truth About Money" 1996. No Mo.
Edelman, Ric. "The New Rules of Money" 1998. No Mo.

*Primary Examiner*—Allen R. MacDonald
*Assistant Examiner*—Jagdish Patel
*Attorney, Agent, or Firm*—Irah H. Dunner; Pepper Hamilton LLP

[57] ABSTRACT

A computer program product, system or process administer or assist in the administration of resources of a customer for the benefit of a beneficiary. The process includes receiving a request from the customer to administer the resources in accordance with predetermined criteria, and storing customer related data associated with the customer. A network of service providers is formed to assist in the administration of the resources for the customer and provide a variety of economic and/or administrative features and benefits, using a computer.

19 Claims, 28 Drawing Sheets

$100,000 INVESTED AT 10% FOR 10 YEARS IN A RISING TAX RATE ENVIRONMENT

| Year | Tax Rate | Value of Taxable Account | After-Tax Yield | Value of Tax-Deferred Account | After-Tax Yield |
|---|---|---|---|---|---|
| 1 | 30% | 107,000 | 7.0% | 110,000 | 10% |
| 2 | 30% | 114,490 | 7.0% | 121,000 | 10% |
| 3 | 35% | 121,931 | 6.5% | 133,100 | 10% |
| 4 | 40% | 129,246 | 6.0% | 146,410 | 10% |
| 5 | 45% | 136,354 | 5.5% | 161,051 | 10% |
| 6 | 50% | 143,171 | 5.0% | 177,156 | 10% |
| 7 | 50% | 150,330 | 5.0% | 194,817 | 10% |
| 8 | 50% | 157,846 | 5.0% | 214,353 | 10% |
| 9 | 50% | 165,739 | 5.0% | 235,794 | 10% |
| 10 | 50% | 174,026 | 5.0% | 259,374 | 10% |

IF YOU WITHDRAW A LUMP SUM:

Net Value of Taxable Fund $174,026

Gross Value of Tax Deferred Fund $259,374
Original Principal $100,000
Taxable Profit $159,374
Less 50% Tax ($79,687)
Net Value of Tax - Deferred Fund $179,687

IF YOU TAKE A 10% INCOME STREAM:

Net Value $174,026
Income x 10%
17,400
Less 50% Tax (8,701)
Net Annual Income $8,701

Net Value $259,374
Income x 10%
25,937
Less 50% Tax (12,968)
Net Annual Income $12,968

FIG. 9

| HYPOTHETICAL INTEREST RATE | IF TAX-DEFERRED | VALUE OF TAX-DEFERRED ACCOUNT AFTER TAXES ARE PAID | IF TAXED EACH YEAR |
| --- | --- | --- | --- |
| 8% | $743,899 | $446,295 | $107,417 |
| 10% | $2,451,854 | $1,532,260 | $226,205 |
| 12% | $7,909,362 | $4,774,235 | $472,355 |

FIG. 18

IF YOU WANT AN OLDER CHILD TO ACCUMULATE THE SAME AMOUNT AS A YOUNGER CHILD, THIS TABLE SHOWS THE PROPER MULTIPLE. USE IT IN THE WORKSHEET BELOW.

| AGE DIFFERENCE (IN YEARS) | 1 | 2 | 3 | 4 | 5 | 6 | 7 | 8 | 9 | 10 |
|---|---|---|---|---|---|---|---|---|---|---|
| MULTIPLE | 1.1 | 1.2 | 1.3 | 1.5 | 1.6 | 1.8 | 1.9 | 2.1 | 2.4 | 2.6 |
| AGE DIFFERENCE (IN YEARS) | 11 | 12 | 13 | 14 | 15 | 16 | 17 | 18 | 19 | 20 |
| MULTIPLE | 2.9 | 3.1 | 3.5 | 3.8 | 4.2 | 4.6 | 5.1 | 5.6 | 6.1 | 6.7 |
| AGE DIFFERENCE (IN YEARS) | 21 | 22 | 23 | 24 | 25 | 26 | 27 | 28 | 29 | 30 |
| MULTIPLE | 7.4 | 8.1 | 9.0 | 9.8 | 10.8 | 11.9 | 13.1 | 14.4 | 15.9 | 17.4 |

THE INVESTMENT MULTIPLES IN THIS TABLE PRESUME A 10% ANNUAL COMPOUND RATE OF RETURN AND ARE BASED ON THE NUMBER OF YEARS IT TAKES A CHILD OF A GIVEN AGE TO REACH AGE 65, COMPOUNDED ON A TAX-DEFERRED BASIS WITHOUT ASSUMING ANY CHARGES OR FEES THAT MIGHT BE APPLICABLE; SUCH CHARGES OR FEES WOULD REDUCE THE RETURN. THE INVESTMENT MULTIPLE AND THE INTEREST RATE BEHIND THIS TABLE ARE FOR ILLUSTRATIVE PURPOSES ONLY AND DO NOT REFLECT THE ACTUAL INVESTMENT IN OR PERFORMANCE OF ANY PARTICULAR INVESTMENT. INVESTMENT RESULTS FLUCTUATE AND CAN DECREASE AS WELL AS INCREASE. FIGURES DO NOT TAKE INTO CONSIDERATION TIME VALUE OF MONEY OR ANY FLUCTUATION IN PRINCIPAL.

*USE THIS EASY WORKSHEET TO DETERMINE HOW MUCH TO CONTRIBUTE TO EACH CHILD'S RIC-E TRUST™*

1. ENTER AMOUNT YOU PLAN TO CONTRIBUTE TO YOUNGEST CHILD _____

2. FROM THE TABLE ABOVE, ENTER THE MULTIPLE FOR THE OLDEST CHILD X_____

3. MULTIPLY TOGETHER LINES ONE AND TWO. _____

LINE 3 SHOWS WHAT YOU SHOULD CONTRIBUTE FOR THE OLDER CHILD, IF YOU WANT THE OLDER CHILD TO ACCUMULATE BY RETIREMENT AN AMOUNT SIMILAR TO THE YOUNGEST CHILD.

WORKSHEET EXAMPLE
MIKE AND SUSAN WANT TO ESTABLISH TRUSTS FOR STEVEN (AGE 4) AND GAIL (10). THEY PLAN TO CONTRIBUTE $7,500 TO STEVEN'S TRUST. SINCE GAIL IS 6 YEARS OLDER THAN STEVEN, THE WORKSHEET AT LEFT SHOWS MIKE AND SUSAN HOW MUCH TO CONTRIBUTE TO GAIL'S TRUST IF THEY WANT HER TO ACCUMULATE AS MUCH AS STEVE.

$7,500 THIS IS THE AMOUNT THEY PLAN TO CONTRIBUTE FOR THE YOUNGEST CHILD, STEVEN.

X 1.8 SINCE GAIL IS 6 YEARS OLDER THAN STEVEN, THIS MULTIPLE IS TAKEN FROM THE TABLE ABOVE.

$13,500 THIS IS THE AMOUNT THEY SHOULD CONTRIBUTE FOR THE OLDER CHILD, GAIL.

FIG. 19

COMPUTER ASSISTED AND/OR IMPLEMENTED PROCESS AND ARCHITECTURE FOR CUSTOMER ACCOUNT CREATION, MAINTENANCE AND ADMINISTRATION FOR AN INVESTMENT AND/OR RETIREMENT PROGRAM

BACKGROUND OF THE INVENTION

This application is a continuation-in-part of U.S. patent application Ser. No. 08/936,020, filed Sep. 23, 1997 (112765-100), the details of which are hereby incorporated by reference.

FIELD OF THE INVENTION

The present invention generally relates to a computer assisted and/or implemented process and architecture for customer account creation, maintenance and administration for an investment and/or retirement program, and more particularly, to a computer assisted and/or implemented process and architecture for customer account creation, maintenance and administration for an investment and/or retirement program, using a service provider network providing various streamlined, efficiently organized or administered and/or discounted services in support thereof.

The present invention also relates to a computer assisted and/or implemented process and architecture for administering an investment and/or retirement program, and more particularly, to a computer assisted and/or implemented process and architecture for administering an investment and/or retirement program to maximize the investment and investment performance, and to minimize government obligations (e.g., taxes) associated therewith.

BACKGROUND OF THE RELATED ART

Retirees generally have three primary sources of income: pensions, savings they have accumulated in their company retirement plans, and Social Security.

Pensions are technically called defined benefit plans. Through them, an employer promises to give a retiree a specific monthly income (or in some cases, a lump-sum check in lieu of a monthly income) starting at retirement. The amount a retiree receives is calculated by a formula that considers salary, the number of years having worked for the company, and other factors. The formula may be different at every company.

Most workers entitled to a pension at retirement are offered several options regarding how to collect the benefit. The two most common options are single life annuity (which gives a monthly income for life, but which stops upon death) and joint and survivor annuity (which provides a smaller monthly income but which continues as long as either the applicant or applicant's spouse is alive).

All retirement plans—whether individual or company-sponsored—offer two major benefits:

No payment of taxes on any of the money that is contributed to the plan until withdrawals begin, and Any interest, dividends, or capital gains that accumulate in the plan are tax-deferred until withdrawal.

An IRA is the most common type of retirement plan. These are maintained individually rather than in groups. With any retirement plan, the applicant knows how much money is being placed into the plan, but has no idea how much the plan will be worth when you retire. Thus, retirement plans are technically known as defined contribution plans, and they are the exact opposite of defined benefit plans, where the result is known but the amount that needs to be contributed is not.

Like all retirement plans, including those established by companies for their employees, the applicant does not pay taxes on any of the money that is contributed to the IRA until the applicant begins making withdrawals, and any interest, dividends, or capital gains that accumulate in the plan also are tax-deferred until withdrawal.

Company retirement plans generally involve either a Simplified Employee Pension Plan or the 401(k) plan.

If the applicant has any self-employment income, from baby-sitting to shooting wedding videos, the applicant may qualify for a Simplified Employee Pension Plan, known as a SEP-IRA. SEPs are as easy to use as IRAs and almost identical as well. But they offer one major advantage over IRAs: instead of being limited currently to a $2,000 annual deductible contribution, the applicant can put away 15% of self-employment income, currently up to $22,500. The applicant is permitted to do this even if the applicant or the applicant's spouse participate in another pension or retirement plan.

SEPs involve minimal disclosure and reporting requirements. The applicant can contribute different amounts from year to year, and the applicant can currently wait until April 15 to contribute for the previous year (or later if an extension is filed). Other plans must be established by December 31.

Although the law says the applicant can place up to 15% of net taxable income into a SEP-IRA, the correct figure is really 13.04%. The reason is as follows: Say the net taxable income (that is profit minus expenses) is $10,000. Fifteen percent would be $1,500, which would usually be placed into a SEP-IRA. But that would reduce the net taxable income to $8,500—and $1,500 of $8,500 is 17.65%—meaning there has been contributed too much to the SEP, leading to major headaches with the IRS. Thus, the correct amount that would be permitted to place into a SEP would be $1,304, which is only 13.04% of $10,000.

The 401(k) plan—so-named by the tax code section that created it—is offered by more companies that any other type of retirement plan. There are generally four contribution methods for 401(k) plans.

Method #1: The Employer's Basic Contribution

This contribution usually is a percentage of payroll. For example, Ken, 45, makes $40,000 a year and his company contributes 1% of his pay to the 401(k) plan every year. Although the money is Ken's, he is not taxed on it, and the money grows tax-deferred inside the plan.

Method #2: The Employee's Voluntary Contribution

Depending on where a person works, the taxpayer may be permitted to contribute up to 15% of pay. For example, Ken is allowed to invest up to 5% of his paycheck into the 401(k) plan. He gets a tax deduction for the amount he contributes, and like the employer's contribution above, this money grows tax-deferred.

Method #3: The Employer's Matching Contributions

Through this method, the company contributes a percentage of what the employee contributes. For example, Ken's company adds 25 cents to the plan for every dollar that Ken puts in himself. This increases Ken's stake by 25%, yet he is not taxed on this money, and it too grows tax-deferred until he retires.

Method #4: The Employer's Profit-Sharing Contribution

This is an additional contribution that the company voluntarily makes each year based on the firm's profits. For example, Ken's company typically gives Ken a bonus equal to 3% of his pay, which is deposited into the plan on Ken's behalf. Like the other contributions, this one too is not taxed and it grows tax-deferred.

Thus, of the four ways money goes into a 401(k), only one comes from the employee—making these plans a great deal for workers! All told, Ken contributes $2,000 of his own pay to the 401(k), a contribution that costs him only $1,340 because the contribution entitles Ken to a tax deduction that saves him $660 in taxes. On top of that, Ken's employer adds another $2,100—$400 in basic, $500 in matching and $1200 in profit-sharing contributions—and all of it is in pre-tax dollars which grow tax-deferred. Thus, for every dollar Ken contributes to his 401(k), his employer contributes $1.05. Put another way, for a $1,340 investment, Ken's account is worth $4,100—and that's before his account earns a penny from interest, dividends, or capital gains!

Another primary source of retirement income is Social Security. Under current law, the maximum Social Security benefit for a worker and spouse is $22,464 per year. Therefore, even if Social Security continues as is, it alone is not likely to provide a comfortable retirement.

The current age to be eligible for full Social Security benefits is currently 65. But that is only for workers nearing retirement. For younger workers, Congress already has cut back the benefits. For example, those born after 1959 are not eligible for full Social Security benefits until age 67. (They can start receiving benefits at 62, but they will get 30% less than if they wait until 67, not 20% less like those retiring today.)

Even though Social Security, pensions and retirement plans are available to many workers, they are not enough to satisfy retirement income needs. Yet many workers who are covered by these programs often have terrible personal savings records. Many are in for a shock when they discover at retirement that their retirement income is a fraction of their pre-retirement pay.

For example, workers earning $50,000 a year who plan to retire with nothing but a pension and Social Security can expect their income to drop 36% the day they retire. That's right: they will get pensions worth only 44% of pre-retirement pay and Social Security will provide only another 20%. FIG. 1 is an illustration of a typical retirement benefit when the final pay is $50,000. Could one afford a 36% pay cut right now? If not, what makes one think they will be able to afford such a large cut at retirement?

The retirement situation is even worse for higher-paid workers. If final pay is $150,000, pensions and Social Security together will replace only 36% of the income. A whopping 61% of income will be lost at retirement! FIG. 2 is an illustration of a typical retirement benefit when the final pay is $150,000. If one thinks that this is not a problem because earnings are not anywhere near $100,000, think again: if income with spouse is jointly earned at $50,000today, a mere 4% annual pay increase over the next 20 years will place income about $100,000, as illustrated in FIG. 3. So, as important as it is to participate in a company retirement plan, more still needs to be saved.

As discussed above, the above retirement programs are generally insufficient to adequately fund or support an individual after retirement, and supplemental investment vehicles or programs are required to cover these additional costs.

For example, one significant cost that is generally not covered by retirement programs is the cost of college for children that enter college after their parents have retired. The cost of college is so significant, that different types of investment programs have emerged to fund the cost of college. These investment programs are designed to fund the cost of college based on long term savings.

For example, U.S. Pat. No. 4,722,055 to Roberts, incorporated herein by reference, relates to methods and apparatus for funding a future liability by means of an insurance investment program. The system estimates the expected cost of the liability when the liability is expected to occur and computes the present value of each unit of insurance needed to yield that expected cost at maturity. The system also aids the insurance fund manager in making decisions regarding investment of fund assets in order to meet present and future obligations of the fund.

FIG. 4 is a flowchart of the computer process for funding a future liability in the Roberts patent. In FIG. 4, the customer transaction operations performed at the point-of-sale stations include blocks 11–14. Customer transactions can be purchases, payouts, or redemptions of fund units. Unit purchase data is entered at block 11, unit payout data is entered at block 12, and unit redemption data is entered at block 13. Each entry includes the customer's name and account number and the transaction amount. The entered transaction data is stored at block 14 for transmission to the central processing facility.

The transaction data accumulated at the point-of-sale stations is transmitted periodically (e.g., daily) to the central processing facility. The data for each incoming transaction is processed individually in a loop beginning with block 15 and ending at block 25 where all transactions in a batch (e.g., a day) are totaled prior to further processing as a group in accordance with block 26 et seq. The incoming transaction data is first subjected to test 15 which determines whether the transaction is a purchase (NO output) or a redemption (YES output).

If the transaction is a purchase, the system flow passes to test 21 which determines if the purchase is the first transaction in a new account or an additional transaction in an existing account. For new accounts the system flow passes to block 22 which creates a new entry in the account list based on the transaction data. Transaction data for both new and existing accounts then passes to block 23 which checks the transaction data for possible errors in calculation at the point-of-sale station.

If the transaction is a payout or a withdrawal, data flow moves from test 15 to block 16 where the transaction data is verified to confirm that it is from a valid account. The account information necessary to verify the transaction data is supplied from the account list stored in the system's master file, shown at block 17. Thereafter, the data flow passes to test 18, which determines whether the transaction is a payout (withdrawal at maturity) or a redemption (withdrawal before maturity). Payout transaction data passes to verification block 23. For redemption transactions, the redemption before maturity penalty (RBMP) must be calculated. This is accomplished at block 19.

The RBMP calculation is based on the current value of an insurance unit which is a function of the present college cost data. The college cost data is supplied from one of the system's data files shown at block 20. From the RBMP calculation, system flow for redemption transactions also passes to verification block 23 which checks for possible errors made at the point-of-sale station.

From verification block 23, system flow passes to block 24, where each transaction is recorded in the system's master file, and the customer account list data is updated. Thereafter, system flow passes to block 25, where purchase, payout, and redemption transactions are totaled. Next, system flow passes to block 26, where the current spread calculation is carried out to create an updated schedule of the current charge to customers for insurance units based on the prevailing college cost and inflation rate data. The updated schedule of current charges is transmitted to the point-of-sale stations. There, the schedule is used by the salesmen to provide cost information to customers and to set the cost for unit purchases, unit payouts, and unit redemptions.

System flow then proceeds to block 27 which carries out the update asset position operation to determine what investment transactions should be made in the fund investment portfolio based on current and projected customer transactions. The data processing system advises the fund manager of its determination concerning the net amount of required investment transactions and provides a list of the investments which might be suitable for purchase or sale. Based on this information, the manager can choose the investment transactions to be made and enter the investment transaction data into the system.

After the investment transaction data is entered, system flow passes to block 28, where a report is created for the investment manager which details the changes made during the period, including the transaction totals for the period, the fund assets purchased and sold, the projection of the cash flow requirements for customer transactions, the projection of the cash flow generated from the fund assets, etc. Next, system flow passes to block 29, where the system periodically (e.g., annually) prepares a tax liability statement for each customer and for the fund manager. Also, at block 30, the system prepares another periodic report (e.g., quarterly) to provide the customer with current account information.

Another prior method, U.S. Pat. No. 4,752,877 to Roberts et al., incorporated herein by reference, is an insurance investment plan that is implemented using a floating rate zero coupon note for funding a future liability. FIGS. 5–7 are flowcharts illustrating the computer process for funding a future liability using a floating rate zero coupon note. In FIGS. 5–7, at the beginning of each period certain variables used in the data processing system must be initialized (block 101). These variables include: the number of transactions during the day (TDAY), the number of transactions during the period (TPERIOD), the number of contracts sold during the day (DSALES), the number sold during the period (PSALES), the number redeemed during the day (DRDMP), the number redeemed during the period (PRDMP), the number of floating rate zero coupon notes of each maturity M (FRZCN(M)), and the number of each maturity sold during the day (DSFRZCN(M)), sold during the period (PSFRZCN(M)), redeemed during the day (DRFRZCN (M)), and redeemed during the period (PRFRZCN(M)).

Customers interact with the system at point-of-sale stations. These can be located at remote points limited only by the ability to communicate electronically with the central computer. Orders and customer inquiries are collected at the point-of-sale stations (block 102). The customer first enters his name (NAME) and account number (NUMBER), or if he does not have an account, indicates that a new account is to be opened. The customer then enters an order or inquiry (referred to generically at block 102 as DATA). A customer may submit a purchase order (block 103) or a redemption order (block 104) or may simply inquire as to the status of his or her account (block 105). Transaction requests include an identification of the floating rate zero coupon note to be purchased or redeemed and the transaction amount (referred to generically at blocks 103 and 104 as CONTRACT). Inquiries specify the particular information items requested. These orders are transmitted to the central computer, and information regarding transactions, floating rate zero coupon note prices, and account status are received back from the central computer and displayed on a CRT terminal (block 106). Alternatively, purchase orders and redemption orders could be stored at block 106 and transmitted periodically (e.g., daily) to the central computer for processing. At the conclusion of each transaction, a customer can request a printed confirmation record of the transaction (block 107).

Each customer request is processed individually in a loop beginning with test 108 and ending at block 125. The incoming request is first subjected to test 108. If the dollar amount of the transaction (AMOUNT) is equal to zero, the request is an inquiry, which is referred to blocks 109–111 for processing. The status of the account is checked at block 109. Information the customer requested is retrieved from the master account file at block 110 and the response is transmitted to the investor in block 111. The requested information is displayed on the CRT terminal.

If AMOUNT is not equal to 0, the customer request passes to test 112. If AMOUNT is less than 0, the request is a redemption request, and the system flow passes to block 113. At block 113 the account information is verified by checking the master account file at block 114 to make sure that the account is valid and that it contains the floating rate zero coupon notes the customer wishes to sell. When the account information has been verified, data flow moves to test 115 where it is determined whether or not the customer is requesting early withdrawal—i.e., redemption prior to the scheduled maturity date of the floating rate zero coupon note. If so, the early withdrawal penalties are first calculated at block 116. Otherwise control passes directly to block 117 where the redemption value for each of the floating rate zero coupon notes the account holder wishes to redeem is calculated.

The calculation of the redemption value for a floating rate zero coupon note is based on the periodic escalation rates in the cost of the service or commodity giving rise to the liability being funded—e.g., college tuition-over the life of the floating rate zero coupon note and involves a downward adjustment for any early withdrawal penalties. The current value of the floating rate zero coupon note is calculated by escalating the base value of the floating rate zero coupon note at the rates of escalation in the cost of college between the date of purchase and the date of redemption and adding the unamortized premium or subtracting the unaccredited discount, as appropriate. These escalation rates are taken from the master file of escalation rates in U.S. college costs at block 118. After the redemption value has been calculated, the amount of cash that will have to be paid to the account holder is subtracted from the amount of cash in the system at block 119. Control then passes to block 123.

If instead AMOUNT is greater than 0, the request is either a purchase request or an installment payment relating to an earlier purchase. In that case, control passes from test 112 to test 120, which determines whether the request pertains to a new account. If so, a new account is opened at block 121. Otherwise control passes to block 122 where the amount of the cash payment is added to the amount of cash in the system.

Transaction data for both redemptions and purchases then pass to block 123 which checks the transaction data for possible errors in calculation at the point-of-sale station. From verification block 123, system flow passes to block 124 where each transaction is recorded in the system's master account file and master transaction file. Thereafter, system flow passes to block 125, where the floating rate zero coupon note liability schedule is updated to reflect purchases or redemptions.

Next, system flow passes to test 126, which determines whether all the transactions for the particular day in question have been processed. If not, system flow passes back to the beginning of the loop to receive the next customer request. If it is the end of the day and all transactions for the day have been processed, control passes to block 127, which prepares the next day's schedule of floating rate zero coupon note prices.

System flow then proceeds to block 128, which carries out the update asset portfolio operation to determine the updated investment portfolio based on current and projected customer transactions, the aggregate maturity schedule for the floating rate zero coupon notes, the amount of cash available for investment, projected interest rates, the current composition of the asset portfolio, and the portfolio investment criteria supplied by the fund manager.

After the investment transaction data are entered, system flow passes to block 129 where a daily transaction report is prepared for the investment manager. This report summarizes the transactions that took place during the day; provides the end-of-day asset and liability position; furnishes the portfolio yield, investment yield, and composite cost of the floating rate zero coupon note liabilities, all on a semi-annual-equivalent-yield basis; and indicates the projected income flows from the updated asset portfolio and the projected stream of floating rate zero coupon note liabilities. Then at block 130 the variables that measure each day's activity are reinitialized for the beginning of the next day.

Next system flow passes to test 131 where it is determined whether the day in question is the last day of the current period. If not, system flow passes to block 138. If it is the last day of the period, system flow passes to block 132 where the end-of-period investment performance report is prepared. This report provides various measures of investment performance which the fund manager can use to monitor the profitability of the investment program adopted during the period. In addition, it is calculated in block 132 whether the fund is overfunded or underfunded and the amount of any overfunding or underfunding. A significant underfunding would signal to the fund manager the need to find higher yielding investments in the asset portfolio in order to avoid the danger of failing at some point to have sufficient cash to meet maturing floating rate zero coupon note liabilities.

Next system flow passes to block 133 where the system periodically (e.g., quarterly) calculates for each account holder the amount of investment income and the amount of taxable income earned during the period on the floating rate zero coupon notes in his or her account. At block 134 the system prepares end-of-period reports for mailing to account holders. System flow then passes to block 135 where the end-of-period financial statements are prepared drawing on information that has been recorded in the accounting files at block 136 during the period. System flow then moves to block 137 where the variables that measure each period's activity are reinitialized for the beginning of the next period.

Next system flow passes to block 138 where at the end of each day the daily transaction summary and summary of current position are transmitted to the fund manager and at the end of each period the investment performance and position report and the end-of-period financial statements are transmitted to the fund manager.

Thus, both the Roberts and Roberts et al. patents are related to a specific procedure for estimating the expected cost of the liability when the liability is expected to occur, and computing the present value of each unit of insurance needed to yield that expected cost at maturity. However, these patents do not solve the problem of administering and/or managing a program that attempts to optimize or maximize retirement and/or investment resources.

In addition, the Roberts and Roberts et al. patents do not solve the problem of implementing a program designed specifically for managing and/or administering retirement and/or investment resources. Further, the Roberts and Roberts et al. patents do not solve the problem of ensuring that the retirement and/or investment resources are not prematurely diverted, thereby compromising or jeopardizing the administration of retirement and/or investment resources.

The Roberts and Roberts et al. patents also do not solve the problem of tracking the performance of the retirement and/or investment resources, while also managing reports on the performance of the retirement and/or investment resources, in a distributed data base environment. The Roberts and Roberts et al. patents also do not solve the problem of tracking the performance of resources, while also managing reports on the performance of the resources, in a distributed computing environment, such as over the internet and/or intranet and/or private networks.

In addition, the Roberts and Roberts et al. patents do not employ a network of service providers to reduce costs for the customer. The Roberts and Roberts et al. patents further do not address the process of opening a customer account in an efficient and practical manner to facilitate the customer account opening process. The Roberts and Roberts et al. patents also do not address the process of managing and/or administering a customer account for administration of retirement and/or investment resources in a manner that efficiently and practically facilitates the customer account management and/or administration process therefor. The Roberts and Roberts et al. patents also do not address the process of, opening, managing and/or administering a customer account for administration of retirement and/or investment resources in conjunction with a network of service providers, thus reducing costs and optimizing or maximizing retirement and/or investment resources while attempting to minimize administration costs.

Accordingly, it is desirable to administer and/or manage a program that attempts to optimize or maximize retirement and/or investment resources. It is also desirable to implement a program designed specifically for managing and/or administering retirement and/or investment resources. It is also desirable to ensure that the retirement and/or investment resources are not prematurely diverted, thereby compromising or jeopardizing the administration of retirement and/or investment resources.

It is further desirable to track the performance of the retirement and/or investment resources, while also managing reports on the performance of the retirement and/or investment resources, in a distributed data base environment. It is also desirable to track the performance of resources, while also managing reports on the performance of the resources, in a distributed computing environment, such as over the internet and/or intranet and/or private networks. It is also desirable to include a network of service providers to reduce costs and optimize or maximize retirement and/or investment resources for the customer.

It is also desirable to provide a process of opening a customer account in an efficient and practical manner to facilitate the customer account opening process. It is further desirable to provide a process of managing and/or administering a customer account for administration of retirement and/or investment resources in a manner that efficiently and practically facilitates the customer account management and/or administration process therefor.

It is also desirable to provide a process of, opening, managing and/or administering a customer account for administration of retirement and/or investment resources in conjunction with a predetermined configuration of network of service providers, thus reducing costs and optimizing or maximizing retirement and/or investment resources while attempting to minimize administration costs.

SUMMARY OF THE INVENTION

It is a feature and advantage of the present invention to administer and/or manage a program that attempts to optimize or maximize retirement and/or investment resources.

It is another feature and advantage of the present invention to implement a program designed specifically for managing and/or administering retirement and/or investment resources.

It is another feature and advantage of the present invention to ensure that the retirement and/or investment resources are not prematurely diverted, thereby compromising or jeopardizing the administration of retirement and/or investment resources.

It is another feature and advantage of the present invention to track the performance of the retirement and/or investment resources, while also managing reports on the performance of the retirement and/or investment resources, in a distributed data base environment.

It is another feature and advantage of the present invention to track the performance of resources, while also managing reports on the performance of the resources, in a distributed computing environment, such as over the internet and/or intranet and/or private networks.

It is another feature and advantage of the present invention to employ a network of service providers, thus reducing costs and optimizing or maximizing retirement and/or investment resources.

It is another feature and advantage of the present invention in providing a process of opening a customer account in an efficient and practical manner to facilitate the customer account opening process.

It is another feature and advantage of the present invention in providing a process of managing and/or administering a customer account for administration of retirement and/or investment resources in a manner that efficiently and practically facilitates the customer account management and/or administration process therefor.

It is another feature and advantage of the present invention in providing a process of, opening, managing and/or administering a customer account for administration of retirement and/or investment resources in conjunction with a predetermined configuration of network of service providers, thus reducing costs and optimizing or maximizing retirement and/or investment resources while attempting to minimize administration costs.

The present invention is based, in part, on my discovery that an efficient and uncomplicated administration system may be constructed or produced that effectively manages, administers and/or generates reports for retirement and/or investment resources. I have further discovered that an efficient and uncomplicated administration system may be produced that effectively manages or administers investment resources to maximize same.

I have further discovered that an efficient and uncomplicated administration system may be provided that effectively manages or administers investment resources and prevents such resources from being prematurely diverted. Thus, the administration system provides superior, exceptional or optimal usage of the resources, providing unexpected benefits to the program beneficiary or recipient. The administration system also provides unexpected performance to the program administrator. In order to accomplish the above, I have discovered that unexpected benefits may be achieved when combining the feature, structure and/or procedural framework of an annuity with the feature, structure and/or procedural framework of a trust.

That is, I have discovered that a combination trust and annuity will permit the resources in the annuity to be tax deferred and maintained until the beneficiary is at a suitable age or condition for distribution, for example, retirement, disability and the like. As is described below in detail, tax deferred resources grow much more quickly than non-tax deferred resources. However, I have realized that when investment accounts are provided for beneficiaries, beneficiaries will generally terminate prematurely, or request distributions that compromise the effectiveness of the retirement resources for the beneficiary. In order to prevent early or undesirable distributions, I have determined that a trustee may be charged to administer the trust on the request of the customer, using the computer system to administer same. Accordingly, the trustee prevents undesirable withdrawal of resources so that the resources may grow tax-deferred for a substantial length of time.

In addition, I have discovered that retirement and/or investment resources can be maximized when service providers (e.g., trustees, financial advisors, and attorneys) are encouraged to enroll in a network, and customers are substantially simultaneously encouraged to use service providers that are enrolled in the network.

In accordance with the computer administered and/or assisted program, $5,000, for example, may be invested for a new born beneficiary in the computer administered program. The beneficiary may be restricted from receiving distributions, for example, until retirement age of 65. The future value of $5,000 65 years later, if the proceeds are allowed to be reinvested on a tax deferred basis, is an incredible $2–8 Million dollars! This is an incredible amount of resources that may then be withdrawn from for the beneficiary's retirement. Accordingly, the computer administered or assisted program provides unexpected benefits to the beneficiaries thereunder.

To achieve these and other objects, the present invention provides a computer program product that stores computer instructions thereon for instructing a computer to perform a process of administering or assisting in the administration of resources of a customer for the benefit of a beneficiary. The program product includes a recording medium readable by the computer, and computer instructions stored thereon instructing the computer to perform the process. The instructions and the process include receiving a request from the customer to administer the resources in accordance with predetermined criteria, and storing customer related data associated with the customer. The instructions and process also include determining a predetermined period of time based on an age of the beneficiary at which withdrawals do not incur a tax penalty, and administering the resources in an annuity investment growing tax deferred in accordance with withdrawal criteria, and preventing withdrawal of the resources responsive to the withdrawal criteria.

In accordance with another embodiment of the invention, a computer program product stores computer instructions thereon for instructing a computer to perform a process of administering or assisting in the administration of resources of a customer for the benefit of a beneficiary. The program product includes a recording medium readable by the computer, and computer instructions stored thereon instructing the computer to perform the process. The instructions and the process include receiving, by the user, a request from the customer to administer the resources in accordance with predetermined criteria, and storing, by the computer, customer related data associated with the customer. The instructions and the process also include receiving or acknowledging, by the user with the assistance of the computer, receipt of the resources from the customer, entering the resources into the computer for administration, and appointing, by the user or the administrator, a trustee to administer and manage the resources. The instructions and the process also include determining, by the user or the computer, a predetermined period of time based on an age of the beneficiary at which withdrawals do not incur a tax penalty, and administering, by the trustee with the assistance of the computer, the resources in an annuity investment growing tax deferred for the predetermined period of time or until occurrence of a predetermined event. The predetermined event enables withdrawals without incurring tax penalty. The instructions and the process also include tracking performance of the resources, and transmitting, by the trustee or administrator with the assistance of the computer, details of the administration of the resources to at least one of the beneficiary and the customer. The instructions and the process also include requesting, by the beneficiary, to the trustee or administrator to withdraw the resources, and determining, by the trustee or the administrator with the assistance of the computer, whether an initial period of time has expired. The instructions and the process also include rejecting, by the administrator or the trustee with the assistance of the computer, the request of the beneficiary when the initial period of time has expired and when the predetermined period of time has not expired and when the predetermined event has not occurred. The instructions and the process also include transmitting, by the administrator or the trustee with the assistance of the computer, the resources to the beneficiary when the initial period of time has not expired, and transmitting, by the administrator or the trustee with the assistance of the computer, the resources in accordance with the predetermined criteria to the beneficiary when the initial period of time has expired and when the predetermined period of time has expired or when the predetermined event has occurred.

In accordance with another embodiment of the invention, a computer program product stores computer structures thereon for instructing a computer to perform a process of administering of assisting in the administration of resources of a customer for the benefit of a beneficiary. The program product includes a reporting medium readable by the computer, and computer instructions stored thereon instructing the computer to perform the process. The instructions and process include establishing, by the user, a network of approved attorneys who enroll in the network by paying an enrollment fee. The instructions and process may also optionally include employing and/or establishing, by the user, a network of trustees and/or financial advisors.

The instructions and process also include optionally receiving, by the user, a request from the customer to administer the resources in accordance with predetermined criteria. The instructions and process also include optionally sending, by the user to a customer, an application form. The instructions and process also include optionally sending, by the user, the application, the resources, and an administration fee to the user. The instructions and process also include the option of selecting, by the customer, an attorney, or referring, by the user, an attorney to a customer. The instructions and process also include optionally preparing, by the attorney, a trust agreement.

The instructions and process also include optionally selecting, by the user, an investment advisor and a trustee. If the customer does not select a trustee, an investment advisor or trustee, the user may refer an investment advisor or trustee that is employed by the user or enrolled in the network to the customer. The instructions and process also include optionally receiving or acknowledging, by the user with the assistance of the computer, receipt of the resources from the customer, and entering the resources into the computer for administration.

The instructions and the process also include optionally holding the resources in escrow until the attorney provides notification that the trust agreement is in place. The instructions and process also include determining, by the user or the computer, a predetermined period of time based on an age of the beneficiary at which withdrawals do not incur a tax penalty, and administering, by the trustee with the assistance of the computer, the resources in an annuity investment growing tax deferred for the predetermined period of time or until occurrence of a predetermined event. The predetermined event enables withdrawals without incurring substantial or any tax penalty.

The instructions and the process also include optionally tracking performance of the resources, and transmitting, by the trustee or administrator with the assistance of the computer, details of the administration of the resources to at least one of the beneficiary and the customer. The instructions and the process also include optionally requesting, by the beneficiary, the trustee or administrator to withdraw the resources, and determining, by the trustee or the administrator with the assistance of the computer, whether an initial period of time has expired.

The instructions and the process also include optionally rejecting, by the administrator or the trustee with the assistance of the computer, the request of the beneficiary when the initial period of time has expired and when the predetermined period of time has not expired and when the predetermined event has not occurred. The instructions and the process also include optionally transmitting, by the administrator or the trustee with the assistance of the computer, the resources to the beneficiary when the initial period of time has not expired, and optionally transmitting, by the administrator or the trustee with the assistance of the computer, the resources in accordance with the predetermined criteria to the beneficiary when the initial period of time has expired and when the predetermined period of time has expired or when the predetermined event has occurred.

In accordance with another embodiment of the invention, a computer implemented process instructs, administers or assists in a program for the administration of resources of a customer for the benefit of a beneficiary. The process includes one of the sequential, non-sequential and sequence independent steps of establishing, by a first company, a network of a plurality of approved providers; submitting, by at least one of the approved providers to the first company, an application and an optional fee to join the network of approved providers; and providing, by the first company to at least one of the approved providers, a specimen trust agreement. The process also includes the steps of delivering, by the first company, an information kit concerning the program, an application for the program, and information regarding a second company administering an annuity contract to a potential customer; and delivering, by the potential customer to the first company, the application, an initial investment, and an optional fee for the first company. The process also includes the steps of forwarding the application to at least one approved provider to initiate the administering or the assisting in the administration of the resources of the potential customer for the benefit of the beneficiary, and preparing the investment and trust applications when the second company and the third company and the fourth company are used by the potential customer. The process further includes the steps of transmitting a copy of the trust application executed by the potential customer, transmitting a copy of the investment application, executed by the potential customer, and any additional authorizations, and instructing the first company to proceed with the investment of the resources as directed by the potential customer. The process further includes the step of forwarding, by the first company, the executed trust and investment applications, the application and the specimen trust agreement to at least one approved provider, with instructions to open a customer account for the potential customer.

A computer system and process is also provided.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

The above objects of the invention, together with other apparent objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

FIG. 9 is an illustration that shows that deferral of taxes is still the winner even if tax rates rise over time;

FIG. 18 is an illustration of how the value of an investment in a taxable account may compare to a tax-deferred investment;

FIG. 19 is a worksheet and chart that illustrate a method of determining how much money to contribute to a trust;

The same reference numerals refer to the same parts through the various figures.

NOTATIONS AND NOMENCLATURE

Figure 2:
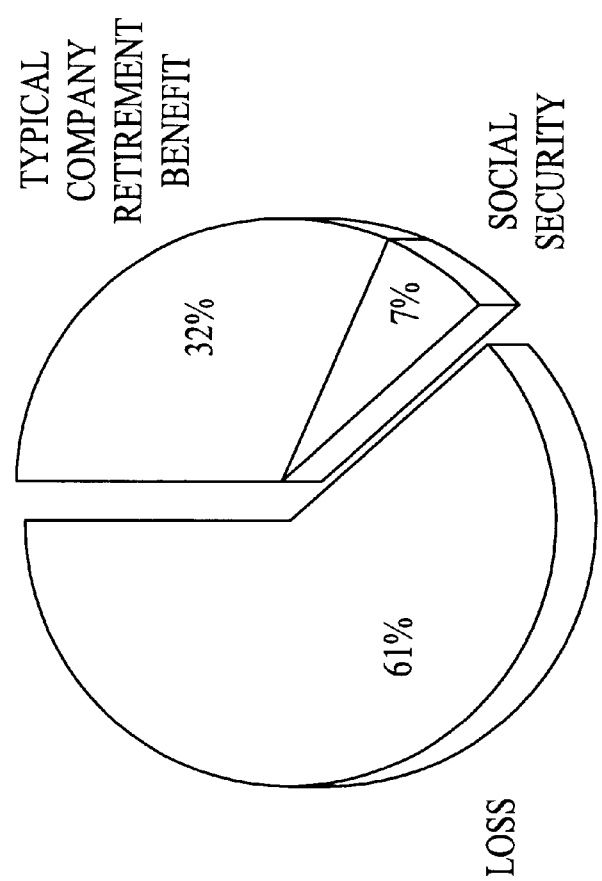
FIG. 2 is an illustration of a typical retirement benefit when the final pay is $150,000.
Figure 1:
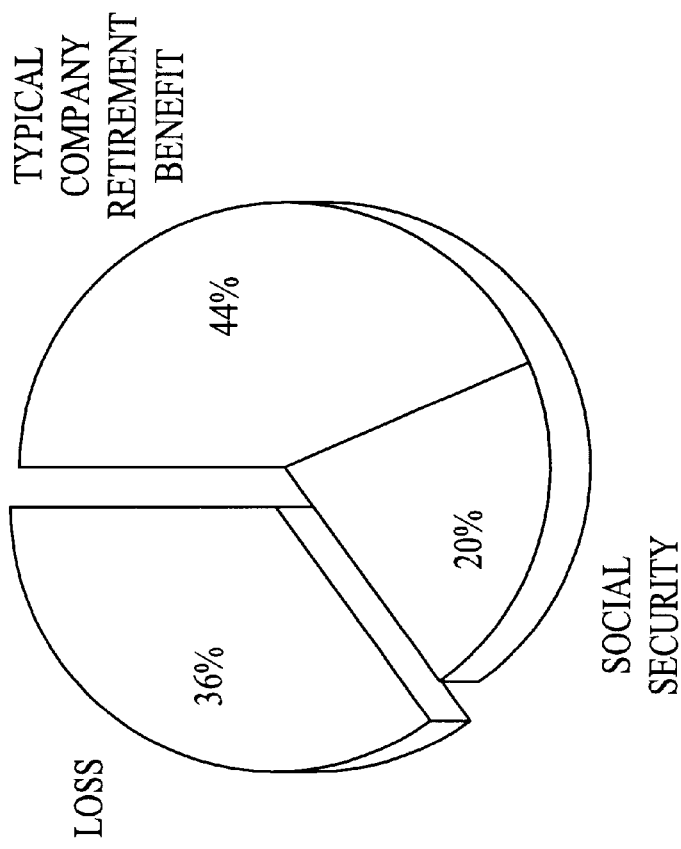
FIG. 1 is an illustration of a typical retirement benefit when the final pay is $50,000.
Figure 3:
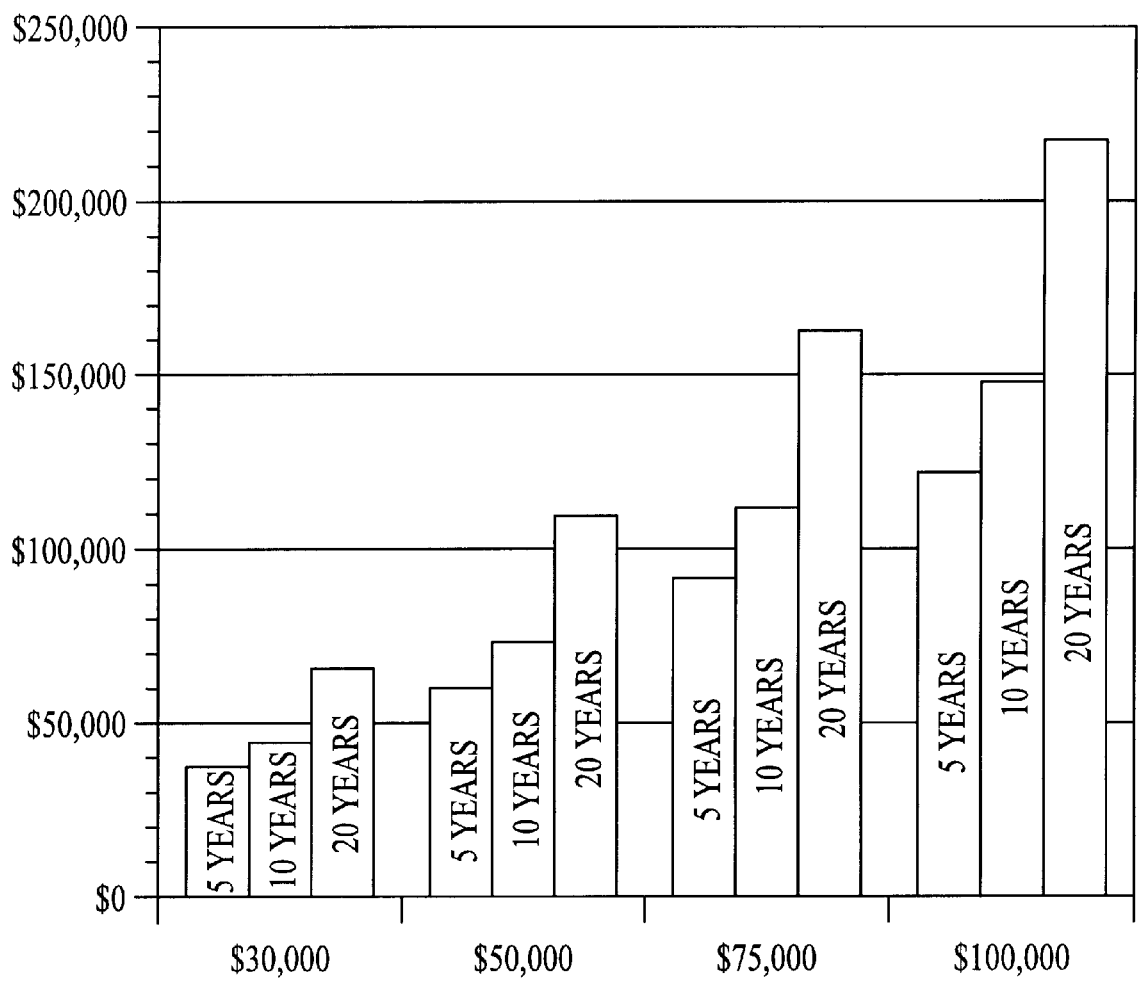
FIG. 3 is an illustration of earning growth based on 4% annual pay increases.
Figure 4:
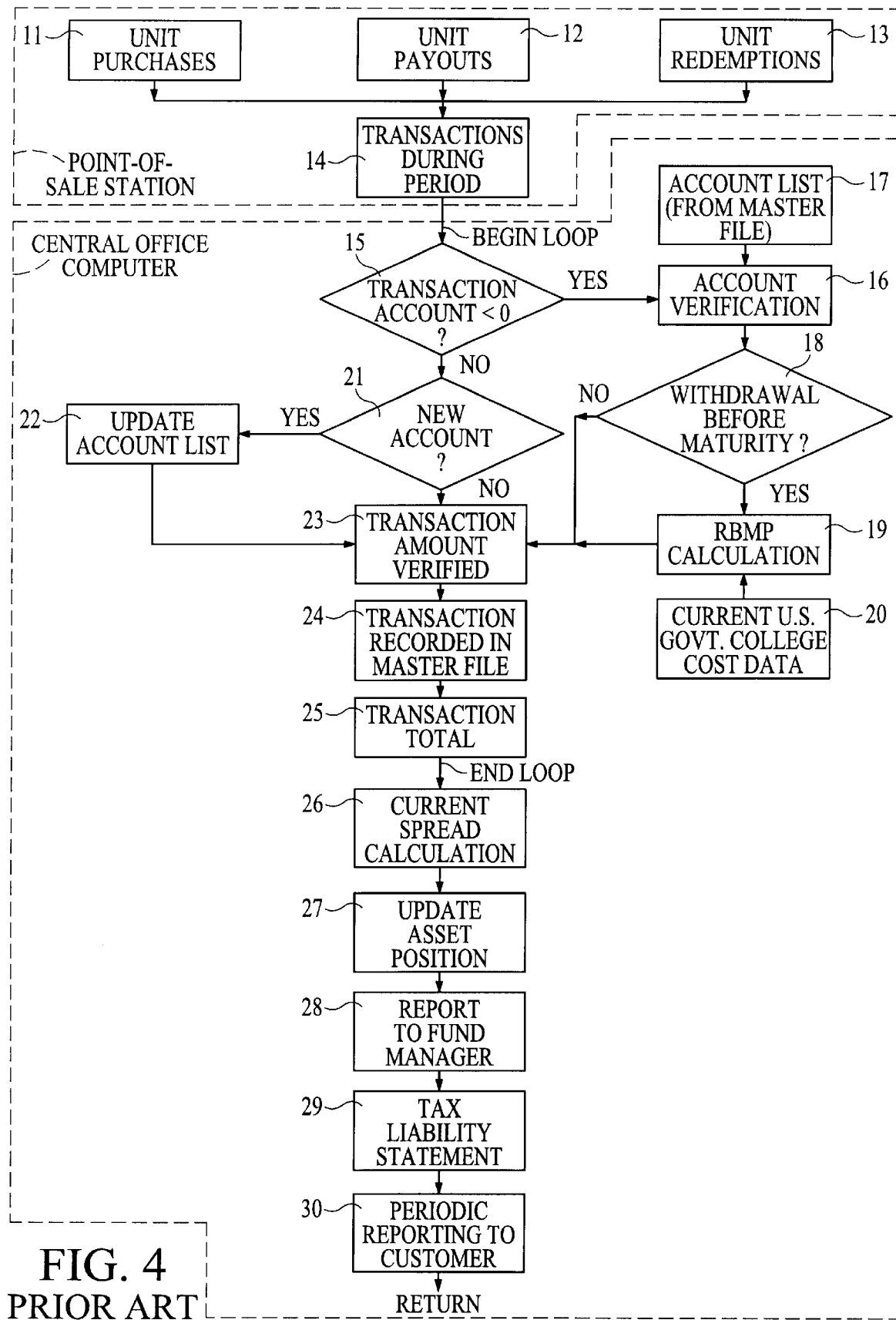
FIG. 4 is a flowchart of a prior art computer process for funding a future liability.
Figure 5:
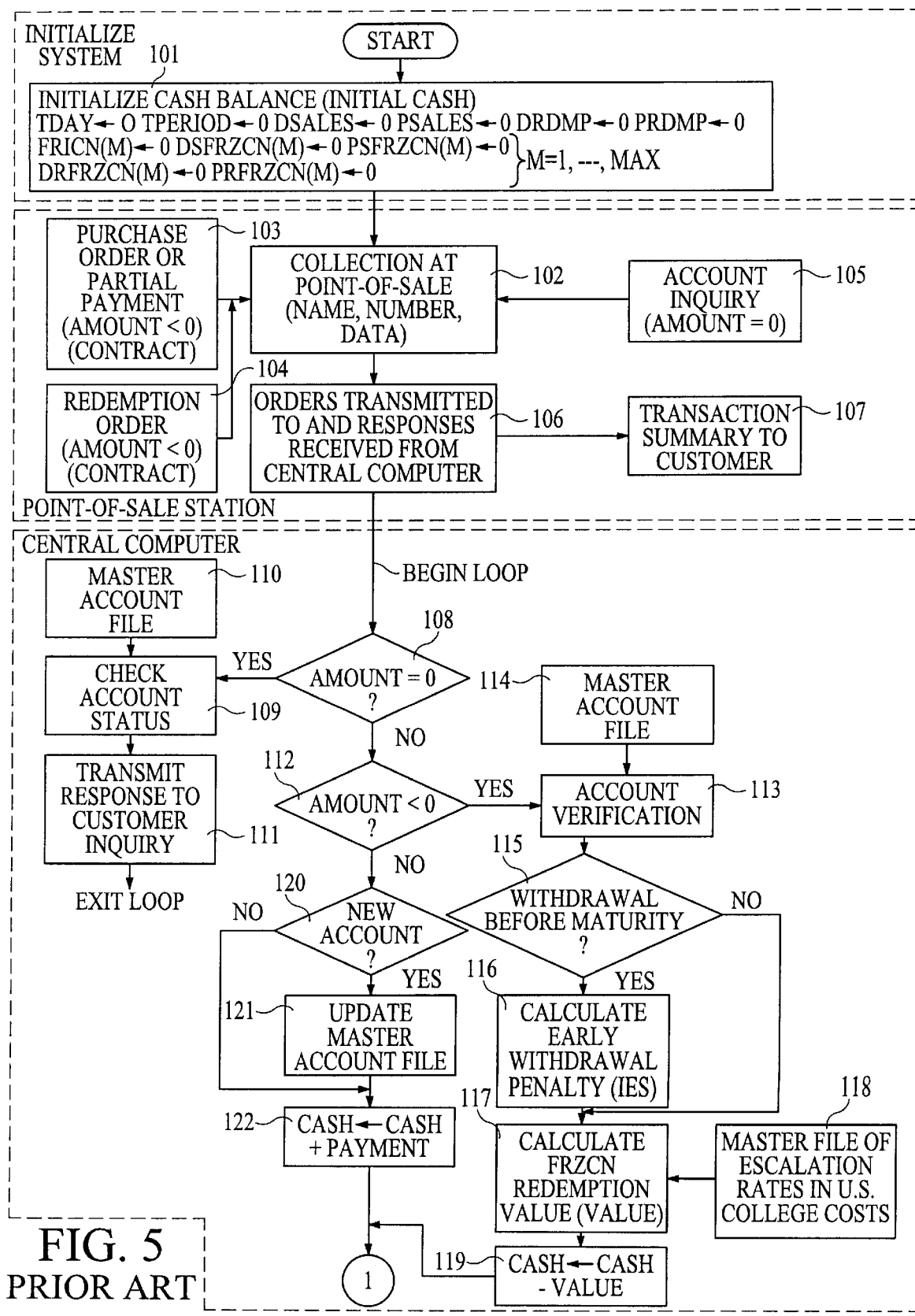
FIGS. 5–7 are flowcharts illustrating the computer process for funding a future liability using a floating rate zero coupon note.
Figure 6:
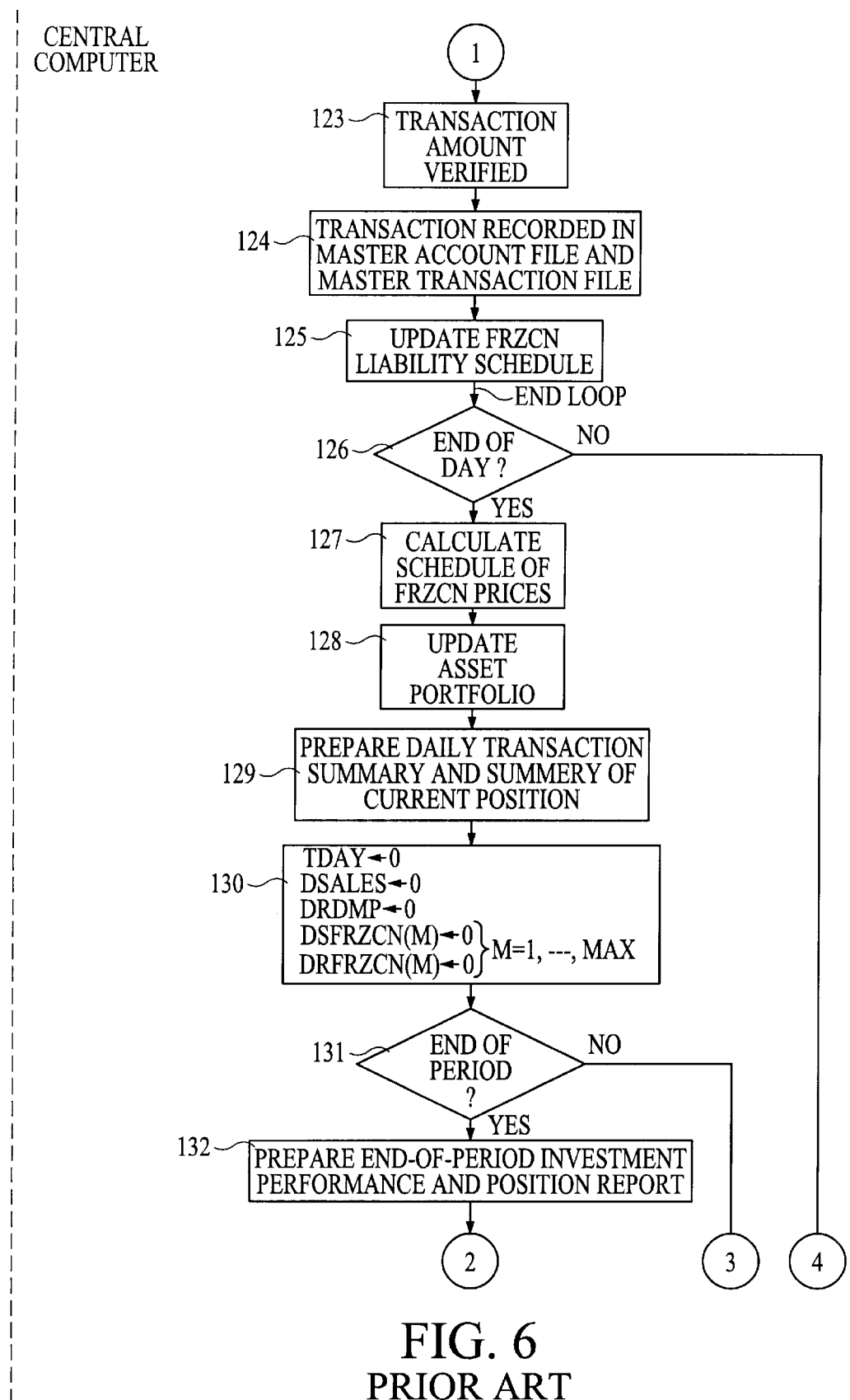
Figure 7:
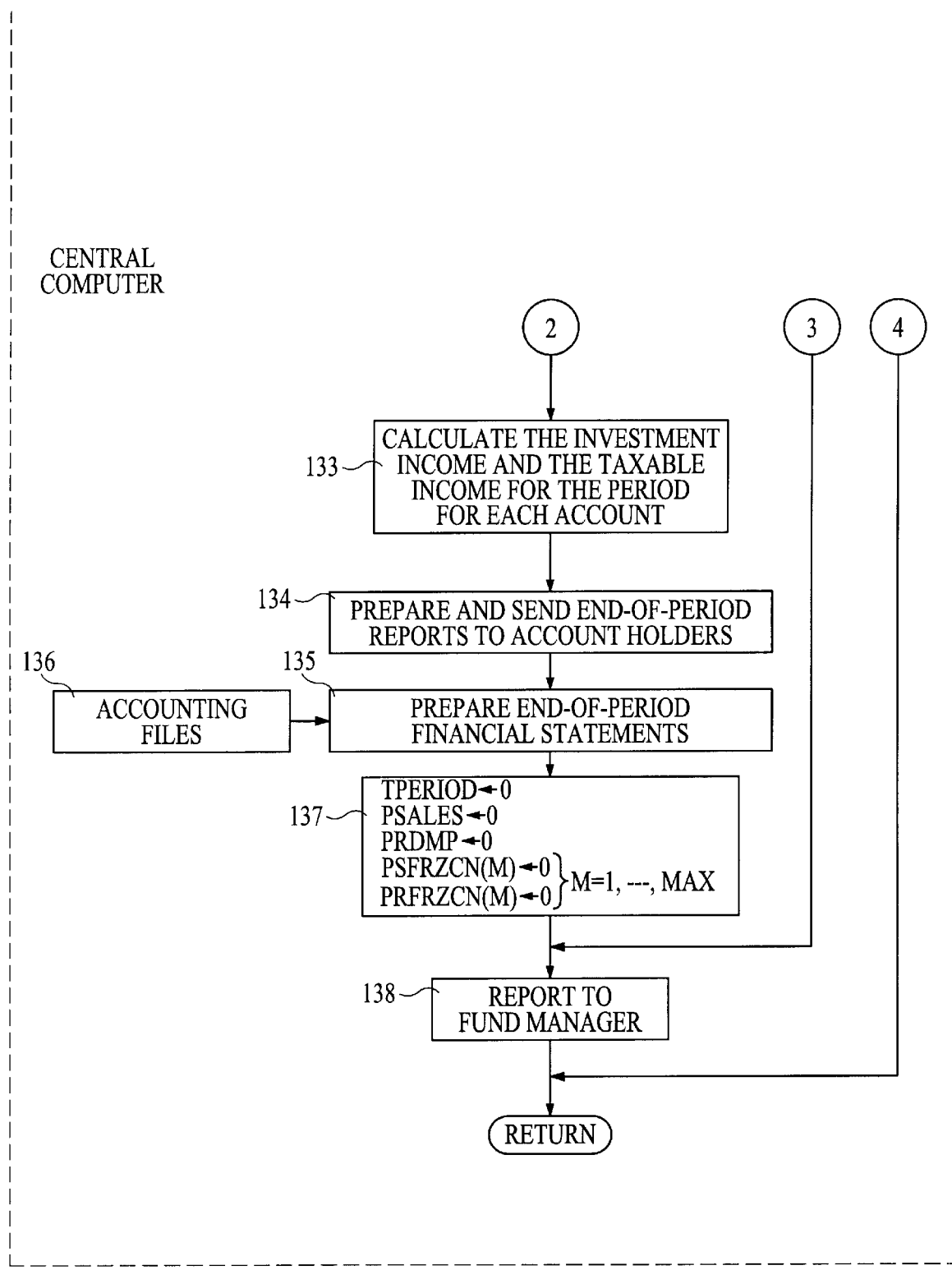

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF BEST MODE FOR CARRYING OUT THE INVENTION

The computer assisted and/or implemented process and architecture of the present invention administers an investment and/or retirement program. The goal of the program is to maximize the investment and investment performance, and to minimize government obligations (e.g., taxes) associated therewith. The program is designed specifically for managing and/or administering retirement and/or investment resources. The program also ensures that the retirement and/or investment resources are not prematurely diverted. The reason why it is so important that investment resources not be diverted is that it compromises or jeopardizes the likelihood of maximizing the investment and investment resources, as is discussed below in greater detail.

The computer assisted and/or implemented process and architecture tracks the performance of the retirement and/or investment resources, while also managing reports on the performance of the retirement and/or investment resources, in a distributed data base environment. The distributed data base environment may be, for example, over the internet, intranet and/or other private networks. The distributed data base environment may also be, for example, over hard wired lines, modem connections, and the like.

The computer assisted and/or implemented process, computer architecture and program (i.e., software and investment) provides an efficient and uncomplicated administration system that effectively manages, administers and/or generates reports for retirement and/or investment resources. The computer assisted and/or implemented process and architecture also effectively manages or administers investment resources to maximize same.

In order to accomplish the above, the computer assisted and/or implemented process, architecture and program effectively prevents such resources from being prematurely diverted. Thus, the administration system provides superior, exceptional or optimal usage of the resources, thereby providing unexpected benefits to the program beneficiary or recipient. The administration system also provides unexpected performance to the program administrator.

The computer assisted and/or implemented process, architecture and program provides unexpected benefits when administering and combining the feature, structure and/or procedural framework of an annuity with the feature, structure and/or procedural framework of a trust. Each of these devices or mechanisms are discussed below in greater detail.

The computer assisted and/or implemented process, architecture and program provides additional unexpected benefit when administered and combined with the feature of an integrated attorney, trustee, and financial advisor network.

Annuities are generally of the form of variable annuities or fixed annuities. A variable annuity works as follows: Instead of opening a mutual fund account, an insurance company sponsors variable annuities. Each annuity offers "subaccounts" managed by a mutual fund family. These subaccounts closely mimic the fund family's mutual funds, and various subaccounts may be selected.

Variable annuities derive their name from the fact that the return earned varies with the performance of the subaccounts chosen. If a stock subaccount is chosen, the account will rise and fall with the stock market; if the bond subaccount is selected, the account will reflect the performance of the bond market.

Figure 8:
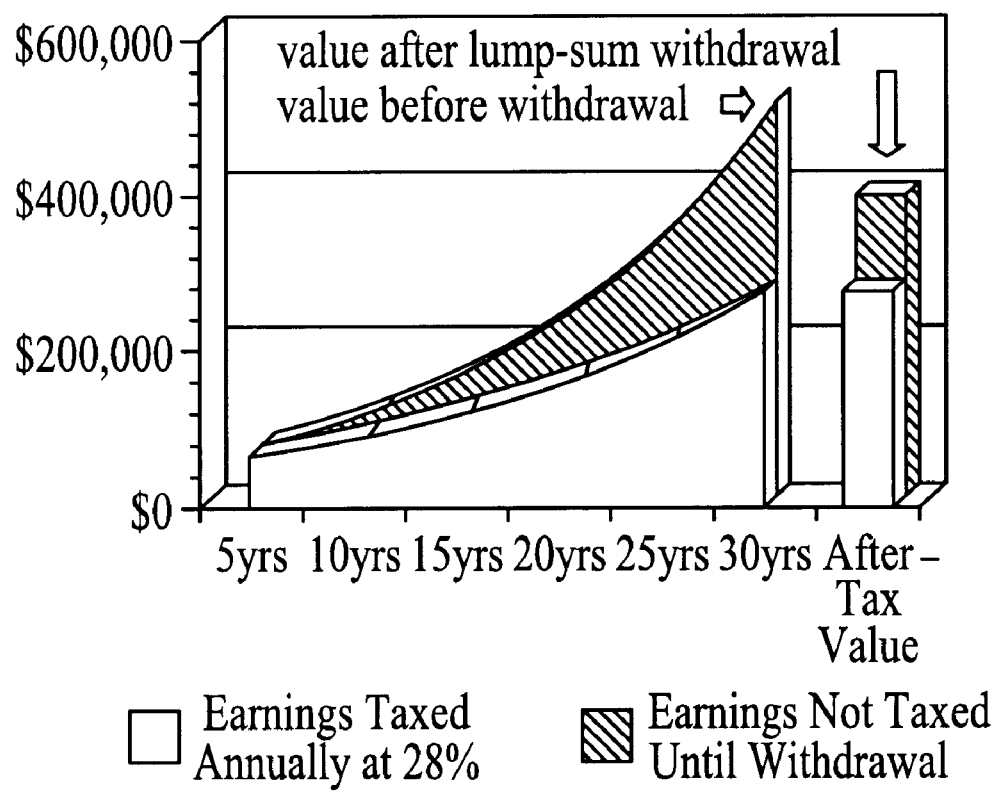
FIG. 8 is an illustration of the growth process of money, illustrating money that grows tax-deferred grows more quickly than money that is taxed annually.
Figure 10:
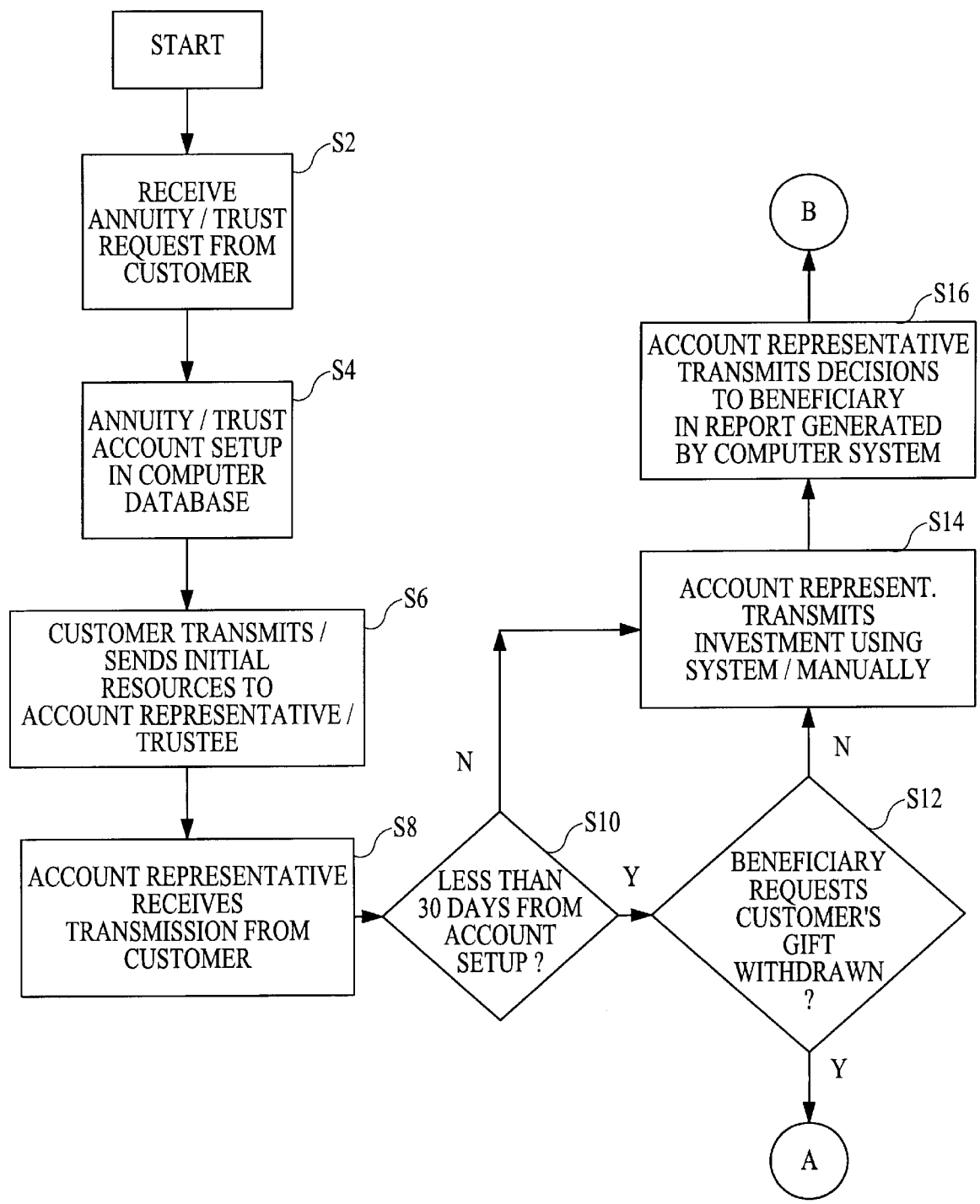
FIGS. 10–13 are flowcharts of the computer assisted-implemented process for managing and/or administering the retirement and/or investment resources.
Figure 11:
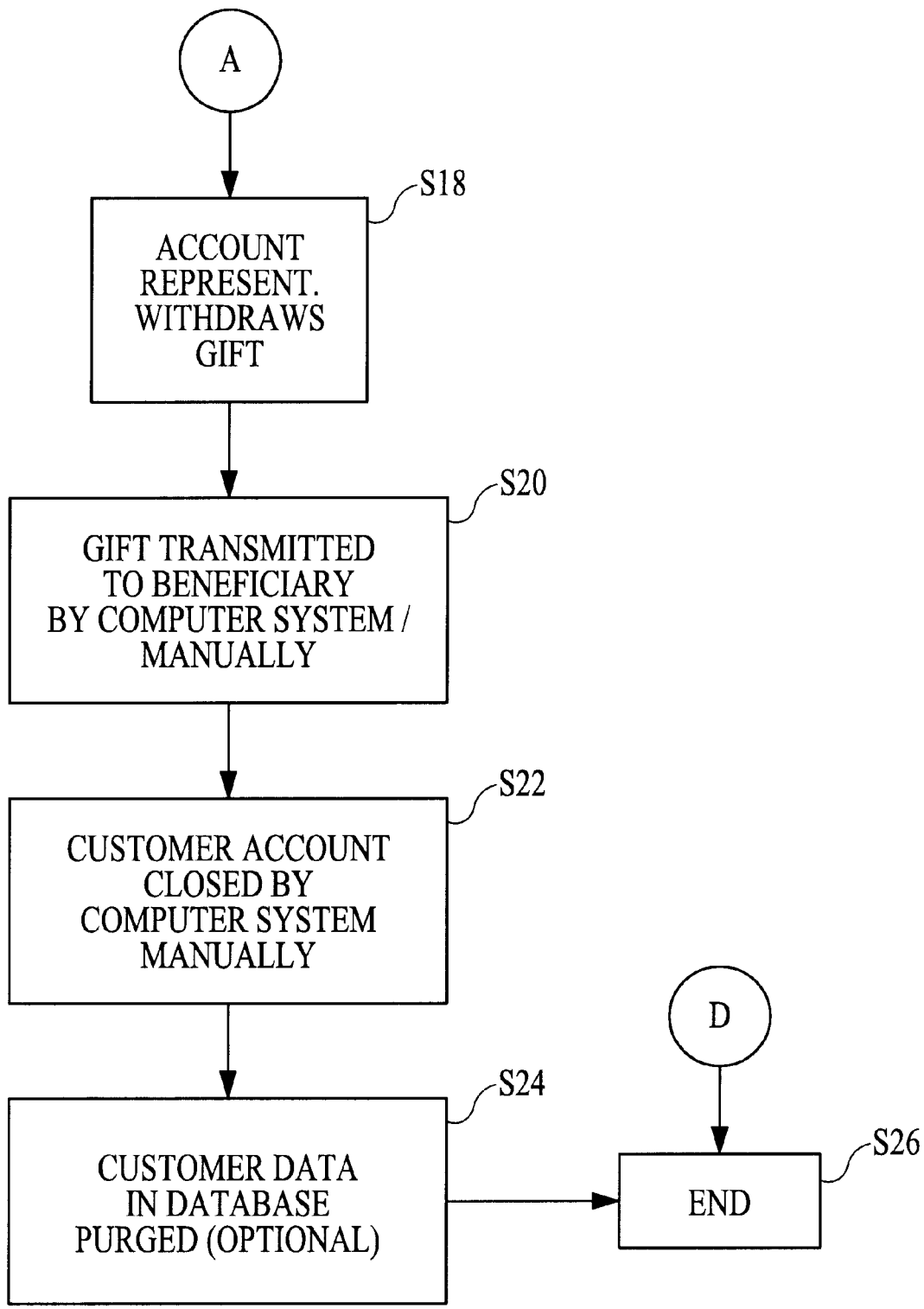
Figure 12:
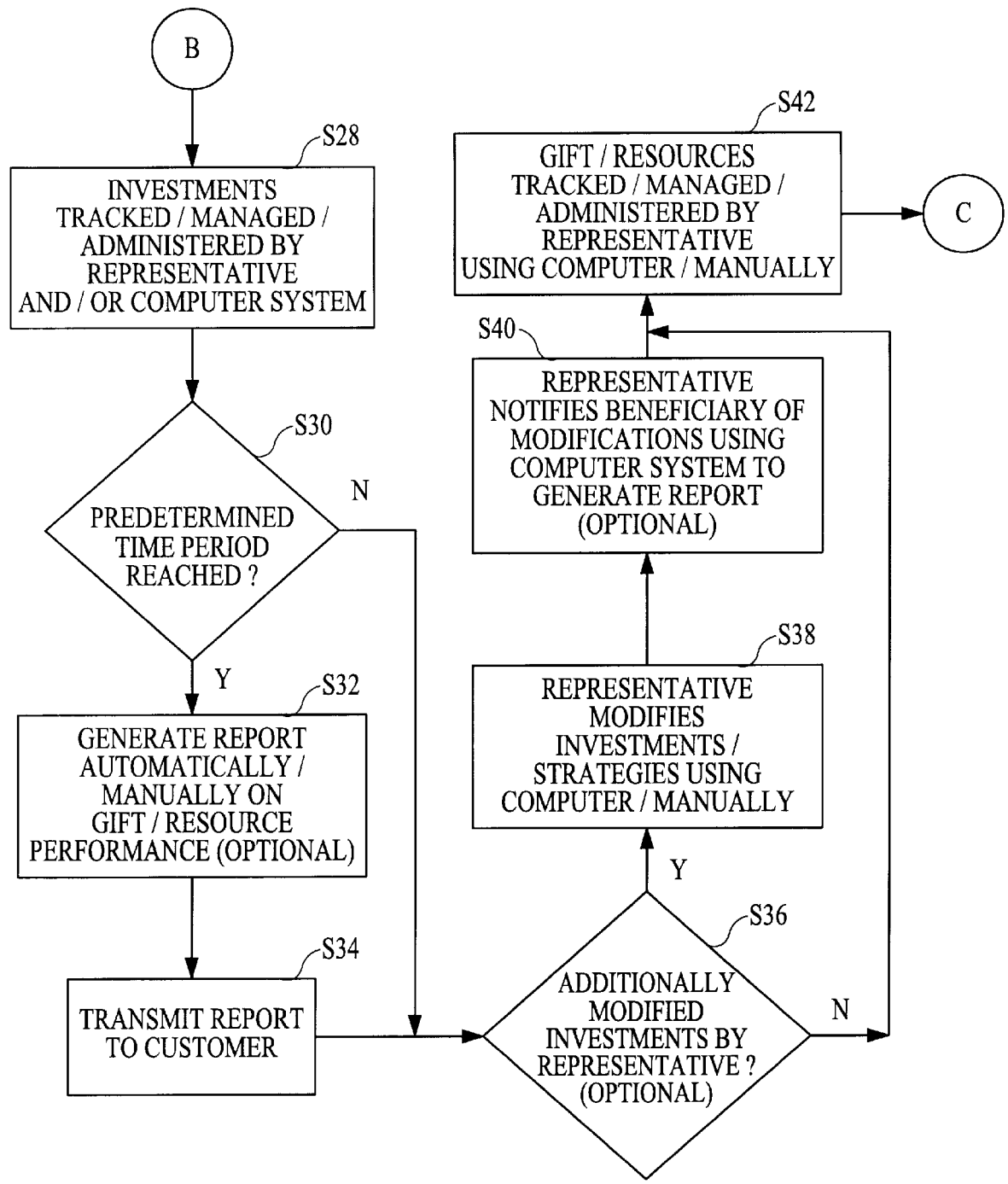
Figure 13:
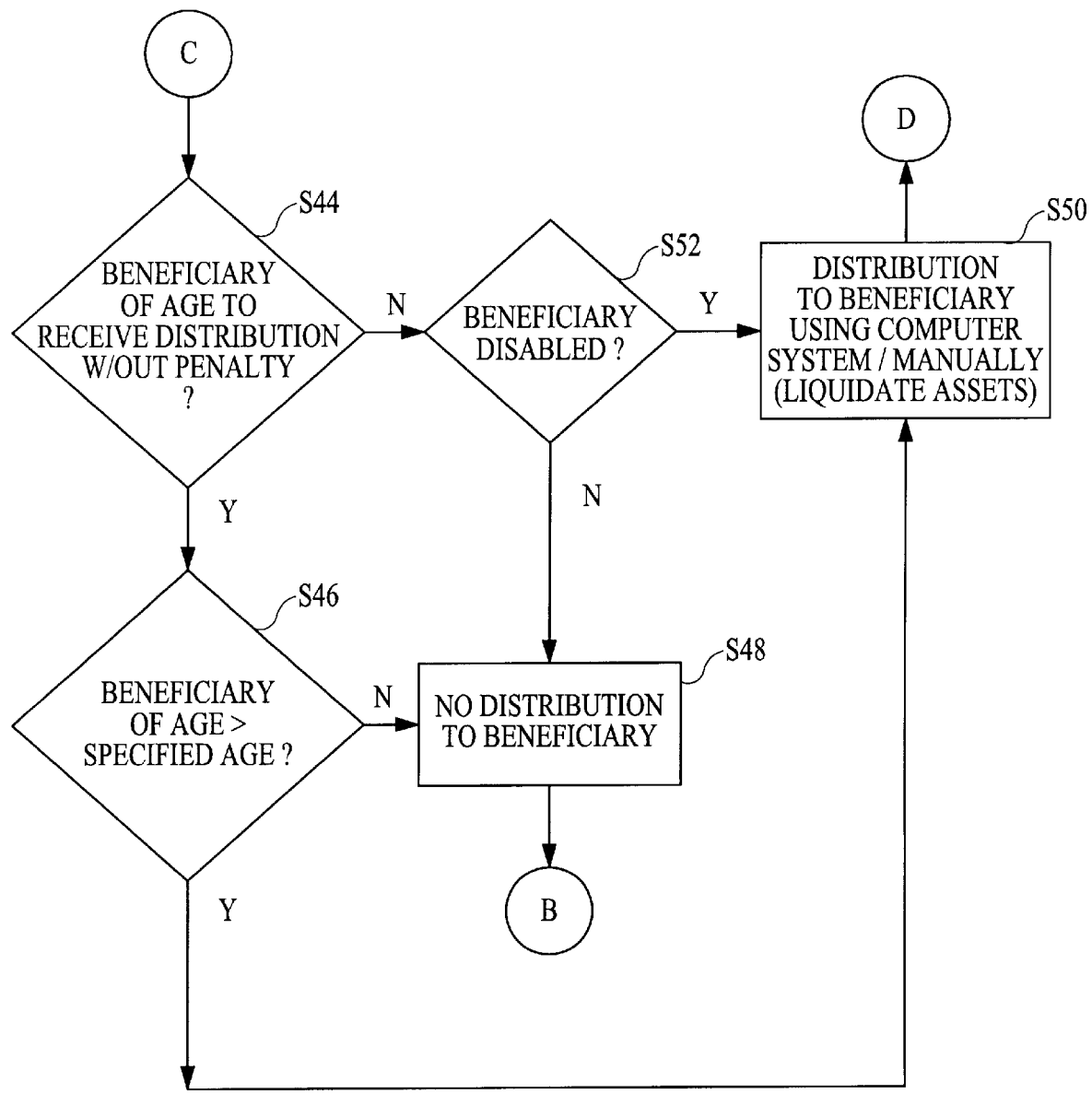

Because under current tax law, money placed in an insurance contract grows tax-deferred, meaning no taxes are paid on earnings until withdrawn. And money that grows tax-deferred grows more quickly than money that is taxed annually, as FIG. 8 demonstrates. As illustrated in FIG. 8, after paying the taxes that have been deferred, the after-tax profit is $326,256, meaning that the increase in profit is 653%. This remains a solid improvement over non-tax deferral investment vehicles or devices.

Many investors question the viability of tax-deferred strategies, given today's relatively low tax rates. Besides (knowing Congress), rates could well rise over time. Therefore, why defer paying taxes when future tax rates will be higher—the answer is this: even if tax rates rise, tax-deferral remains a winner. FIG. 9 is an illustration that shows that deferral of taxes is still the winner even if tax rates rise over time. In FIG. 9, it is assumed that the $100,000 is invested at 10% annual interest for 10 years. This example assumes that tax rates will rise during this period, from 30% to 50%.

In this example, the taxable account pays taxes annually while the tax-deferred account defers taxes. If both accounts are completely liquidated in the 10th year, the net value of the taxable account (which paid taxes at ever-increasing rates each year) would be $174,026, while the tax-deferred investment (which paid no taxes during the 10 years but then paid all its taxes at the top rate of 50%) has a net after-tax value of $179,687—$5,661 more than the taxable account. Thus, the tax-deferred annuity comes out (slightly) ahead.

But this assumes liquidating in the 10th year—and that is highly unlikely. More likely: the taxpayer will want to receive income from the investment on a regular basis. Assuming withdrawing 10% per year from the current balance, the taxpayer will receive from the taxable account (after paying taxes) approximately $8,701 (depending on current domestic or foreign tax laws), but the tax-deferred investment will give approximately $12,698—a 49% increase in after-tax income compared to the taxable account!

Thus, no matter how calculated, tax deferral makes a lot of sense, and the power of tax-deferred annuities cannot be ignored.

If tax-deferral is not enough of a feature for a variable annuity, annuities also provide security for investment. How would one like to invest knowing an account can only rise, never fall. Here's how this feature of the variable annuity works.

Place, for example, $100,000 into a variable annuity, choosing the annuity's stock subaccount. Let us further say that the timing is not exactly wonderful. The day after investment, a major stock market crash cuts the value of the account to $75,000. If the $75,000 is withdrawn, $25,000 would be lost. Instead, $74,000 is withdrawn, leaving $1,000 in the account. The reason is that the annuity guarantees to give:

what was invested minus withdrawals, or the current value, whichever is greater.

Thus, the investment ($100,000) minus withdrawals ($74,000) is $26,000, and the current value of the annuity is $1,000. Therefore, the insurance carrier owes the beneficiary the greater of the two, or $26,000.

Variable annuities also periodically reset the minimum value of investment for purposes of calculating the above. In other words, every five or seven years or so, the annuity carrier will set the current value as the new minimum below which cannot fall. Thus, if $100,000 is invested, and it later grows to $150,000, the latter amount becomes the basis for the minimum guarantee. If the account later falls to $125,000, the contract guarantees the $150,000 value.

How to benefit from this no-lose guarantee? It is easy—die. Remember, the guarantee is from an insurance company. So, although this guarantee is excellent, it comes with a fairly significant piece of fine print. Thus, most folks should not be impressed with this no-loss guarantee, but for others it is worthwhile. For example, elderly retirees with lots of money in CDS are not spending all their money and they know they never will. Rather, they intend to leave their money to their grandchildren for college.

Because they want nothing to happen to their money, the grandparents put everything into certificates of deposit (CDS) with fixed and guaranteed interest rates. These elderly people should consider an annuity stock subaccount instead. Because of the no-lose guarantee, the worst thing that could happen is that the account will be worth at their death exactly what it is worth today, even if the stock market crashes in the meantime. But assuming stocks perform as well in the future as they have in the past, the account should be worth substantially more than if they invest the money in CDS.

Some people do not like the variableness of annuities. They want the security of a fixed rate of return, like they get from CDs. To meet this demand, insurers offer fixed annuities. Even though variable annuities are advantageous, fixed annuities are not. Under the law, fixed annuities are considered insurance products and are sold by insurance agents. Variable annuities, on the other hand, are considered securities products and those who offer them must possess both a federal securities license and a state variable life license. This subtlety generally makes all the difference.

Under insurance law, money given to an insurance company is commingled with the general assets of that company. Thus, if the carrier goes broke, the money is lost with it. But because variable annuities fall under federal securities rules, money invested in a variable annuity is segregated from the assets of the insurance carrier. Thus, even if the insurance company goes broke, the money remains safe.

In exchange for not taxing each year, any withdrawals made prior to age 50½ are subject to a 10% IRS penalty. Thus, annuities are intended as long-term investments. This applies to both fixed and variable annuities. In addition, variable annuities also incur the following expenses:

an annual contract free which ranges typically from $30 to $75 per year, depending on the size of the account;

the annual expense ratio of the subaccount; since variable annuities are managed by mutual fund families, annual costs are incurred as well; and an annual mortality charge of 1% to 2% per year to compensate the insurer for the death benefit guarantee it provides.

Because of the additional costs, many assume they will earn more in mutual funds than in annuities. But consider the following:

taxes must be paid annually on the profits earned in a mutual fund, but not with the annuity. This tax-deferral can more than compensate for the additional cost, as long as the variable annuity is kept for five years or more;

one can lose money in the mutual fund, but the annuity offers a minimum guarantee. Thus, a benefit is received in exchange for the additional cost; and perhaps most importantly, the assumption itself has not always proven valid. In 1991, for example, Lipper Analytical Services reported that, net of all costs, the average stock mutual fund gained 35.21%, while the average variable annuity stock subaccount gained 36.25%. Thus, the annuity average actually beat the fund average by 1.04%, defying expectations of reduced performance.

There are two tax traps with annuities that you must beware:

(1) If liquidating an annuity or receiving income from it, the proceeds are taxed at ordinary income tax rates, as opposed to the potentially more favorable capital gains tax rate.

(2) Annuities do not enjoy a stepped-up basis at death. This means your children could incur significant tax liabilities—equal, in fact, to the tax savings enjoyed during the taxpayer lifetime. The bottom line is that the tax break provided by annuities is deferral, not exemption. Someone (eventually) will pay taxes on the profits earned in the annuity—if not you, then your heirs.

A trust, on the other hand, is a mechanism that allows one to impose some controls over a corpus or resources that one intends to give to an intended beneficiary. That is, a trust is a fiduciary relationship in which one person is the holder of the title to property subject to an equitable obligation to keep or use the property for the benefit of another.

The settlor (e.g., customer as described herein) of a trust is the person who intentionally causes the trust to come into existence. The trustee (e.g., administering institution, or institution affiliated with or working with the administering institution) is the person who holds title for the benefit of another. The trust property is the property interest which the trustee holds subject to the rights of another. The beneficiary is the person for whose benefit the trust property is to be held or used by the trustee. The trust instrument is the document by which property interests are vested in the trustee and beneficiary and the rights and duties of the parties (called the trust terms) are set forth.

In the management of the trust the trustee is bound to display the skill and prudence which an ordinarily capable and careful man would use in the conduct of his own business of a like character and with objectives similar to those of the trust. The trustee owes a duty to the beneficiaries to administer the affairs of the trust solely in the interests of the beneficiaries, and to exclude from consideration his own advantages and the welfare of third persons. This is called the duty of loyalty.

If the trustee engages in a disloyal transaction, the beneficiary may secure the aid of equity in avoiding the act of the trustee or obtaining other appropriate relief, regardless of the good faith of the trustee or the effect of the trustee's conduct on the beneficiary or benefit to the trustee. If a trustee enters into a transaction with a beneficiary relating to the interest of the beneficiary under the trust, the trustee owes the beneficiary a duty to display the utmost fairness.

This duty of utmost fairness ordinarily involves disclosure to the beneficiary of all relevant facts which are unknown to the beneficiary, a statement as to the legal rights of the beneficiary and the effect of the proposed dealing, and the payment of adequate consideration if no gift was involved. In addition there may be a duty to advise the beneficiary to secure independent counsel as to the wisdom of the transaction or to secure such advice for him.

On taking office a trustee has a duty to examine the investments delivered to him as the original trust assets and to decide whether they are proper for retention under the terms of the trust instrument and the applicable statute or common law. He cannot assume that the investments are legal. During the course of his administration the trustee has a duty to review and reexamine the investments of his trust at reasonable intervals in order to determine whether they are proper for retention or should be sold.

When, at the beginning of the trust, or thereafter, an investment becomes one not permitted under the terms of the trust or the law of the state in question, the trustee has a duty to sell it as soon as he reasonably can and to reinvest the proceeds. A trustee must follow the trust instrument as to the time, amount, form and destination of payments which he is directed or authorized to make from income or principal to the beneficiaries. A trustee's duties are usually absolute, and he is not excused from performing them correctly even though he may have used reasonable care and prudence.

In order that he may be able to present to the court and the beneficiaries an accurate history of his administration, the trustee is under a duty to retain trust documents, to secure and file vouchers for expenditures, and to keep records. The trustee is under a duty to furnish to the beneficiary on demand all information regarding the trust and its execution which may be useful to the beneficiary in protecting his rights, and to give to the beneficiary facts which the trustee knows or ought to know would be important to the beneficiary.

I have discovered that unexpected benefits are achieved when the annuity is controlled under a trust for the benefit of an intended beneficiary, when specific conditions apply to the administration of the trust, and when the trust is administered with the assistance of a computer system described herein. That is, I have discovered that a combination trust and annuity will permit the resources in the annuity to be tax deferred and maintained until the beneficiary is at a suitable age or condition for distribution, for example, retirement, disability and the like.

For example, as illustrated in FIG. 8, tax deferred resources grow much more quickly than non-tax deferred resources. However, I have realized that when investment accounts are provided for beneficiaries, beneficiaries will generally terminate prematurely, or request distributions that compromise the effectiveness of the retirement resources for the beneficiary. In order to prevent early or undesirable distributions, I have determined that a trustee may be charged to administer the trust on the request of the customer, using the computer system to administer same. Accordingly, the trustee prevents undesirable withdrawal of resources so that the resources may grow tax-deferred for a substantial length of time.

In accordance with the computer administered program, $5,000, for example, may be invested for a new born beneficiary in the computer administered program. The beneficiary may be restricted from receiving distributions, for example, until retirement age of 65. The future value of $5,000 65 years later, if the proceeds are allowed to be reinvented on a tax deferred basis, is an incredible $2–8 Million dollars! This is an incredible amount of resources that may then be withdrawn from for the beneficiary's retirement. Accordingly, the computer administered or assisted program provides unexpected benefits to the beneficiaries thereunder.

FIGS. 10–13 are flowcharts of the computer assisted-implemented process for managing and/or administering retirement and/or investment resources. If FIGS. 10–13, the representative and/or trustee for the institution that is administering and/or managing the resources receives an annuity/trust request from the customer in Step S2, and sets up an initial account for the annuity/trust request in the computer database in Step S4. In Step S6, the customer transmits/sends initial resources to the account representative/trustee for managing and/or administering, as well as any other fees that may be required for the use of services.

The account representative receives the transmission from the customer in Step S8. The beneficiary generally has the ability to withdraw the resources from the institution managing and/or administering same for a predetermined period of time, e.g., 30 days. If, for example, the computer system determines that there is less than 30 days from when the account was set up in Step S10, and the beneficiary requests the customer's gift not be withdrawn in Step S12, or if it is more than 30 days from when the account has been set up in Step S10, the account representative transmits the investments using the computer system, or alternatively manually, in Step S14. In addition, the account representative transmits the investment decisions of the resources to the beneficiary and a report is generated by, for example, the computer system in Step S16.

When the beneficiary requests that the customer's gift be withdrawn in Step S12, and when it has been less than 30 days from when the account has been set up, the account representative withdraws the gift in Step S18, and transmits the gift to the beneficiary using, for example, the computer system, or alternatively manually, in Step S20. The customer account may then be closed by, for example, the computer system or manually in Step S22. The customer data in the database is optionally purged in Step S24, and the process for setting up, administering and managing the customer resources ends in Step S26.

Returning to Step S16, where the account representative transmits decisions to the beneficiary in a report, the account representative and/or system tracks, manages and administers the investments and/or resources in Step S28. In Step S30, it is determined whether a predetermined time period has been reached, and if so, a summary report is generated automatically or manually regarding the performance of the gift/resource in Step S32, and the report which is optionally generated, is transmitted to the customer in Step S34.

After the report has been transmitted to the customer in Step S34 or if a predetermined time period has not been reached in Step S30, as well as any time that the representative/trustee determines it is appropriate, the resource investments may be modified as appropriate in Step S36, and if so, the representative modifies the investments and/or strategies using the computer system or manually in Step S38. The representative optionally notifies the beneficiary of the modifications using the computer system to generate, or to assist, in the generation of the report in Step S40.

Thereafter, or if the representative determines that the resources are not to be modified, the system with the cooperation of the representative, tracks, manages and/or administers the gifts or resources using the computer and/or manually in Step S42. The computer system and/or representative determines whether the beneficiary is of age to receive the distribution or withdrawal without penalty in Step S44, and if so, then determines whether the beneficiary has achieved the predetermined age as specified by the customer in Step S46. When the beneficiary has reached the specified age in Step S46, then the beneficiary may be distributed the resources using the computer system or manually in Step S50, i.e., the beneficiary's resources are liquidated in Step S50. After the resources have been distributed to the beneficiary in Step S50 in accordance with predetermined criteria, the process then ends in Step S26.

If the beneficiary has not reached the age of distribution without a penalty in Step S44, then in Step S52, it is determined whether the beneficiary is disabled. If the beneficiary is disabled in Step S52, then the beneficiary may also be distributed the resources in accordance with predetermined criteria in Step S50. If, however, the beneficiary is not disabled in Step S52, or the beneficiary has not reached the specified age in Step S46, then there is no distribution to the beneficiary. After it is determined that no distribution to the beneficiary should be made in Step S48, control of the administration, tracking and/or management of the resources is then returned to Step S28.

As discussed above, the assets or resources may be distributed at a specific age, such as at an age where withdrawal of resources does not incur a tax penalty. In addition, or in the alternative, the resources may be distributed at the death of the customer, at the death of the beneficiary, and the like. Further, funds may be distributed to the beneficiary after the resources reach a predetermined level, or on the request of the customer, beneficiary, or trustee. In the alternative to distributing the resources after one or more of the above predetermined events have occurred to one or more of the above recipients, the resources may be reinvested and a new customer, beneficiary, trustee, and the like, may be designated.

In addition, the customer may also have the option of how much information is to be disclosed to the beneficiary, or the beneficiary may receive notices on a regular basis, as described in detail above. The customer may also have the ability to restrict the distribution, predesignate the form of the distribution, and the like. For example, the customer may designate the beneficiary receive a lump sum, distribution over a life expectancy, a combination of both, and the like.

Figure 14:
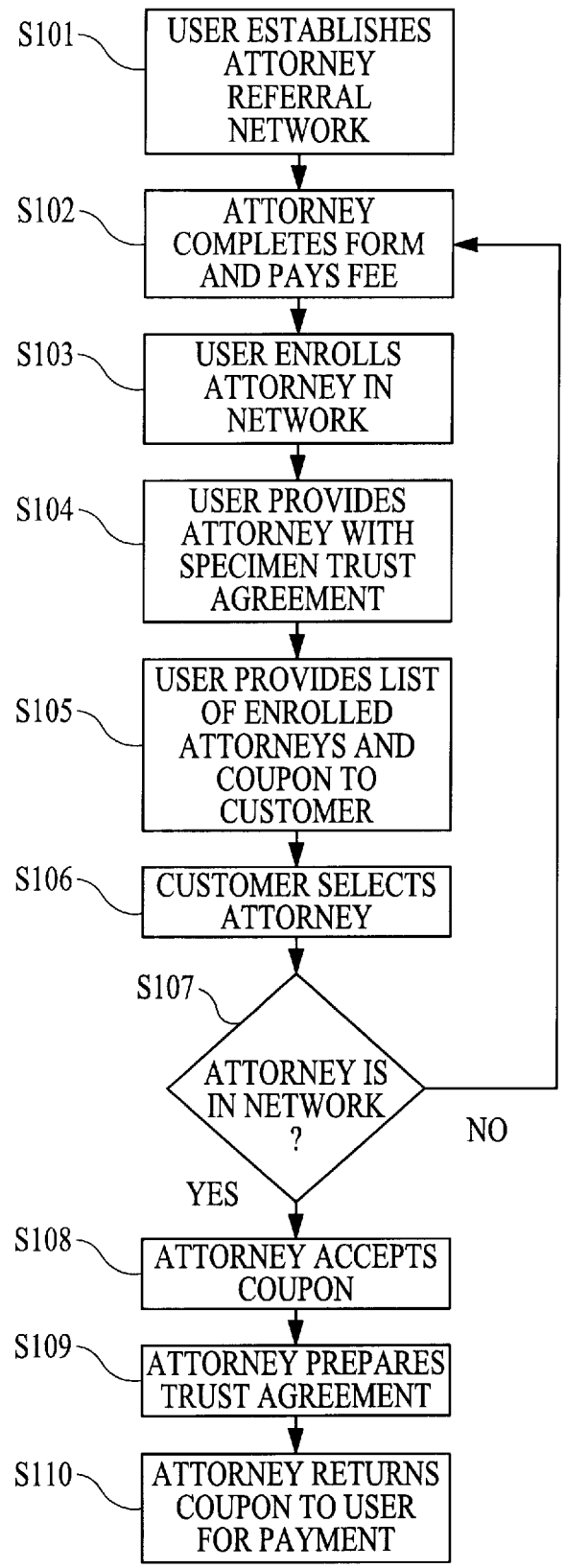
FIG. 14 is a flowchart that illustrates the optional service provider network element of the computer-assisted and/or implemented process for managing and/or administering retirement and/or investment resources.

FIG. 14 is a flowchart that illustrates the optional service provider network element of the computer-assisted and/or implemented process for managing and/or administering retirement and/or investment resources.

In FIG. 14, the user initiates the process by establishing, with the assistance of a computer, an attorney referral network in Step S101. To join the network, an attorney, practice group, law firm, and/or other practitioner (hereinafter user), for example, completes a form and pays an enrollment fee to the user in Step S102. Other or different enrollment requirements may alternatively be used. The user then enrolls the attorney or other authorized practitioner (hereinafter practitioner or attorney) in the network in Step S103, and optionally provides the attorney with one or more specimen trust agreements in Step S104.

Steps S102 through S104 may be repeated for an unlimited number of attorneys in order to establish the attorney referral network. When a customer contacts the user with a request to, for example, open an account to manage investment and/or retirement resources therein, the user provides the customer with a list of attorneys or other authorized practitioners that are enrolled in the network in Step S105. The list may be a complete list of all attorneys in the network, or it may optionally be a list of attorneys in the user's geographic area, or it may be a list based on other criteria. Alternatively, the list of practitioners may be transmitted to the customer automatically or may have been previously submitted to the customer.

In Step S105, the user optionally provides the customer with a coupon which the customer can use to pay all or part of the fee of any attorney or practitioner enrolled in the network. The customer then selects an attorney in Step S106. If the attorney is an attorney within the network, in Step S108 the attorney will optionally accept the coupon for all or part of the attorney's fee in preparing a trust agreement. The attorney prepares a trust agreement for the user in Step S109, using the specimen trust agreement which the user provided to the attorney as a form document in Step S104. If the customer's attorney is not within the network, the customer's attorney must enroll in the network or qualify for enrollment in or interaction with the network, in order to obtain the specimen trust agreement and accept the coupon. The attorney may then return the coupon to the user to receive payment of all, or part of, the attorney's fee in Step S110.

Figure 15:
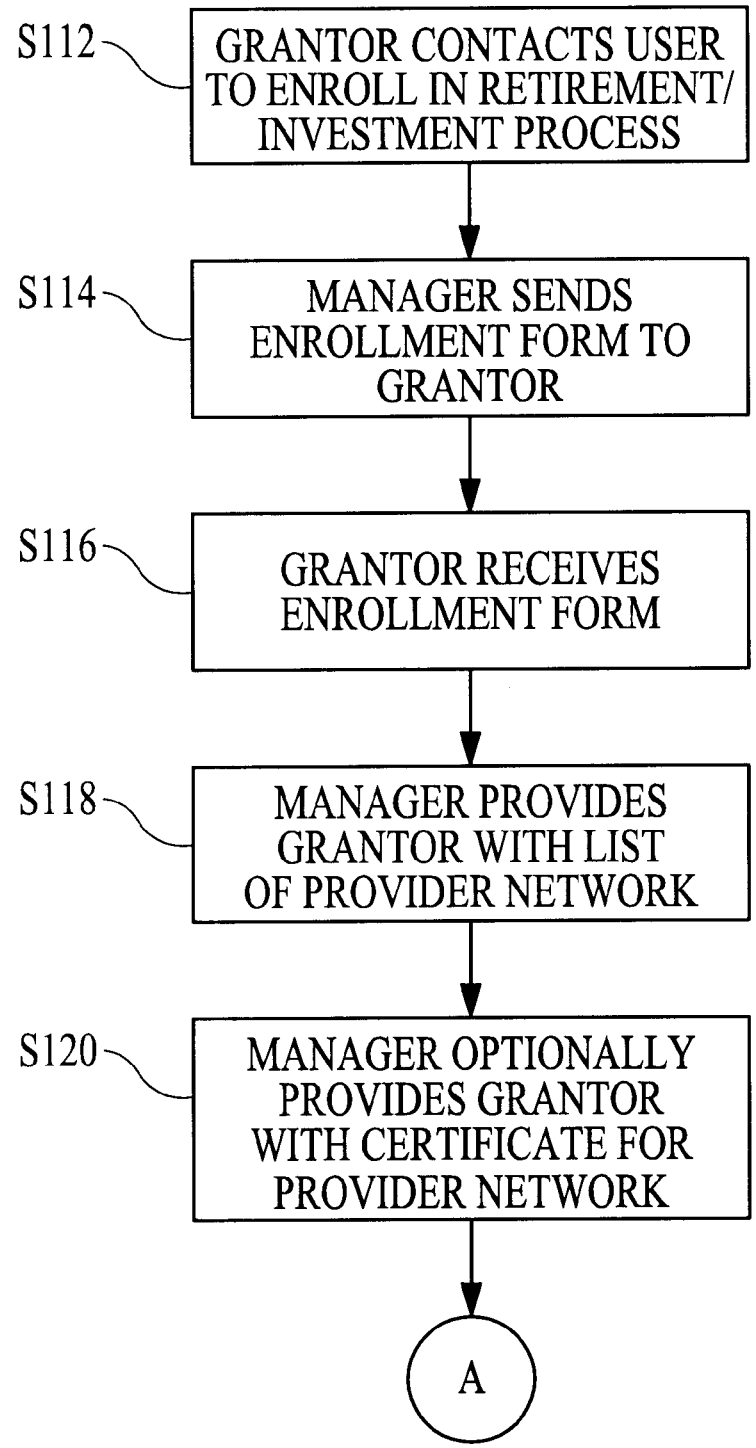
FIGS. 15–17 are illustrations of the steps that may be followed to initiate the process for managing and/or administering retirement and/or investment resources in accordance with another embodiment of the invention.
Figure 16:
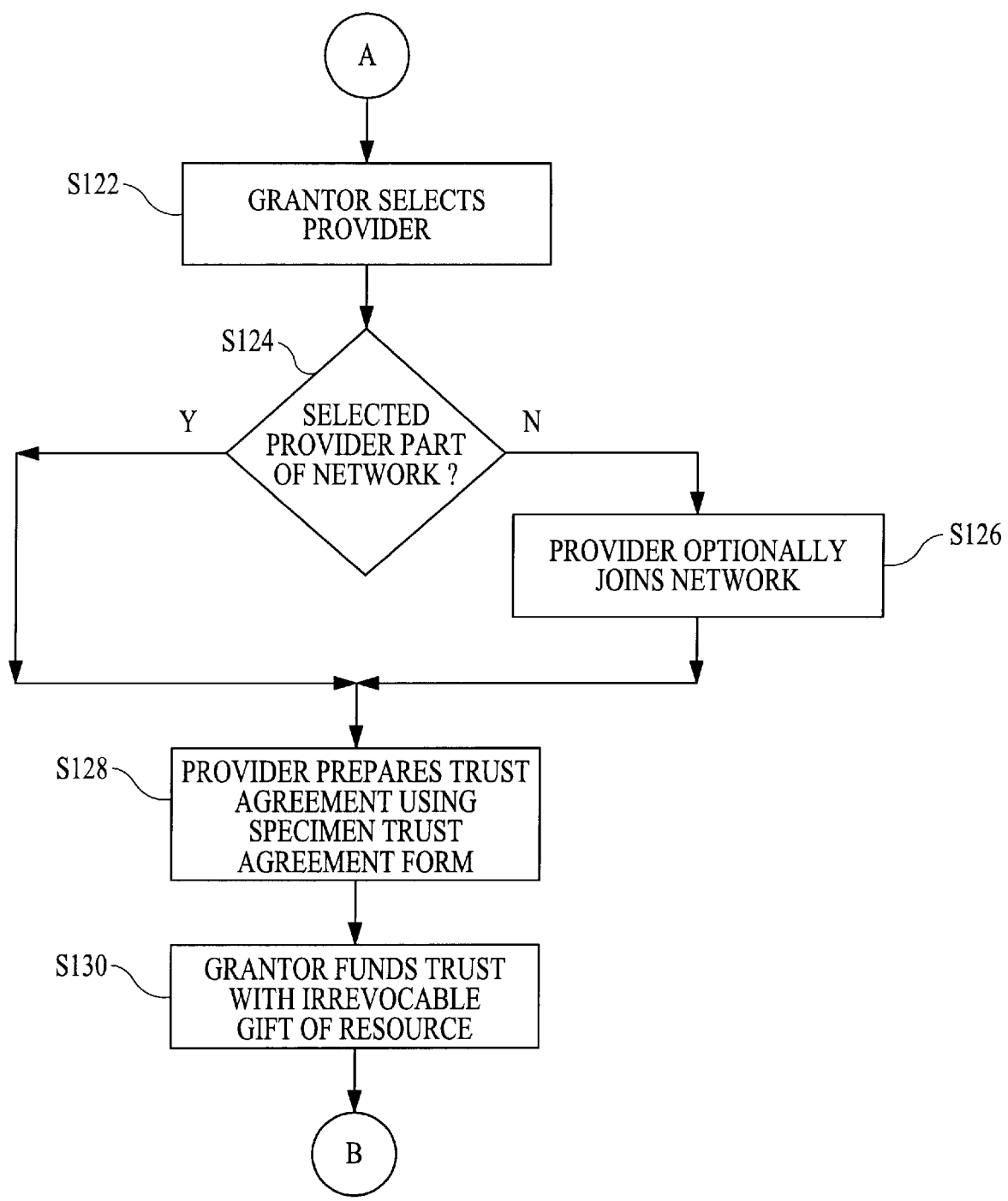
Figure 17:
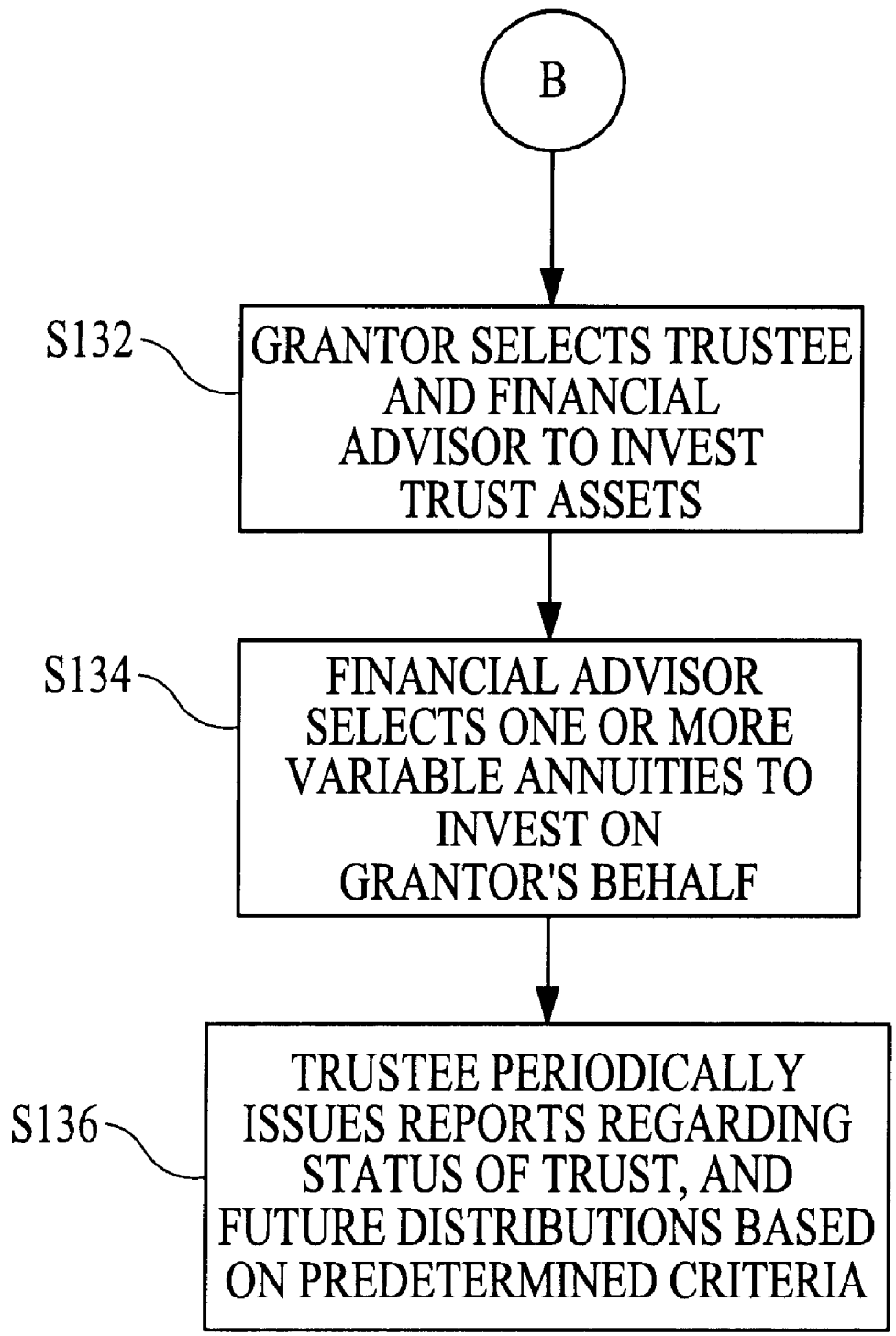

FIGS. 15–17 are illustrations of the steps that may be followed to initiate the process for managing and/or administering retirement and/or investment resources. The grantor contacts the user or manager and requests to enroll in the process or managing and/or administering retirement and/or investment resources in Step S112. The contact may be by telephone, electronic mail, ordinary mail, world-wide-web site, and the like.

Upon receipt of the enrollment form in Step S116 sent by the manager in Step S114, the user or manager, with the assistance of the computer, will provide the grantor with the names and contact information of some or all participating attorneys in the attorney network in Step S118. The user or manager may also optionally provide the grantor with a certificate which may be used to pay all or part of the attorney's fees at Step S120. However, the certificate, if used, will only be valid if the grantor selects an attorney who participates in the attorney network.

The grantor selects a provider in Step S122. If the grantor selects an attorney who is not part of the attorney network as determined in Step S124, in one embodiment of the invention, the attorney/provider must join the attorney network to obtain a copy of the specimen trust agreement at Step S126. Alternatively, any attorney may participate in the program of the present invention.

The selected provider/attorney then prepares a trust agreement for the grantor using a specimen trust agreement form provided by the user or manager at Step S128. After a trust agreement is prepared for the grantor by the grantor's attorney, the grantor optionally pays a fee and funds the trust with an irrevocable gift of resources in Step S130. This gift is for the benefit of a child or other beneficiary that the grantor selects. Preferably, the gift of resources is a minimum of $5,000. There is no minimum or maximum amount. After the lawyer prepares a trust agreement, the grantor will select a trustee and a financial advisor to invest the trust's assets for the beneficiary at Step S132.

The trustee's function is to hold the assets for the trust until the beneficiary reaches the age of distribution (preferably it must be at least 59½). It is the trustee's responsibility to make sure the money in the trust is invested in the manner set forth in the trust agreement. The trustee will use the money to purchase a tax-deferred investment. The grantor also selects an investment advisor at Step S132 who, with the assistance of the computer, selects one or more variable annuities in which to manage the resources at Step S134.

The trustee, as assisted by the computer system, will periodically issue reports regarding the status of the trust, hold and invest the assets and, eventually, make distributions to the beneficiary as described above at Step S136. The beneficiary (or, if said beneficiary is a minor, his or her guardian) is advantageously free to choose a different trustee at any time.

Optionally and preferably, the grantor will select the user or manager to be the trustee and/or the financial advisor. If the grantor selects the user or manager to be the trustee and the financial advisor, in accordance with the present invention, the user will benefit because the user or manager will optionally waive all investment and advisory fees and trustee fees for the entire life of the trust. Of course, in an alternative, the user need not waive the fees. The use of other trustees or financial advisors could result in fees that may otherwise be avoided, which could diminish the future value of the trust assets for the beneficiary.

One of the key goals of the present invention is to make this invention affordable for the grantor. In order to accomplish that goal, it was important that the trust's potential earnings not be "chiseled" away with fees. That is why in one embodiment of the invention, the user or manager optionally agree to serve as trustee for free (provided that the specimen trust agreement, for example, is used or similar document). And, if the user or manager or an associate of the user or manager serves as financial advisor, the applicable investment advisory fees will optionally and beneficially be waived as well, for every trust created.

A trust can be established for any beneficiary of any age. The only requirement is that the beneficiary must have, for example, a Social Security Number or other indication that the beneficiary is entitled to such an investment under the applicable U.S. or foreign laws. From an economic perspective, there is no limit to the amount of money that can be given to the trust because the more that a grantor contributes, the more money the beneficiary is likely to have when he or she retires. However, there may be an Internal Revenue Service or other foreign law limitation on gifts.

While the above process has been described in connection with a computer implemented and/or assisted process for administering the resources, more than one computer system may be used to effectuate the above described processes. Similarly, while various steps have been described as implemented by a computer, one, more or all of the above steps may be implemented manually as well or in the alternative.

For more information about the tax implications of gifts, the grantor should consult with an attorney or tax advisor. It is notable that the present system for managing retirement and/or investment funds is set up to accept only a one-time contribution, although subsequent trusts may be established for the beneficiary with additional contributions or additional contributions may be made to the original trust.

Further, each trust is designed to benefit only one beneficiary. The grantor is welcome to contribute different amounts for each beneficiary's trust. Of course, the older the beneficiary, the less time there is for assets of the trust to have the potential to grow on the beneficiary's behalf—and therefore, the older the beneficiary, the more the grantor might want to contribute.

Preferably, the trust is irrevocable. This means that once a grantor establishes the trust and makes a contribution to it on behalf of the beneficiary, the grantor cannot take the money back. However, the trustee and financial advisor can be replaced by the beneficiary (or, if said beneficiary is a minor, by his or her guardian). Because of the irrevocable nature of the trust, a grantor should consult with his or her attorney before establishing the trust. The trust is designed to secure the child's retirement. Therefore, the assets held by the trust are preferably not available to the beneficiary until he or she reaches retirement age. The grantor decides whether that age is 59½ or some other age.

When the child reaches the age designated, as described above, the assets in the trust will be transferred from the trust to the beneficiary. If the assets are still invested in a variable annuity, the beneficiary will then have the option of continuing to defer taxes or of receiving the money in one lump sum, or in the form of a monthly income for the rest of his or her life, among other income options. The beneficiary's monthly income at retirement will depend on the value of the account at retirement, the account's annual return, and the beneficiary's life expectancy.

The following is a specific example of a process in accordance with the present invention:

1) Company A licenses the RIC-E™ Trust to an attorney for one year for $750.00. By paying this fee, the attorney gets:
   a) the RIC-E™ Trust document on floppy disk or CD-ROM, along with permission to use it for one year, and
   b) his name added to the Company A lawyer referral network.
2) Company A will send to consumers the RIC-E™ Trust information kit. The kit does not contain the trust document itself, but rather information describing how the RIC-E™ Trust program works and an application for expressing their interest. A prospectus on Company B (annuity contract) is also included. Interested consumers return to Company A the following:
   a) the application form, and
   b) Company A's fee of $300.00.
3) The consumer notes on the application the name of:
   a) the attorney they wish to use. If none is stated, Company A will refer the client to an attorney member of its referral network.

b) the investment advisor they wish to use. If none is stated, Company A will retain Company C (financial services company) on behalf of the client.
c) the annuity contract they wish to use. If none is stated, Company B (annuity contract) will be used.
d) the trust company they wish to use. If none is stated, Company D (trust company) will be used. Company D's (trust company) fees will be waived provided Company B (annuity contract) is used.

4) In consideration of the $300.00 fee, Company A will:
a) forward the application to the attorney. The attorney will use the information provided by the client as the basis for his/her work, as the attorney deems appropriate
b) send to the consumer a certificate worth $150.00 in legal fees (the consumer gives it to the attorney, who submits it to Company A for reimbursement)
c) prepare the investment and trust applications, provided that, for example, Company C (financial services company), Company B (annuity contract) and Company D (trust company) are used
d) when the trust is in place, the attorney shall provide Company A with the following:
  i) a copy of the executed trust document
  ii) a check for the amount of the contribution to the trust,
  iii) optional notification that the Crummey power has been completed,
  iv) instructions to proceed with the investment as directed by the client, and
  v) with this information in hand, Company A will:
    (1) forward all papers (the trust documents, contribution check, annuity and trust applications) to the investment advisor, with instructions to open the accounts, and
    (2) send confirmations to the client.

This combination of interrelated provider networks, or groups within one or more networks, provides significant management and/or administrative advantages in controlling, for example, quality in the overall administration process with the customer. In addition, this combination of interrelated provider networks, or groups within one or more networks, also provides significant cost advantages and/or savings for the plan administrator, and/or the customer if the savings are transferred totally or in part thereto.

It is important to note that the present method for administering retirement and/or investment resources is preferably designed to help solve the beneficiary's future retirement needs, and it is preferably not to be used for other financial concerns that may occur before then. Therefore, the money is preferably not available prior to the designated age of the beneficiary, as indicated in the trust agreement and on the enrollment form, which should be age 59½ or older.

When the beneficiary reaches the age of distribution (designated by the Grantor), the trust assets will be distributed to the beneficiary. The beneficiary will have the option of receiving the proceeds in one lump sum, or as a series of monthly payments for the rest of his or her life, among other income options. Because no taxes are due on the money throughout the life of the trust, the beneficiary will incur income taxes at his or her tax rate when he or she receives the income in retirement or upon distribution. If the beneficiary dies before the age of distribution, the trustee will distribute the trust assets to the beneficiary's probate estate.

Regular statements will be sent to the beneficiary (or, if said beneficiary is a minor, his or her guardian), preferably on a quarterly basis, by the trustee or financial advisor with the assistance of the computer. If the grantor also wishes to receive regular statements, the grantor can just inform the trustee or financial advisor.

The present invention is a way for parents, grandparents and other grantors to help ensure that a child they love or other beneficiary can enjoy a financially secure retirement. The computer-assisted and/or implemented method of managing retirement and/or investment resources uses a trust, which allows the grantor the ability to set aside assets until the beneficiary's retirement. Because the trust assets are invested in a variable annuity, the assets will grow tax-deferred. These features are explained more completely below.

Anyone can take advantage of the present inventive process for administering a retirement and/or investment program for any beneficiary regardless of the beneficiary's age. For example, you can create a trust for adult children, including those in college or newly married, as well as for those much older. Parents and grandparents, of course, can use the present invention—and so can aunts, uncles, godparents and close family friends as well—for the important children in their lives. Indeed, a grantor can establish a trust for a child even if the grantor is not a relative.

These advantages make the trust extremely attractive, and even more so because it takes advantage of the one attribute that the child has in ample quantity: time. Funded with a small amount of money, the trust has literally decades to grow and compound on itself, enabling it to potentially grow into a significant source of retirement income.

For example, if a parent or grandparent were to establish this trust for a newborn and fund it with the $5,000 minimum, leaving it untouched until the child reaches age 65, it would be worth $2,451,854, assuming a 10% annual return. (This is just an example. It is not indicative of a specific result of any particular investment, and does not take into consideration taxes, inflation, or fluctuations in value.)

Of course, no one can predict the future returns of an investment. Still, the broad U.S. stock market, as represented by the Standard & Poor's 500 Index, has averaged about 10% per year since 1926, according to Ibbotson Associates. (Of course, past performance is no guarantee of future results.)

Regardless of the investment that is used or what its return might be, one thing is clear: if taxes have to be paid each year on that year's earnings, the ultimate value of investment resources at the beneficiary's retirement will be significantly less than if taxes are avoided throughout this time. This is because money that is allowed to grow without annual taxation can grow to much higher values than money that is taxed annually. Therefore, it is very important that the assets contributed to the trust be invested in a tax-deferred vehicle. In such an investment, no annual taxes are paid on the earnings in the trust; instead, the taxes are deferred until the beneficiary receives the money in retirement. Tax deferral is a powerful tool that can help the assets in the trust grow faster than they would in a comparable investment that is taxes annually.

FIG. 18 illustrates what a powerful difference tax deferral makes in what a trust might be worth to a child at retirement if $5,000 were to be invested at the child's birth and left alone for 65 years. And just as important: Even after the child pays the income taxes due once he or she receives the income, the value can be significantly greater than if taxes were paid each year.

Specifically, FIG. 18 shows the value of $5,000 earning the stated interest rate in a fully currently taxable investment and a comparable tax-deferred investment over a period of 65 years with no withdrawals. Both the "If Taxed Each Year" and the "Value of Tax-Deferred Account After Taxes" values assume a 39.6% tax bracket. "Value of Tax-Deferred Account after Taxes" value assumes a lump sum distribution. Neither calculation reflects any charges or fees that might be applicable; such charges or fees would reduce the return. All earnings assumed to be interest, not capital gains. The numbers in this chart are for illustrative purposes only and do not reflect the actual performance of any particular investment.

Because there are no taxes due until distribution, the child will owe income tax at retirement at an income-tax rate that is based on the child's then-current adjusted gross income, which would include any distributions from the trust in that year. The child will be able to choose whether and how to receive this income.

Tax deferral is an important and popular retirement planning tool, and it seems unlikely that Congress would do away with it. However, one should note it is possible that changes in the law would occur. If that were to happen, the trustee or the financial advisor would do its best to minimize the impact of those changes. Although this means that the trust might grow in value more slowly than it otherwise would, clearly the child still would be much better off than if the present invention were never used.

If the grantor wants children of different ages to enter retirement with similar amounts, the chart and worksheet illustrated in FIG. 19 will help the grantor determine how much to contribute to each beneficiary's trust, based on the amount the grantor contributes to the youngest beneficiary's trust.

One important point about the trust is that it is designed to benefit only one beneficiary. That means if a grantor wants to give this gift of retirement security to more than one beneficiary, a separate trust must generally be created for each beneficiary. And a grantor can create as many trusts for as many beneficiaries as he or she likes. Of course, the present invention may also alternatively be used to create a single trust for the benefit of multiple beneficiaries, and vice versa, provided that the laws of the jurisdiction will still provide tax deferred treatment of such as trust.

Providing for a child's future retirement raises complex legal, tax and economic issues. A feature and advantage of the present computer-assisted and/or implemented process is that addresses these issues in a relatively simple and inexpensive fashion. For example, it is unlikely that a grantor would be able to arrange to receive the services of a trust company and financial advisor at such a nominal cost for the entire life of the trust, as is possible through the use of the present invention.

Figure 20:
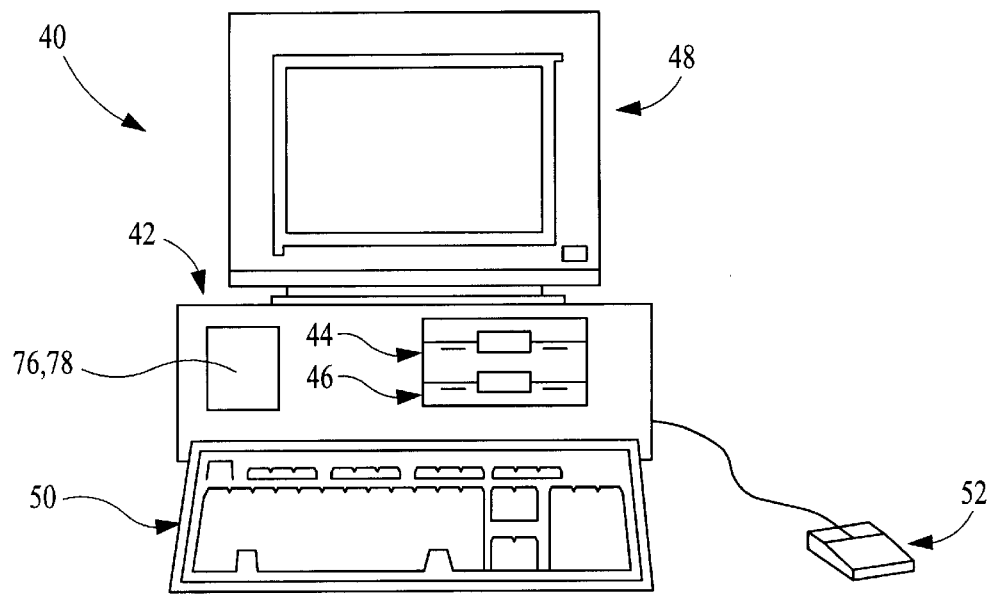
FIG. 20 is an illustration of a main central processing unit for implementing the computer processing in accordance with a computer implemented embodiment of the present invention.

FIG. 20 is an illustration of a main central processing unit for implementing the computer processing in accordance with a computer implemented embodiment of the present invention. The procedures described above may be presented in terms of program procedures executed on, for example, a computer or network of computers.

Viewed externally in FIG. 20, a computer system designated by reference numeral 40 has a central processing unit 42 having disk drives 44 and 46. Disk drive indications 44 and 46 are merely symbolic of a number of disk drives which might be accommodated by the computer system. Typically these would include a floppy disk drive such as 44, a hard disk drive (not shown externally) and a CD ROM indicated by slot 46. The number and type of drives varies, typically with different computer configurations. Disk drives 44 and 46 are in fact optional, and for space considerations, may easily be omitted from the computer system used in conjunction with the production process/apparatus described herein.

The computer also has an optional display 48 upon which information is displayed. In some situations, a keyboard 50 and a mouse 52 may be provided as input devices to interface with the central processing unit 42. Then again, for enhanced portability, the keyboard 50 may be either a limited function keyboard or omitted in its entirety. In addition, mouse 52 may be a touch pad control device, or a track ball device, or even omitted in its entirety as well. In addition, the computer system also optionally includes at least one infrared transmitter 76 and/or infrared receiver 78 for either transmitting and/or receiving infrared signals, as described below.

Figure 21:
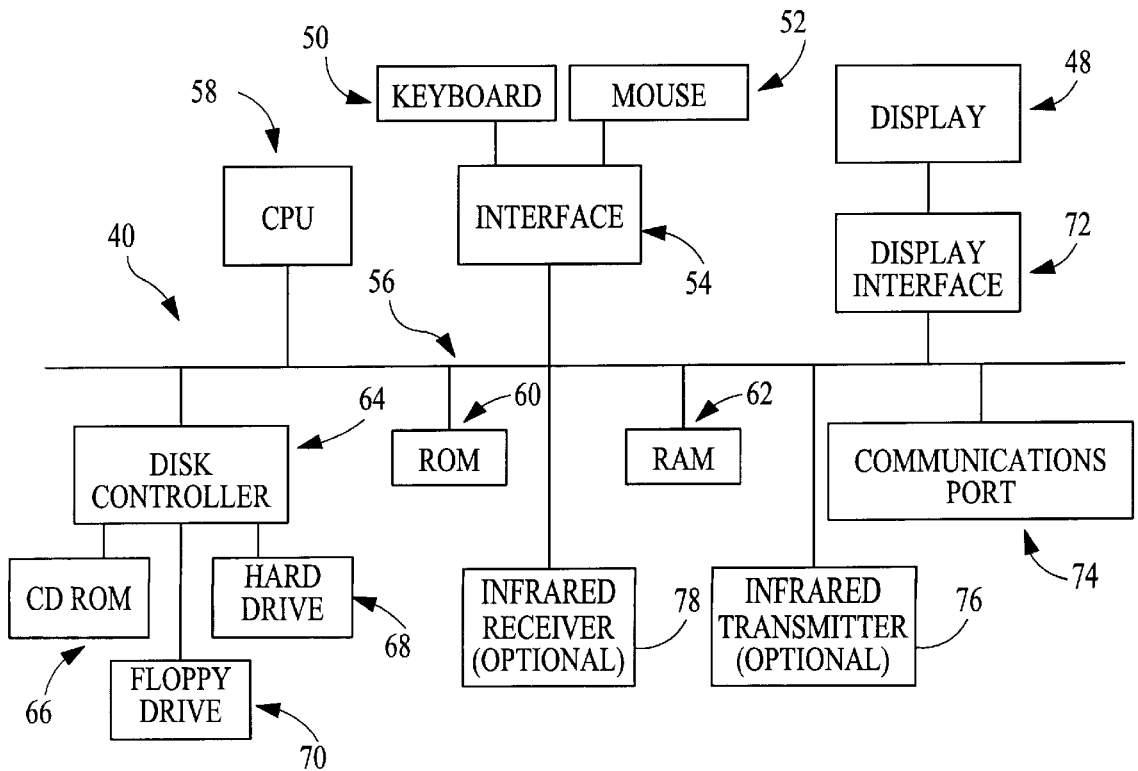
FIG. 21 illustrates a block diagram of the internal hardware of the computer of FIG. 20.

FIG. 21 illustrates a block diagram of the internal hardware of the computer of FIG. 20. A bus 56 serves as the main information highway interconnecting the other components of the computer. CPU 58 is the central processing unit of the system, performing calculations and logic operations required to execute a program. Read only memory (ROM) 60 and random access memory (RAM) 62 constitute the main memory of the computer. Disk controller 64 interfaces one or more disk drives to the system bus 56. These disk drives may be floppy disk drives such as 70, or CD ROM or DVD (digital video disks) drive such as 66, or internal or external hard drives 68. As indicated previously, these various disk drives and disk controllers are optional devices.

A display interface 72 interfaces display 48 and permits information from the bus 56 to be displayed on the display 48. Again as indicated, display 48 is also an optional accessory. For example, display 48 could be substituted or omitted. Communication with external devices, for example, the components of the apparatus described herein, occurs utilizing communication port 74. For example, optical fibers and/or electrical cables and/or conductors and/or optical communication (e.g., infrared, and the like) and/or wireless communication (e.g., radio frequency (RF), and the like) can be used as the transport medium between the external devices and communication port 74.

In addition to the standard components of the computer, the computer also optionally includes at least one of infrared transmitter 76 or infrared receiver 78. Infrared transmitter 76 is utilized when the computer system is used in conjunction with one or more of the processing components/stations that transmits/receives data via infrared signal transmission.

Figure 22:
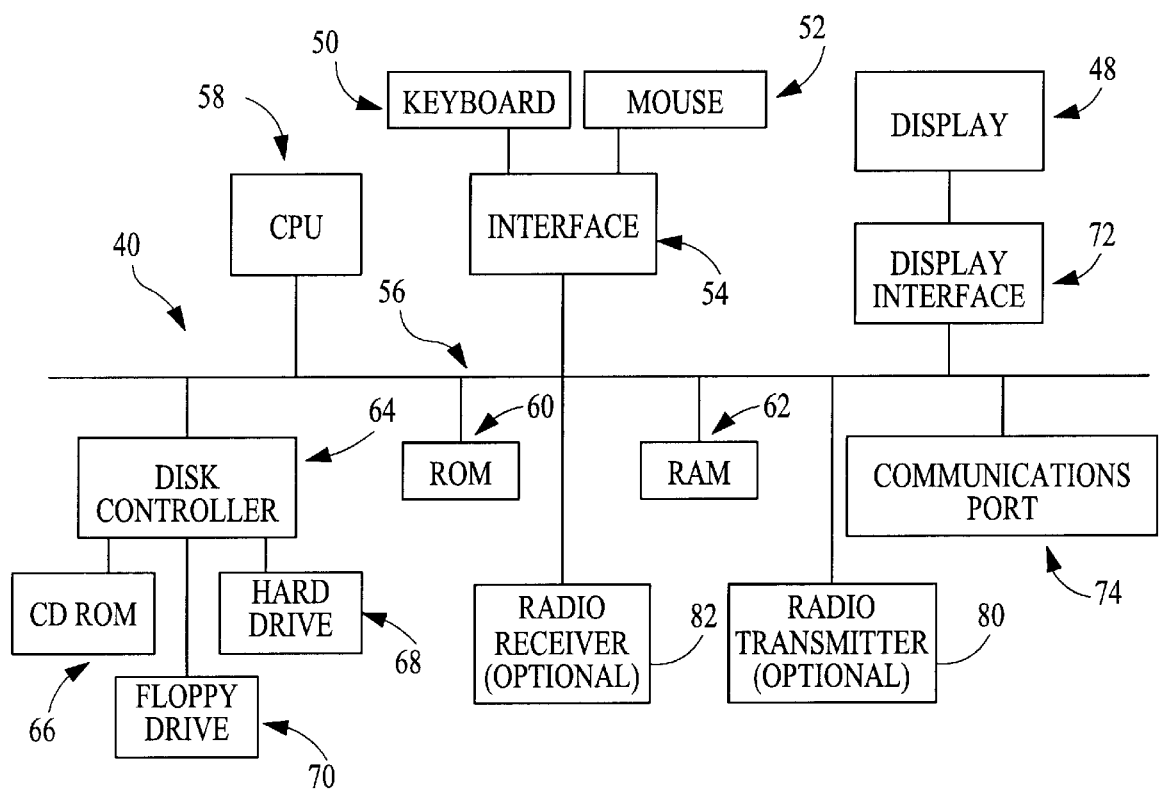
FIG. 22 is a block diagram of the internal hardware of the computer of FIG. 20 in accordance with a second embodiment.

FIG. 22 is a block diagram of the internal hardware of the computer of FIG. 20 in accordance with a second embodiment. In FIG. 22, instead of utilizing an infrared transmitter or infrared receiver, the computer system uses at least one of a low power radio transmitter 80 and/or a low power radio receiver 82. The low power radio transmitter 80 transmits the signal for reception by components of the production process, and receives signals from the components via the low power radio receiver 82. The low power radio transmitter and/or receiver 80, 82 are standard devices in industry.

Figure 23:
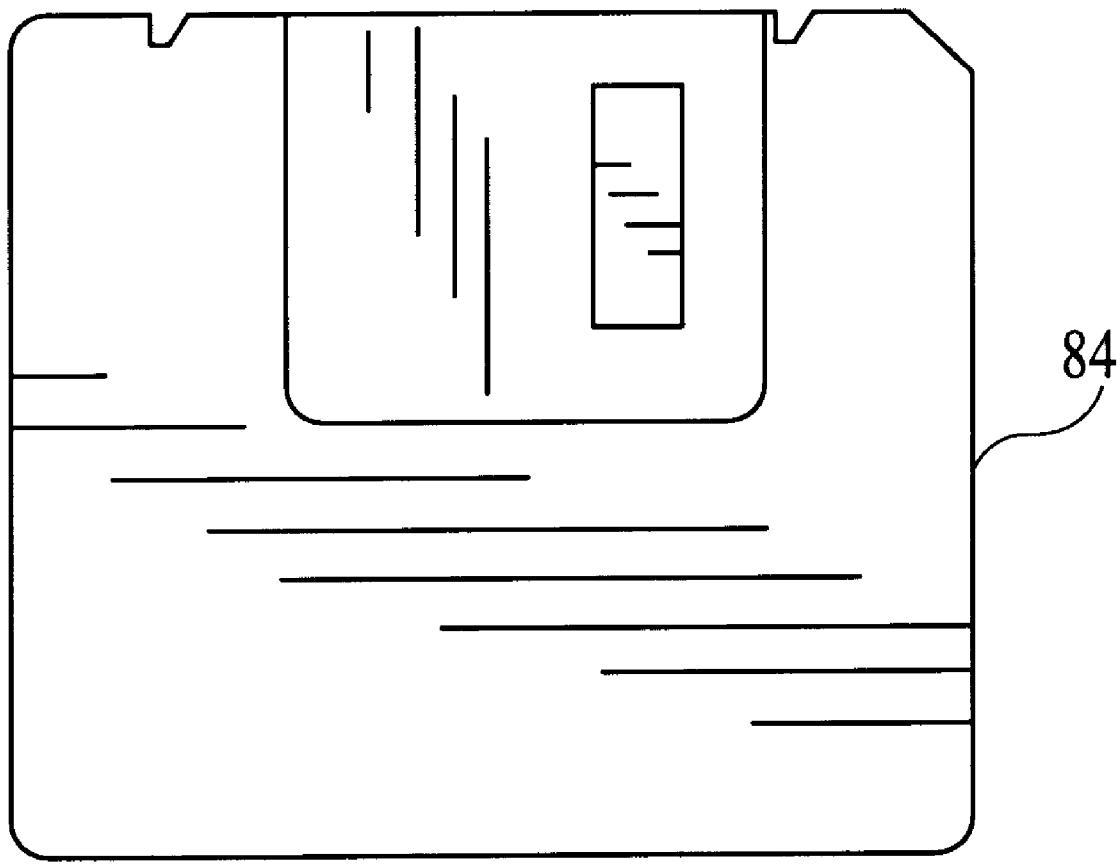
FIG. 23 is an illustration of an exemplary memory medium which can be used with disk drives illustrated in FIGS. 20–22.

FIG. 23 is an illustration of an exemplary memory medium which can be used with disk drives illustrated in FIGS. 20–22. Typically, memory media such as floppy disks, or a CD ROM, or a digital video disk will contain, for example, a multi-byte locale for a single byte language and the program information for controlling the computer to enable the computer to perform the functions described herein. Alternatively, ROM 60 and/or RAM 62 illustrated in FIGS. 15–16 can also be used to store the program information that is used to instruct the central processing unit 58 to perform the operations associated with the production process.

Although processing system 40 is illustrated having a single processor, a single hard disk drive and a single local memory, processing system 40 may suitably be equipped with any multitude or combination of processors or storage devices. Processing system 40 may, in point of fact, be replaced by, or combined with, any suitable processing system operative in accordance with the principles of the present invention, including sophisticated calculators, and hand-held, laptop/notebook, mini, mainframe and super computers, as well as processing system network combinations of the same.

Conventional processing system architecture is more fully discussed in *Computer Organization and Architecture,* by William Stallings, MacMillam Publishing Co. (3rd ed. 1993); conventional processing system network design is more fully discussed in *Data Network Design,* by Darren L. Spohn, McGraw-Hill, Inc. (1993), and conventional data communications is more fully discussed in *Data Communications Principles,* by R. D. Gitlin, J. F. Hayes and S. B. Weinstain, Plenum Press (1992) and in *The Irwin Handbook of Telecommunications,* by James Harry Green, Irwin Professional Publishing (2nd ed. 1992). Each of the foregoing publications is incorporated herein by reference. Alternatively, the hardware configuration may be arranged according to the multiple instruction multiple data (MIMD) multiprocessor format for additional computing efficiency. The details of this form of computer architecture are disclosed in greater detail in, for example, U.S. Pat. No. 5,163,131; Boxer, A., Where Buses Cannot Go, IEEE Spectrum, February 1995, pp. 41–45; and Barroso, L. A. et al., RPM: A Rapid Prototyping Engine for Multiprocessor Systems, IEEE Computer February 1995, pp. 26–34, all of which are incorporated herein by reference.

In alternate preferred embodiments, the above-identified processor, and in particular microprocessing circuit 58, may be replaced by or combined with any other suitable processing circuits, including programmable logic devices, such as PALs (programmable array logic) and PLAs (programmable logic arrays). DSPs (digital signal processors), FPGAs (field programmable gate arrays), ASICs (application specific integrated circuits), VLSIs (very large scale integrated circuits) or the like.

Figure 24:
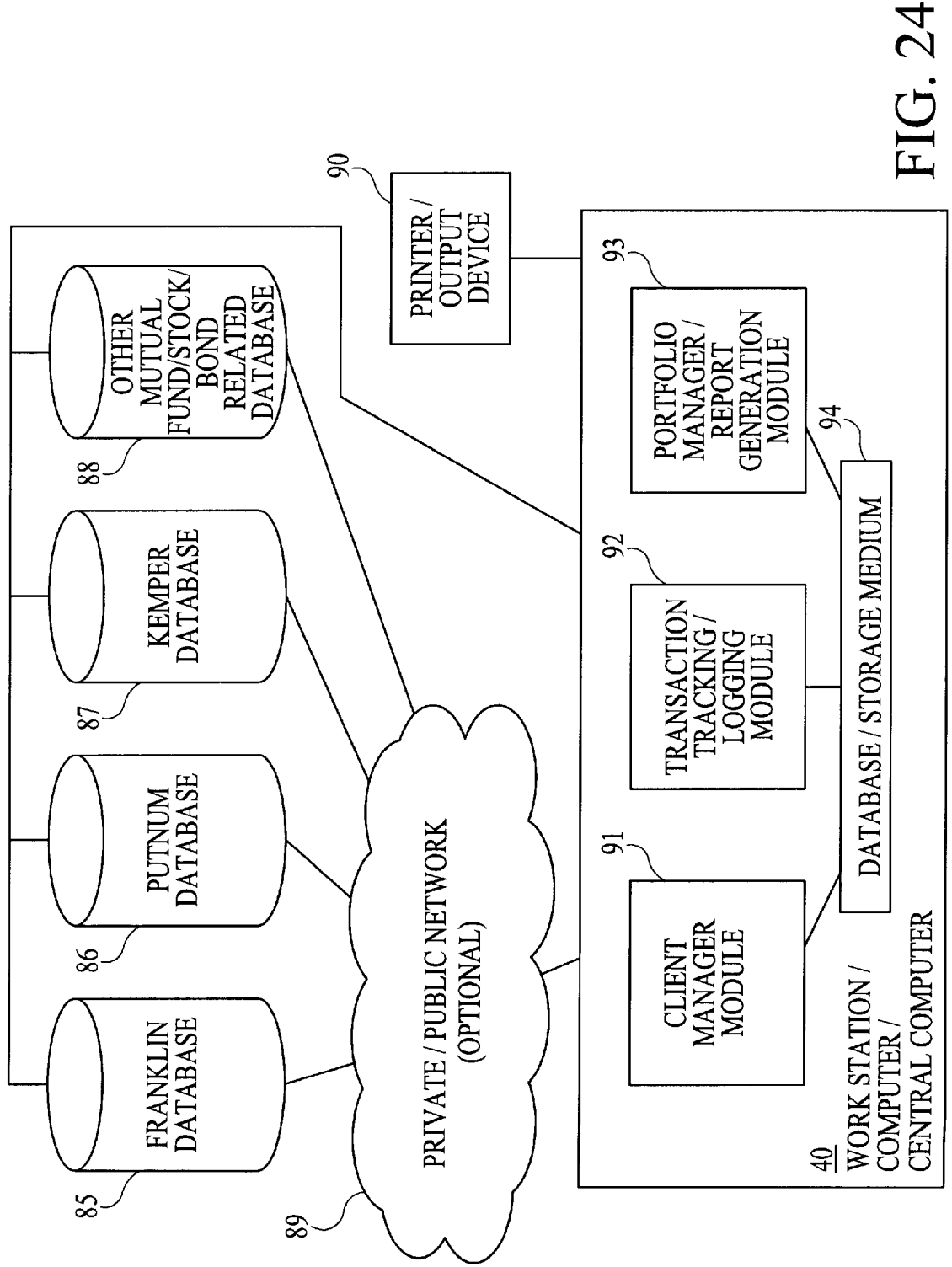
FIG. 24 is an illustration of the functional operation of the main central processing unit illustrated in FIGS. 20–23.

FIG. 24 is an illustration of the functional operation of the main central processing system illustrated in FIGS. 20–23. In FIG. 24, main central processing unit 40 interfaces with various external databases 85–88 to obtain the necessary information for tracking the performance of the resources. Main central processing unit 40 may be hardwired or directly connected to databases 85–88, or alternatively, access databases 85–88 via a private and/or public network 89.

Main central processing unit 40 is connected to an output device 90 for generating the report for the customer, and possibly the beneficiary. The output device 90 may be a printer, or other output device such as a facsimile, electronic mail, and the like. Main central processing unit 40 includes, for example, a client manager module 91, such as Broker's Ally manufactured by Scherrer Resources, Inc. of Philadelphia, Pa. that may be modified to perform the functions described herein.

Main central processing unit 40 includes, for example, a transaction tracking or logging module 92, such as the functionality provided by the Excel Software package manufactured by Microsoft Corporation that may be modified to perform the functions described herein. Main central processing unit 40 also includes, for example, a portfolio manager/report generator module 91, such as Axys manufactured by Advent Software, Inc. of San Francisco, Calif., that may be modified to perform the functions described herein. Other suitable software packages are also available that may be modified to perform the functions described herein.

Figure 25:
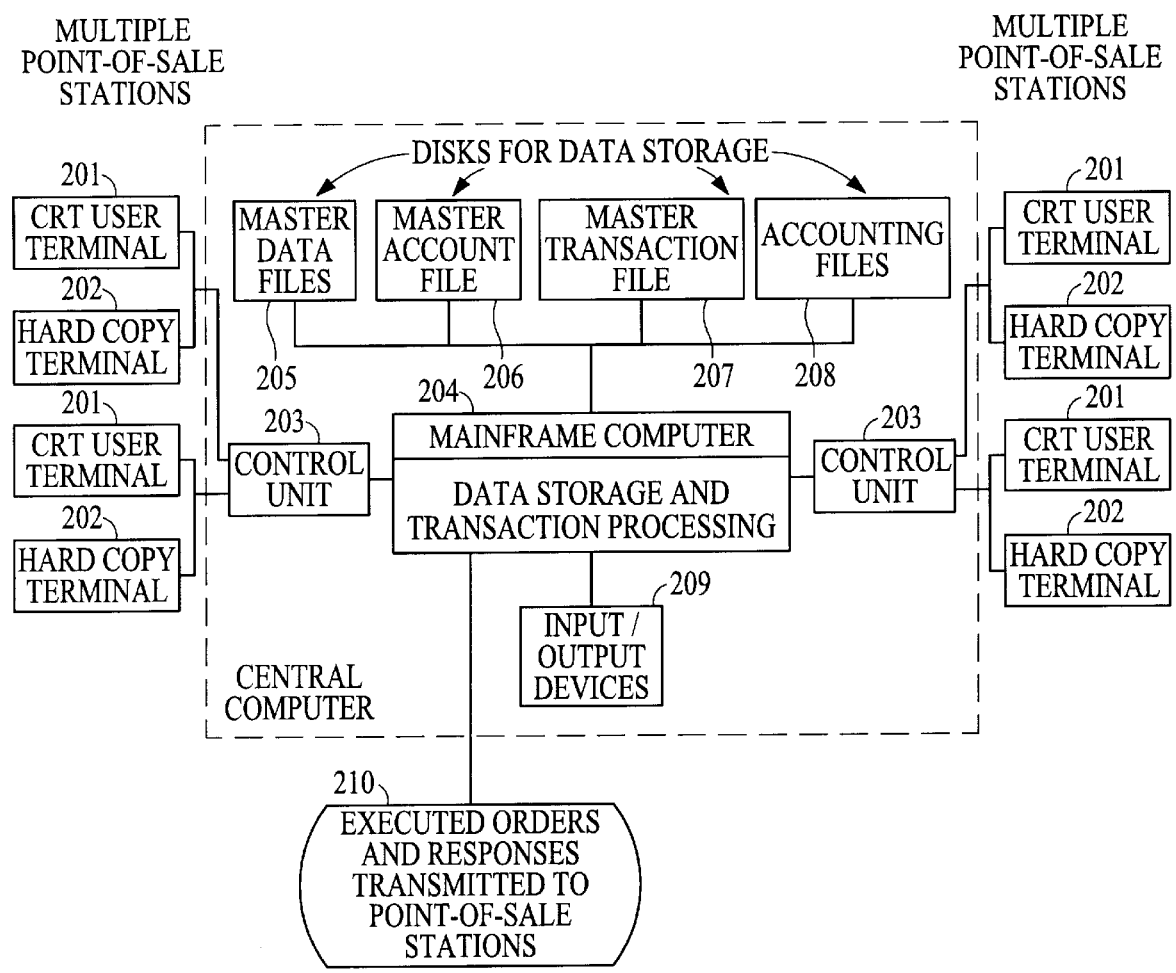
FIG. 25 is a block diagram of an alternative computer system suitable for implementing the invention.

FIG. 25 is a block diagram of an alternative computer system suitable for implementing the invention. At each point-of-sale station, there is a CRT user terminal 201 and associated hard copy terminal 202. The hardware system would include a plurality of these terminals. Each terminal communicates with a central computer 204 through a control unit 203, which controls the point-of-sale terminals, receives purchase orders, redemption orders, and account inquiries from the point-of-sale stations and transmits them to the central computer and receives account verifications, transaction verifications, current market conditions, and responses to customer inquiries regarding account status from the central computer 204 and transmits them to the appropriate point-of-sale stations.

Each control unit could serve up to, for example, approximately 20 point-of-sale stations. The account verifications, transaction verifications, current market conditions, and responses to customer inquiries are transmitted first to the CRT user terminal 201. If the investor requests a written transaction record or a written account status report, the hard copy terminal 202 provides it upon command.

The central computer 204 contains storage space for data relating to transactions that are in process; processes all purchase and redemption transactions; performs the investment portfolio update operation; conducts the management information reporting operation and the period-by-period investment performance monitoring operation; calculates the investment income and taxable income generated periodically in each account; and performs the individual investor record-keeping and reporting operation.

The central computer 204 transmits information to and receives information from the master data files 205 as required in order to retrieve the schedule of contractual early withdrawal penalties, calculate escalation index values, retrieve current and projected market data and current and projected inflation rates, perform the investment portfolio update operation, conduct the management information reporting operation and the period-by-period investment performance monitoring operation, and retrieve the escalation rates needed to calculate an investor's taxable income.

The central computer 204 also transmits information to and receives information from the master account file 206. The central computer 204 also transmits information to and receives information from the master transaction file 207 in connection with purchase and redemption transactions and in connection with management information reporting operation. The central computer 204 also transmits end-of-period financial statements to the accounting files 208 for storage and retrieves these statements from the accounting files 208 when prompted by the input/output devices of the central computer 209.

The system manager has a complement of input/output devices 209. Into the input devices are entered requests for the daily and periodic reports to the fund manager, the management information reports, the period-by-period investment performance reports, and the individual investor reports and instructions for managing and controlling the hardware system and its software. The output devices are used to obtain the daily and periodic reports to the fund manager, the management information reports, the period-by-period investment performance reports, and the individual investor reports.

Figure 26:
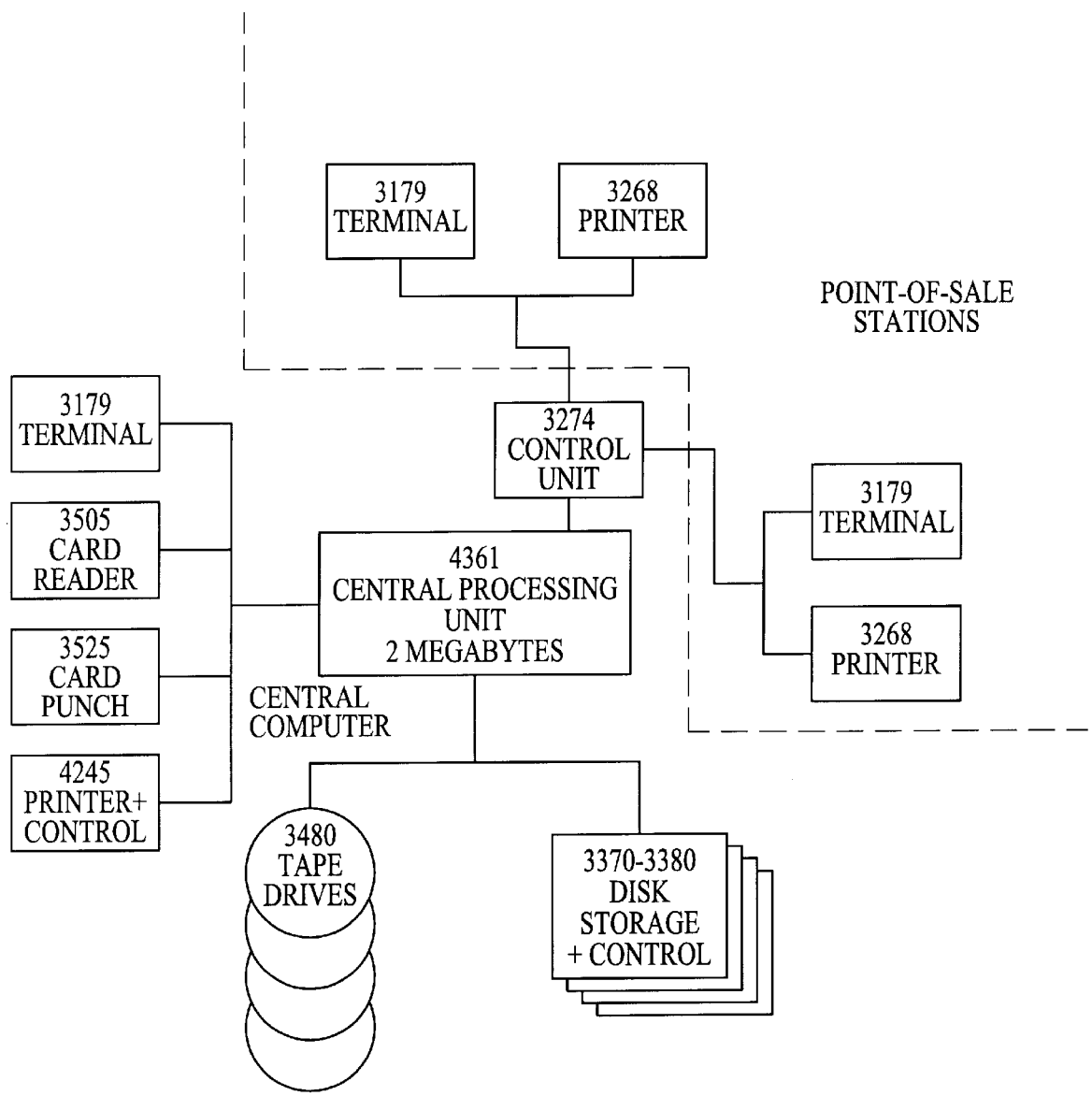
FIG. 26 is a block diagram showing a portion of the computer system of FIG. 25 in more detail.

FIG. 26 is a block diagram showing a portion of the computer system of FIG. 25 in more detail. The exemplary system includes the following types of devices:

| Make Model | Item in FIG. 25 |
| --- | --- |
| IBM 3278 or 3279 or 3179 | CRT user terminal 201 |
| IBM 3268 | Hard copy terminal 202 |
| IBM 3274 | Control unit 203 |
| IBM 4361 | central computer 204 |
| IBM 3370–3380 | disks 205–208 |
| IBM 3420 or 3480 | tape drives 205–208 |
| IBM 3179 | CRT terminal 209 |
| IBM 3505 | card reader 209 |
| IBM 3525 | card punch 209 |
| IBM 4245 | printer 209 |

It is to be understood that there are a large number of commercially available substitutes for each item of hardware which could be combined into fully compatible systems. Accordingly, the scope of the invention is not limited by the particularity of the hardware system described herein.

The methods which are described herein, are implemented, for example, on the hardware system(s) described in FIG. 25 (or other suitable computer system) by embodying the flow-charted routines into a series of software packages that substantially follow the sequence of steps in the flow charts. There are conventional software packages that are commercially available that can also be adapted to perform one or more of the steps described herein. Accordingly, as described below, it would not be necessary in order to implement the invention to write separate software for each step from scratch.

The Point-of Sale software package marketed by International Business Machines (IBM), for example, is a general interactive data package for point-of-sale applications that can be formatted to provide the precise means of receiving customer orders and inquiries, and transmitting the responses to customer inquiries, and the transaction reports.

The Interactive Financial Systems (IFS) library of software packages marketed by IBM, for example, contains a set of general financial and accounting packages that can be adapted and formatted to provide the data base management, accounting, and financial reporting operations required to implement the invention. Part I of IFS contains data base management routines, which can be used to manage the master data files 205, the master account file 206, the master transaction file 207, and the accounting files 208. It also contains routines that can be adapted to handle the account management functions.

Part II of IFS contains general routines that cover general ledger maintenance and the preparation of financial statements and related schedules. It can be adapted and formatted to provide the precise means of preparing the daily transaction summary and summary of current position; the end-of-period investment performance and position report; the end-of-period reports to account holders; the end-of-period financial statements; and the report to the fund manager. Part III of IFS can be adapted to monitor accounts receivable. As an alternative to the IFS software package, the MSA software package produced by Management Science of America can be used.

The VSE/SP software package marketed by IBM contains a complete software package for operating the hardware system diagramed in FIGS. 19–20. It is possible to write the software needed to implement each of the other routines in one of the available user languages, such as FORTRAN, Pascal, C, C++, and the like, by following the sequence of steps described herein.

Figure 27:
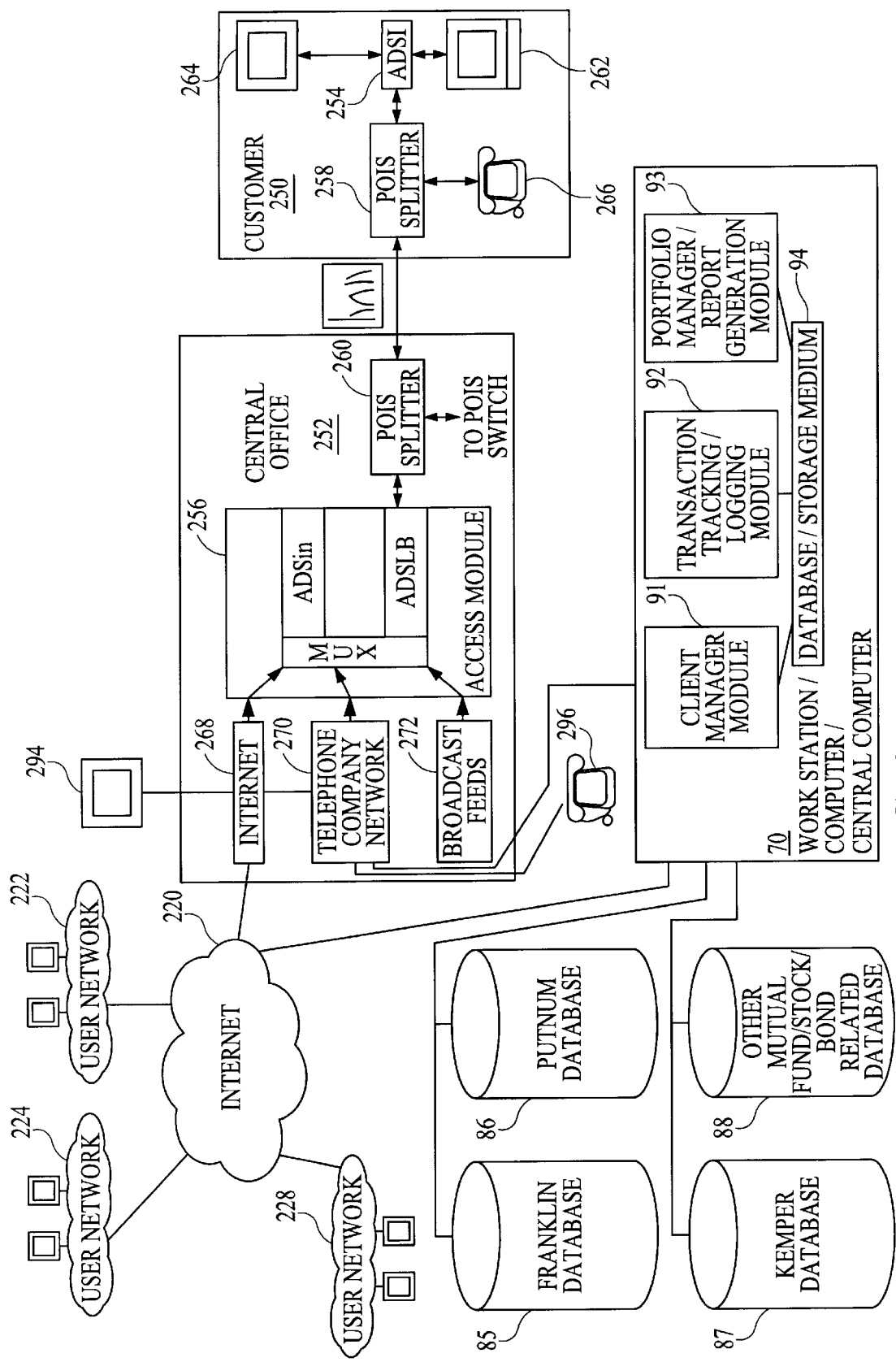
FIG. 27 is an illustration of the architecture of the combined internet, POTS, and ADSL architecture for use in the present invention in accordance with a first embodiment.

FIG. 27 is an illustration of the architecture of the combined internet, POTS, and ADSL architecture for use in the present invention in accordance with a first embodiment. In FIG. 27, to preserve POTS and to prevent a fault in the ADSL equipment 254, 256 from compromising analog voice traffic 226, 296 the voice part of the spectrum (the lowest 4 kHz) is separated from the rest by a passive filter, called a POTS splitter 258, 260. The rest of the available bandwidth—from about 10 kHz to 1 MHZ—carries data at rates up to 6 bits per second for every hertz of bandwidth from data equipment 262, 264, 294. The ADSL equipment 256 then has access to a number of destinations including significantly the Internet 268, and other destinations 270, 272.

To exploit the higher frequencies, ADSL makes use of advanced modulation techniques, of which the best known is the discrete multitone (DMT) technology. As its name implies, ADSL transmits data asymmetrically—at different rates upstream toward the central office 252 and downstream toward the subscriber 250.

Cable television providers are providing analogous Internet service to PC users over their TV cable systems by means of special cable modems. Such modems are capable of transmitting up to 30 Mb/s over hybrid fiber/coax systems, which use fiber to bring signals to a neighborhood and coax to distribute it to individual subscribers.

Cable modems come in many forms. Most create a downstream data stream out of one of the 6-MHZ TV channels that occupy spectrum above 50 MHZ (and more likely 550 MHZ) and carve an upstream channel out of the 5–50-MHZ band, which is currently unused. Using 64-state quadrature amplitude modulation (64 QAM), a downstream channel can realistically transmit about 30 Mb/s (the oft-quoted lower speed of 10 Mb/s refers to PC rates associated with Ethernet connections). Upstream rates differ considerably from vendor to vendor, but good hybrid fiber/coax systems can deliver upstream speeds of a few megabits per second. Thus, like ADSL, cable modems transmit much more information downstream than upstream.

The internet architecture 220 and ADSL architecture 354, 356 may also be combined with, for example, user networks 222, 224, and 228. As illustrated in this first embodiment, users may access or use or participate in the administration, management computer assisted program in computer 40 via various different access methods. In this first embodiment, the various databases are only accessible via access to and/or by computer system 40.

Figure 28:
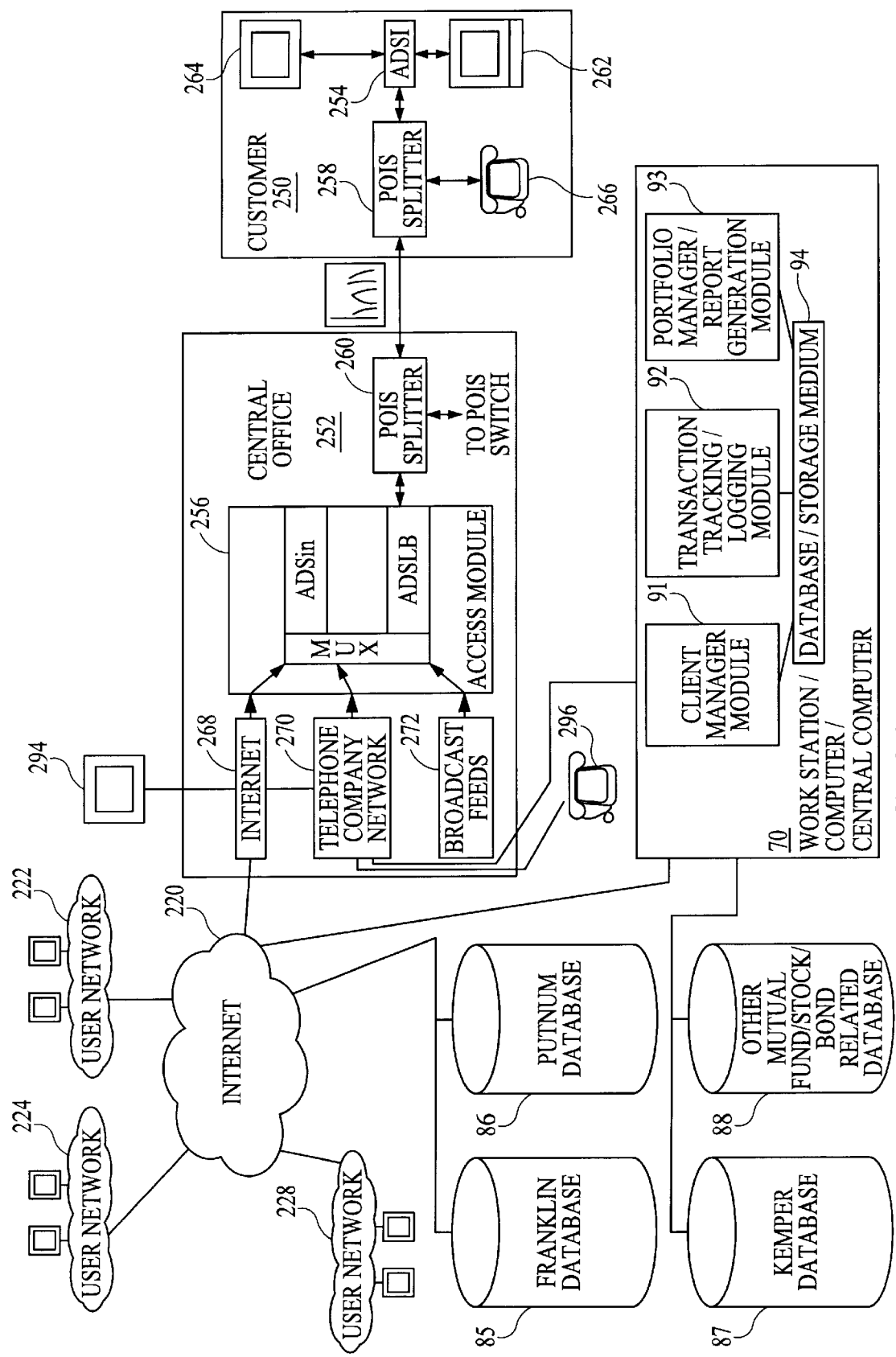
FIG. 28 is an illustration of the architecture of the combined internet, POTS, and ADSL architecture for use in the present invention in accordance with a second embodiment.

FIG. 28 is an illustration of the architecture of the combined internet, POTS, and ADSL architecture for use in the present invention in accordance with a second embodiment. As illustrated in this second embodiment, users may access or use or participate in the administration, management computer assisted program in computer 40 via various different access methods. In this second embodiment, some databases (e.g., 87, 88) are only accessible via access to and/or by computer system 40, and other databases (e.g., 85, 86) are only accessible via access to and/or by internet 220.

Figure 29:
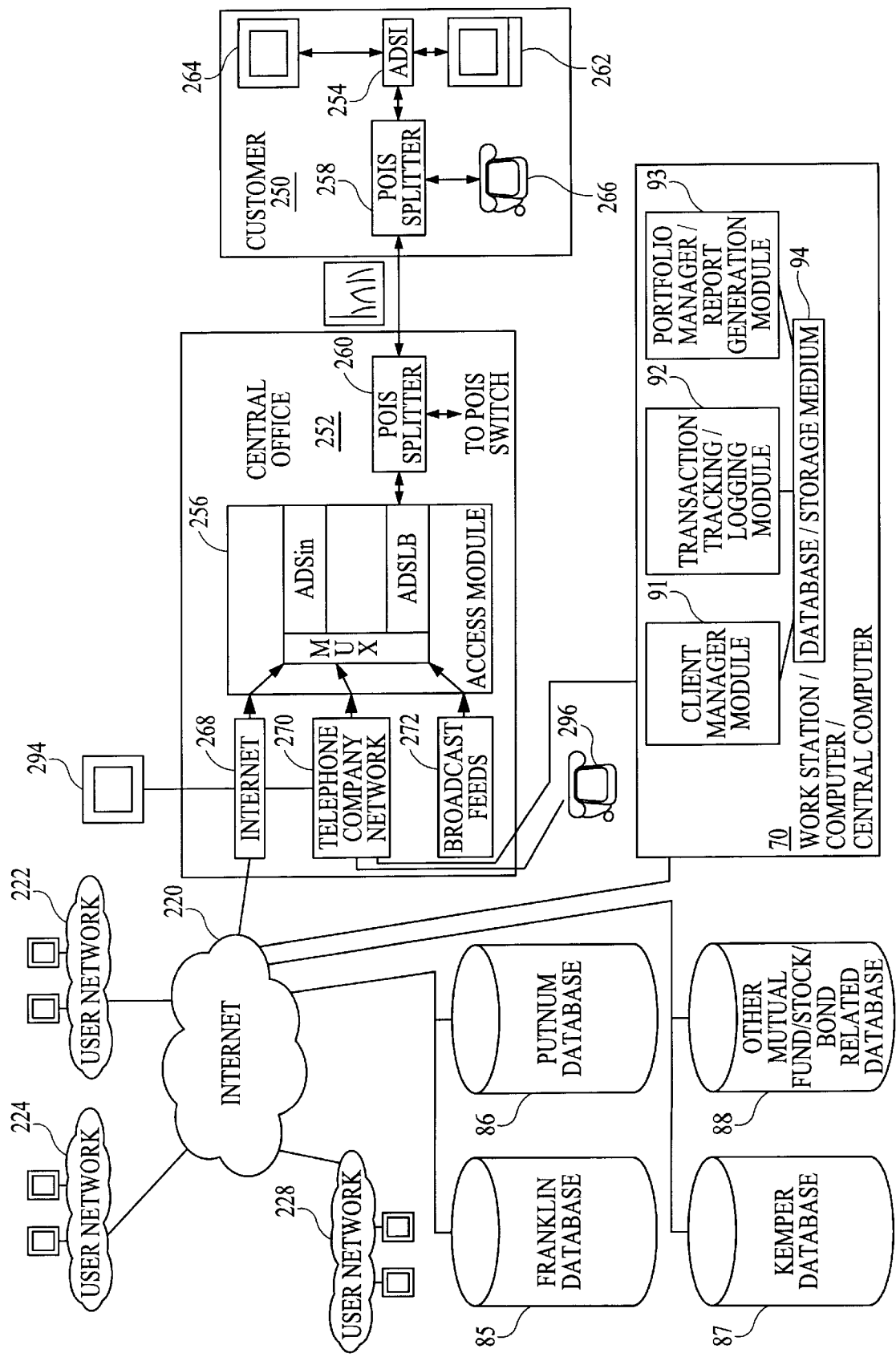
FIG. 29 is an illustration of the architecture of the combined internet, POTS, and ADSL architecture for use in the present invention in accordance with a third embodiment.

FIG. 29 is an illustration of the architecture of the combined internet, POTS, and ADSL architecture for use in the present invention in accordance with a third embodiment. As illustrated in this third embodiment, users may access or use or participate in the administration, management computer assisted program in computer 40 via various different access methods. In this third embodiment, the databases (e.g., 85, 86, 87 and/or 88) are only accessible via access to and/or by internet 220.

Figure 30:
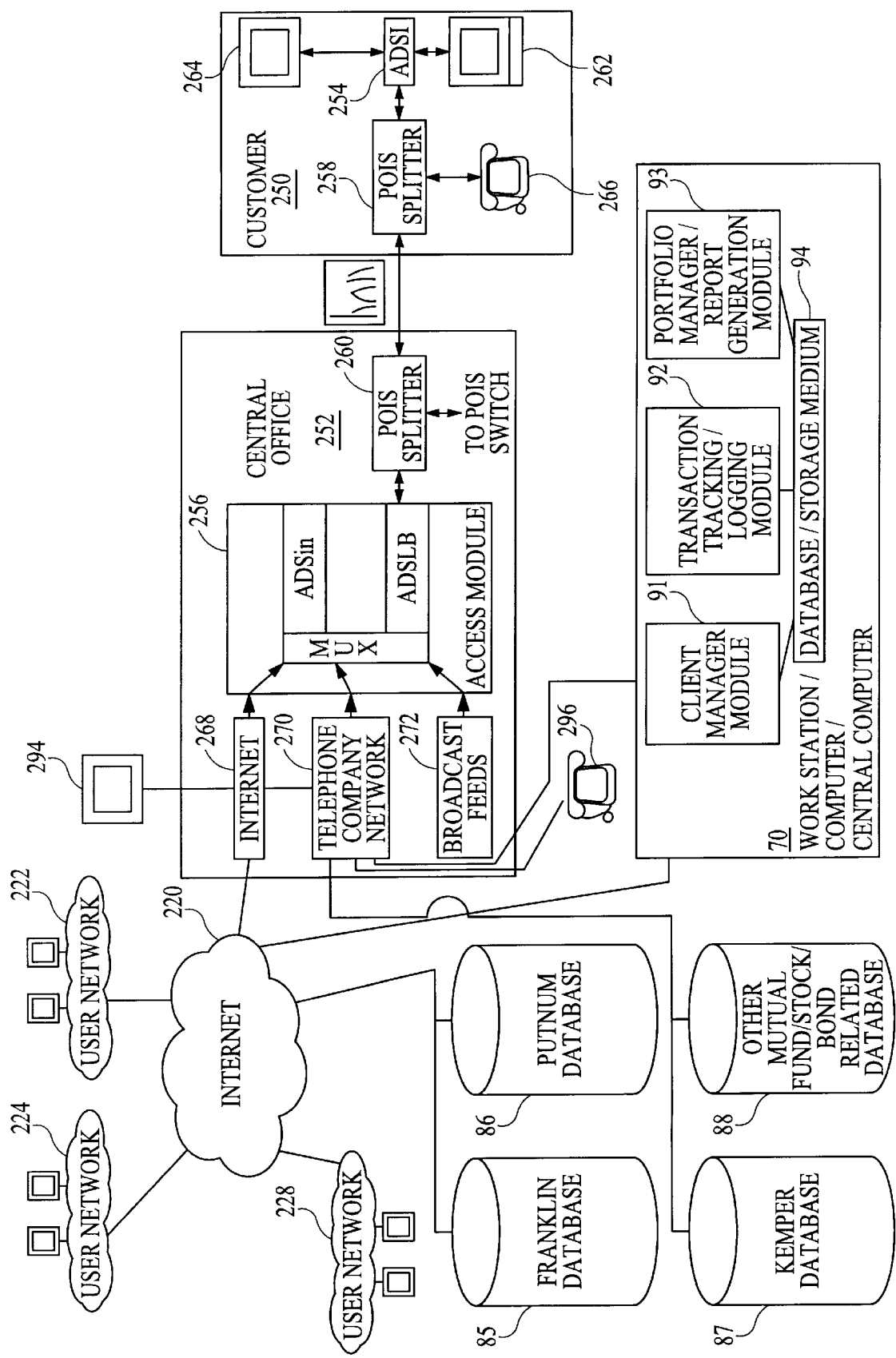
FIG. 30 is an illustration of the architecture of the combined internet, POTS, and ADSL architecture for use in the present invention in accordance with a fourth embodiment.

FIG. 30 is an illustration of the architecture of the combined internet, POTS, and ADSL architecture for use in the present invention in accordance with a fourth embodiment. As illustrated in this fourth embodiment, users may access or use or participate in the administration, management computer assisted program in computer 40 via various different access methods. In this fourth embodiment, some databases (e.g., 87, 88) are only accessible via access to and/or by ADSL system 256 via interface network 270, and other databases (e.g., 85, 86) are only accessible via access to and/or by internet 220.

The above embodiments are only to be construed as examples of the various different types of computer systems that may be utilized in connection with the computer assisted-implemented process for managing and/or administering the retirement and/or investment resources.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

Appended to this application are exemplary materials which can be used with or generated by the present inventive computer-assisted and/or implemented process for administering investment and/or retirement resources. Appendix A illustrates an exemplary letter that the user may send to the grantor if the grantor wishes to enroll in a program using the computer-assisted and/or implemented process for administering retirement and/or investment resources. Appendix B is a form that explains the steps which the grantor may take to enroll in the program. Appendix C illustrates an exemplary letter that the user may provide to an attorney to invite the attorney to join the attorney network. Appendix D is a form that explains the steps which an attorney may take to enroll in the attorney network. Appendix E is an exemplary agreement between the user and an attorney who enrolls in the attorney network. Finally, Appendix F is an exemplary letter that can be used to welcome an attorney into the attorney network.

APPENDIX A

EXEMPLARY GRANTOR CONFIRMATION LETTER

Dear Grantor,

Enclosed are your confirmation materials for enrolling in the trust program. Please take a moment to review this letter and the accompanying materials so you'll understand exactly what to do in order to establish the Trust. It is important that you keep all these materials in a safe place until you meet with your attorney.

The following describes what you should do:

1) Contact an attorney listed in the enclosed Trust Attorney Network Directory. You will find a list of attorneys who can draft the legal documents you need. Make sue you find an attorney you feel comfortable working with. The attorney will meet with you, explain how the Trust works, and answer all of your questions. The Trust is available only from attorneys who are members of the Trust Attorney Network. If you wish to use your family attorney, you can. If he or she is not currently a member of the network, ask the attorney to call (name financial advisor) at (insert phone number) to obtain the necessary information for becoming a member of the network.

2) After your attorney prepares the Trust for you, your attorney will instruct you to find the Trust by sending a check for the amount of your contribution ($5,000 minimum; there is no maximum) made payable to (name trustee) (unless you designate another trustee) and mail it, along with a copy of the completed trust agreement, to (name financial advisor). For information regarding the investment that will be used to fund the Trust, please refer to the investment information packet included with the Trust Consumer Information Kit. Unless you designate another Financial Advisor, one of the financial advisors of (name financial advisor) will help you invest the contribution.

By using both (name financial advisor) and (name trustee), all investment advisory fees and trustee fees will be waived for the entire life of your Trust, provided the Specimen Trust Agreement is used. Use of other trustees or financial advisors could result in fees that are otherwise avoided, which could diminish the future value of the Trust's assets for the child.

3) Give the $150 Certificate to your attorney. The certificate can be used with all participating attorneys of the Network. We suggest that you shop around with different network-affiliated attorneys to find one you are comfortable working with and whose fees you find acceptable. Depending on the attorney you select, the $150 Certificate may or may not cover the total cost of preparing a Trust agreement. Fees will vary with each attorney, and (name financial advisor) has no input on the fees that are established by each attorney. (Note: Treat the Certificate like a traveler's check. Each Certificate contains a serial number. It is important that you keep the Certificate in a safe place. If you lose it, notify us immediately for replacement.)

If you have any questions, please feel free to contact us at (insert phone number). We are happy to assist you in your efforts to provide a child you love with a secure financial future.

APPENDIX B

EASY STEPS TO ESTABLISH A TRUST

1. Contact an attorney who can prepare a Trust for you. Look for an attorney in your area using the Trust Attorney Network Directory. If you have an attorney who is not already a member of the Attorney Network, ask him or her to join the Network. Attorneys can learn more about it by calling (insert phone). Only attorneys who are members of the Trust Attorney Network have access to and are authorized to provide you with the Trust Specimen Trust Agreement.

2. When meeting with the attorney you selected, bring with you the following information:
   a) The full legal name of each child for whom you wish to establish a Trust.
   b) The date of birth of each child.
   c) The Social Security Number of each child.

3. Your attorney will prepare one Trust Specimen Trust Agreement for each child you designate. When you receive the Agreement(s), give your attorney the $150 Certificate(s) as full or partial payment.

The Certificates are enclosed in this packet. Please treat them with care. If they become lost, please contact us for replacement by calling (insert phone number).

4. Send to us at (name financial advisor) the following:
    a) a copy of each trust Agreement.
    b) a Trust Transmittal form. Please use one Transmittal form (enclosed) for each Trust. You may make copies of this form as needed, and extra Transmittals are available from your lawyer or by calling us at (insert phone number). The Transmittal provides us with the following information:
        i) The Trust's name
        ii) The Grantor's name (and Co-Grantor's name, if any) and telephone number
        iii) The attorney's name and telephone number
        iv) The financial advisor's name and telephone number
        v) The contribution amount
    c) a check for the amount of your one-time contribution to each Trust
        i) Separate checks are required for each Trust
        ii) Each check must be for $5,000 or more
        iii) Make each check payable to (name trustee)
5. Send everything to us in the enclosed envelope, or mail to:
    (insert financial advisor address)

That's all there is to it! When we receive the above items, we will forward your paperwork to your Financial Advisor, and send you confirmation. When the Trust's investment accounts are established, you will receive separate confirmation.

APPENDIX C

ATTORNEY COVER LETTER

Dear Attorney,

I want to inform you about a new product that could help you help your clients. It is quite likely that your clients will be asking you about it, so I thought you would want to be aware of it.

The product is a Trust that enables a person to save for the retirement of a child they love. While this Trust can be established by any person, most grantors, as you might expect, will be parents or grandparents.

The concept may seem unusual because such Trusts are typically taxed at high rates, or allow for the transfer of assets to the child when he or she turns 18 or 21. But I have a product designed to overcome the economic, legal and tax hurdles involved. Thus, it's now possible to create this trust for the benefit of a child so that the money cannot be touched until the child turns at least 59½ years old—and in the meantime, there will be no annual income tax liability.

These advantages make the trust extremely attractive, and even more so because it takes advantage of the one attribute that the child has in ample quantity: time. Funded with a small amount of money, the Trust has literally decades to grow and compound on itself, enabling it to potentially grow into a significant source of retirement income.

For example, if a parent or grandparent were to establish this Trust for a newborn and fund it with the $5,000 minimum, leaving it untouched until the child reaches age 65, it would be worth $2,451,854, assuming a 10% annual return. (This is just an example. It is not indicative of a specific result of any particular investment, and does not take into consideration taxes, inflation, or fluctuations in value.)

I know there are a lot of parents and grandparents who would take advantage of such a Trust for their children. More than five thousand families have already contacted me about it—even before we started making it available! However, to establish this Trust, consumers need an attorney, like you, to review their needs and prepare appropriate legal documents for them.

That's why I'm sending you this letter. As the creator of the Trust, I am looking for attorneys who are interested in joining a network of attorneys who can serve the people who want to open one of these Trusts. When you join this network, I will be able to give your name to consumers who want to know which lawyers can help them establish the Trust.

Upon receipt of their enrollment form, (name financial advisor) will provide consumers with the names and contact information of all participating attorneys in the Trust Attorney Network who can prepare Trusts for them. Currently, there is also a national network of financial advisors who can recommend the Trust to their clients. They too may need the services of a participating member attorney.

As the creator of the Trust, I made enrolling as easy as possible for people. First, they complete and return an enrollment form and one-time fee to (name financial advisor). Upon receipt of their materials, (name financial advisor) will send them a confirmation letter, an attorney directory which would include our name and bio information as a member, and a $150 certificate, good for the payment of legal fees with a Network attorney.

Since a Trust is a legal document, it requires you, the attorney, to prepare the Trust. That's why I created an attorney directory, to make it easy for consumers to locate you.

The way it works is a prospective client calls you from the Attorney directory. Your job is to evaluate your client's needs and, assuming you find the Trust appropriate, you create a Trust for their child and they—in turn—give you the $150 certificate, which they received in their enrollment kit. You send the certificate back to (name financial advisor), which will send you a check for $150.

This certificate is not to suggest your fees will or should be limited to $150. You're welcome to charge any fee you wish. Or you can let the $150 serve as the total cost, and let the Trust serve as a way to introduce yourself to the client. The choice of fees is yours. I have no say in the matter. It is strictly between you and your client.

After you prepare a Trust Agreement for your client (the Trust's Grantor), a trustee is selected. [name trustee] has agreed to provide its services for free for the entire life of the Trust, provided that the specimen trust document is used.

Your client will fund the Trust by making a one-time contribution (minimum $5,000) for the benefit of the child your client selects.

[Name financial advisor] will be the Trust's initial Financial Advisor unless your client selects a different financial advisor.

The Trust will purchase a variable annuity. A prospectus for the variable annuity, which describes the applicable fees and charges, will be provided by the financial advisor to each grantor of a Trust before he or she sends money. Additional information regarding the variable annuity is enclosed for your review. The appropriate allocation of investments in the proposed annuity will be managed by the financial advisor for the entire life of the Trust.

When your client uses my firm, [the financial advisor] will waive its investment advisory fee for the entire life of the Trust. That means your client's Trust will have the opportunity to grow at an even faster rate. If another financial advisor or trustee is selected, there could be fees incurred which could reduce the eventual value of the Trust for the child.

When the child reaches the age of distribution (designated by the Grantor), the Trust assets will be distributed to the child. The child will have the option of receiving the proceeds in one lump sum, or as a series of monthly payments for the rest of his or her life, among other income options. Because no taxes are due on the money throughout the life of the Trust, the child will incur income taxes at his or her tax rate when he or she receives the income in retirement.

If the child dies prior to the age of distribution, the Trust assets will be distributed as part of the child's probate estate. You'll get full details inside the membership information kit that I want to send you.

One important point about the Trust is that it is designed to benefit only one child. That means if your clients wants to give this gift of retirement security to more than one child, a separate Trust must be created for each child. And your clients can create as many Trusts for as many children as they'd like.

As a member of the Trust Attorney Network, you'll receive the benefits shown below. Of course, you will need to determine under your state bar rules that these marketing materials will work for you:

Complete Trust Electronic Specimen Documents—The documents come in both print and electronic format and have been prepared by established trust and estate attorneys. You can modify the document as you wish, based on your determination of what's best for your client. Remember, too, that if the specimen trust agreement works for your clients "as is", then they have the added benefit of (name trustee) serving as trustee without a fee.

Free Marketing Materials to Help You Promote Your Law Practice—membership also includes pre-approved materials for you to promote the Trust and your law practice to the general public. I will give you everything you need to place advertisements in local newspapers and journals. I also will give you ready-to-use, pre-approved postcards personalized for your firm, which you can send to existing clients and prospective clients.

Free Table-Top Promotional Literature—Since you have clients who visit your office, I'll give you free promotional literature about the Trust. You can display it in your reception area to introduce the Trust to your clients and prompt them to ask you about it.

(Please note that other than personalization, these materials may not be altered without prior approval.)

50% Marketing Reimbursement Program—I'm also willing to reimburse you for one half of any expenses you incur to promote the Trust, including newspaper ads and postcard mailings. Of course, all reimbursement is subject to prior approval, which will be readily granted if you use my supplied artwork.

$150 Credit for Each Trust You Draft—Every participating consumer will receive in their Trust enrollment kit a $150 Certificate. It was designed so they could use it as full or partial payment for the legal services they incur when hiring you to draft the Trust. Again, the choice of fees is yours. I have no say in the matter, It is strictly between you and your client. The relationship between you and us should be disclosed to your clients consistent with the lawyers rules of professional responsibility.

As you can see, there are several benefits to joining the Trust Attorney Network.

The introductory membership fees is (insert fee) a year. See for yourself how effective this program is. For the next twelve months I invite you to discover how advantageous the Trust Attorney Network can be for you.

And your membership fee is completely risk-free. If at any time in the first 90 days you are not pleased with your membership, I'll refund the entire (insert fee). No questions asked.

So please join me now as we strive to revolutionize the way Americans save for retirement. You'll secure the low introductory membership rate of (insert fee) and enjoy all the benefits mentioned before.

Simply complete the Trust Attorney Network License Agreement enclosed and return with payment. [name]

APPENDIX D

FIVE EASY STEPS TO BECOMING A MEMBER OF THE TRUST ATTORNEY NETWORK

1. Complete the Membership Certificate.
2. Attach a separate sheet providing a brief description of yourself and/or your firm. This will appear in the Directory along with your listing. Include any special offers you'd like to make, or use this opportunity to display your credentials, personal or professional background, or any other information you wish. Please limit your description to approximately 100 words.
3. Your packet contains two copies of the Attorney License Agreement. Simply fill in the blanks on pages one and five, and sign the agreement on page six. Return both copies to us; we will countersign each copy and return one to you for your records.
4. If you want to charge your membership fee to your credit card, be sure to provide your card information and sign the Membership Certificate. If you prefer to pay by check, include it with the other materials you return to us.
5. Mail everything to us in the postage-paid envelope provided, or send to:

(insert address)

APPENDIX E

ATTORNEY LICENSE AGREEMENT

THIS LICENSE AGREEMENT made this ___ day of _____ 19__, between (name financial advisor) (hereinafter called "Licensor"), and _____, a duly licensed attorney-at-law, who is authorized to engage in the active practice of law in the State(s) of _____ for the purpose of services to be provided with respect to the license granted herein (hereinafter called "Licensee").

WITNESSETH:

WHEREAS, Licensor owns certain valuable registered and common law intellectual property rights, and documents and related trademarks and service marks listed on or attached to "Exhibit A" attached hereto and made a party hereof, including but not limited to the Trust Agreement and related materials (hereinafter collectively called the "Licensed Property"), said Licensed Property having been used in promotional material and being associated in the public mind with Licensor; and WHEREAS, Licensee desires to obtain the non-exclusive, non-transferable right to utilize certain of the Licensed Property upon and in connection with the provision of certain legal services, as hereinafter more fully referenced, to be provided by Licensee;

NOW, THEREFORE, in consideration of the mutual promises herein contained, it is hereby agreed:

1. GRANT OF LICENSE. For the term of this Agreement and subject to all the terms and conditions set forth herein, Licensor hereby grants to Licensee, and Licensee hereby accepts from Licensor the non-exclusive and non-transferable right, license and privilege of utilizing the Licensed Property and any other related written information (all of which is of a proprietary nature) furnished to Licensee by Licensor, solely upon in connection with the provision of the following client-related legal services provided by Licensee;

Utilization of the Trust Agreement form (hereinafter called the Trust) as attached hereto as part of Exhibit A, and related materials and marks to prepare for legal clients of Licensee a Trust arrangement based upon and consistent with same, with the understanding that the final language of the Trust document, all decisions regarding the suitability of the Trust for the purposes of such clients, and all modifications to the Trust form are and shall be the sole decision and responsibility of Licensee.

No other, further or different license other than that previously described herein is granted by Licensor to Licensee under this Agreement. Licensor retains the exclusive right to protect by patent, copyright or otherwise and to reproduce, publish and distribute the materials, ideas, and otherwise, with respect to the Licensed Property to any other parties who are duly licensed attorneys-at-law.

(a) Territory. Licensee agrees that it will make any use, directly or indirectly, of the Licensed Property, or any portion thereof, in any jurisdiction or area, or part thereof, other than those jurisdictions and areas in which Licensee holds a legal and valid license to engage in the active practice of law for the types of legal services envisioned herein.

(b) Term. The term of the license granted under this Agreement shall be for a period of one (1) year from the date hereof, unless sooner terminated in accordance with the provisions of this Agreement.

(c) Confidential Nature of Licensed Property; Limitations on Access to and use and Disclosure Thereof.

(1) Licensee shall notify all employees of Licensee who are given access to or use, in accordance with the terms hereof, any of the Licensed Property that disclosure of same to them is made in confidence. Such "employees" shall not include any duly licensed attorney-at-law other than Licensee, unless otherwise permitted under Section 1(c)(2) below.

(2) Licensee agrees that he or she shall in no event disclose or grant access to, or permit the use of, the Licensed Property, or any portion thereof, by any other duly licensed attorney-at-law whatsoever, for any purpose, including but not limited to participation or involvement in connection with the preparation of Trust Agreements or any documents related thereto, client meetings, discussions or contacts, or otherwise, unless such other attorney-at-law has a separate and valid Attorney License Agreement with Licensor.

(d) Non-Exclusive License. Nothing in this Agreement shall be construed to prevent Licensor from granting any other licenses for the use of the Licensed Property or from utilizing the Licensed Property in any manner whatsoever, including the granting of licenses for the use thereof to any number of other attorneys practicing law within the same geographical area, legal practice group (law firm, law professional corporation or other group duly licensed to engage in the active practice of law, or otherwise.)

2. LICENSE FEE.

(a) Licensee agrees that, upon the execution of this Agreement, he or she shall pay to Licensor the sum of [insert fee] for the licensing rights and use of materials granted hereunder.

(b) In the event that Licensee does not receive, during the one year term of this Agreement, reimbursement as proper from Licensor for sufficient certificates (at $150 each) for legal fees from Licensee's Trust clients, at the rate of one certificate per client, to at least equal the payment by Licensee to Licensor set forth in Section 2(a) above, and in the further event that Licensee is not in breach of the terms of this Agreement, Licensor agrees to reimburse Licensee for the difference between certificates for legal fees redeemed and such payment made to Licensor by Licensee; provided, however, that all claims by Licensee for such reimbursement shall be filed in writing with Licensor within thirty (30) days following the expiration of the term of this Agreement, and further provided that no reimbursement permitted under the terms of this Section 2(b) shall apply to any renewal or other Attorney License Agreement.

3. GOODWILL. Licensee recognizes the great value of the goodwill associated with the Licensed Property, and acknowledges that the Licensed Property and all rights therein and goodwill pertaining thereto being exclusively to Licensor, and that the Licensed Property has a secondary meaning in the mind of the public.

4. LICENSOR'S TITLE. Licensee agrees that it will not, during the term of this Agreement or thereafter, attack the title or any rights of Licensor in and to the Licensed Property or attack the validity of the license granted hereunder. Licensee agrees to cooperate fully and in good faith with Licensor for the purpose of securing, preserving and protecting Licensor's rights in and to the Licensed Property. It is agreed that nothing contained in this Agreement shall be construed as an assignment or grant to the Licensee of any right, title or interest in or to the Licensed Property, it being understood that all rights relating thereto are reserved by Licensor, except for the license hereunder to Licensee of the right to use and utilize the Licensed Property only as specifically and expressly provided herein.

5. PROTECTION OF LICENSED PROPERTY. Licensee agrees that the services provided in connection with the Licensed Property shall be consistent with the protection and enhancement of the Licensed Property and the goodwill pertaining thereto, and that such services will be provided in a manner consistent with all applicable federal, state and local laws, and that the same shall not reflect adversely upon the good name of Licensor or any of its programs or the Licensed Property. Licensee agrees to notify Licensor, in writing, of any legal action commenced against Licensee that directly and specifically relates to use of any of the Licensed Property within ten (10) days of notice to Licensee of such action.

6. LABELING. Licensee agrees that it will cause to appear on or within all legal documents or other related documents, correspondence, and otherwise (consistent with the terms of this Agreement) the trademark notice "TM" in connection with Licensed Property, and any other notice reasonably desired by Licensor consistent with the terms hereof.

7. NO ASSIGNMENT, TRANSFER OR ENCUMBRANCE. The license granted under this Agreement is personal to Licensee and shall not, without the prior written consent of Licensor, be sold, leased, transferred, or subleased to any third party or assigned, mortgaged, sublicensed or otherwise encumbered by Licensee or by operation of law. Licensee shall not copy, in whole or in part, in printed or other written form, any licensed materials of Licensor, except in connection with and for the purpose of the uses thereof permitted under the terms of this Agreement.

8. TERMINATION.

(a) If Licensee shall violate any of its obligations under the terms of this Agreement, Licensor shall have the right to terminate the license hereby granted upon fourteen (14) days' notice in writing to Licensee, and such termination shall become effective unless Licensee shall completely remedy the violation within such fourteen (14) day notice period and reasonably satisfy Licensor that such violation has been remedied.

(b) Licensor shall have the right, in its reasonable discretion, to revoke the Licensee's right to use the Licensed Property, or any portion thereof, in either a specific or general instance, including, without limitation, a determination by Licensor that the Licensed Property, or any portion thereof, is not being used in a manner that projects a positive image of Licensor.

(c) In the event of any change or other development in the laws or regulations of the United States or affecting any jurisdiction in which the license granted hereunder is effective, which would adversely affect the Licensed Property or its use under the terms hereof, Licensor in its sole discretion shall be permitted to terminate this Agreement and Licensee's use of the Licensed Property, upon written notice to the Licensee. In such event, Licensor shall refund to Licensee, on a pro-rata or greater basis, as determined by Licensor, the sum paid by Licensee to Licensor under Section 2 hereof.

(d) Notwithstanding any provision herein to the contrary, this Agreement and the license hereby granted shall immediately terminate without notice in the event that Licensee breaches in any way the provisions of Section 1(d) hereof. In the event of any such termination, Licensee, in addition to being subject to Licensor's exercise of all other rights and remedies granted hereunder, shall forfeit all License Fees paid by Licensee and reimbursed to Licensee under the provision of Section 2 hereof.

9. EFFECT OF TERMINATION OR EXPIRATION.

(a) Upon and after the expiration or termination of this Agreement, all rights granted to Licensee hereunder shall forthwith revert to Licensor, who shall be free to license others to use the Licensed Property in connection with the provision of services and other uses covered hereby, and Licensee will refrain from further use of the Licensed Property or any further reference to it, directly or indirectly, or anything deemed by Licensor to be similar to the Licensed Property in connection with the provision of Licensee's services, or otherwise.

(b) In case of any termination of this Agreement, use by Licensee of all documents, or otherwise, bearing the Licensed Property, or any portion thereof, will immediately cease and, to the extent feasible, shall be removed from commerce. In addition, Licensee, consistent with the proper practice of his or her profession and the prior rendering of legal services by Licensee to clients, shall immediately return to Licensor all Licensed Property provided to Licensee hereunder.

(c) Termination of this Agreement under the provisions of this Section 9 shall be without prejudice to any rights which Licensor may otherwise have.

(d) The obligations of Licensee as set forth in this Agreement shall survive the termination of this Agreement for any reason.

10. LICENSOR'S REMEDIES. Licensee acknowledges and admits that there is no adequate remedy at law for its failure to comply with the terms of this Agreement and Licensee agrees that in the event of such failure Licensor shall be entitled to seek equitable relief by way of temporary and permanent injunctions and to seek such other and further relief as any court with jurisdiction may deem just and proper. Resort to any remedies referred to herein shall not be construed as a waiver of any other rights and remedies to which Licensor is entitled under this Agreement or otherwise.

11. RELEASE FROM OBLIGATIONS. Licensee shall be released from its obligations hereunder and this Agreement shall terminate in the event that governmental regulations or other causes arising out of a state of national emergency or war or causes beyond the control of the parties render performance impossible and one party so informs the other in writing of such causes and its desire to be so released.

12. INFRINGEMENT. Licensee shall promptly notify Licensor of any unauthorized use of, any attempt to use, and any claim, demand, or suit based upon or arising from the unauthorized use or attempted use of the Licensed Property of which Licensee is aware; provided, however, that the Licensee shall have no obligation to undertake any investigation (or incur any expense) to determine whether any person has used the Licensed Property without Licensor's permission. In the event that Licensor undertakes the defense or prosecution of any litigation relating to any of the Licensed Property, Licensee shall execute any and all documents and do such additional reasonable acts as are necessary to conduct such defense or prosecution, all of which shall be at Licensor's sole cost and expense. In the event that Licensor elects not to undertake the defense or prosecution of any such litigation, then Licensee shall be free to take (but shall not be obligated to take) such action, at Licensee's sole cost and expense, as Licensee believes is necessary to protect Licensee's right to use the Licensed Property and the goodwill associated therewith; provided, however, Licensor shall have the right, but not the obligation, to assist and consult with Licensee in any such action.

13. LICENSEE PROVIDES LEGAL SERVICES; INDEMNITY.

(a) Licensor is not an attorney and does not provide, and is not able to provide, any legal services or advice whatsoever. All matters relating to client legal services and the charges therefor by the Licensee are within the sole and absolute discretion of the Licensee. In addition, it is understood and agreed that this Agreement is in no way to be construed to restrict or define Licensee's right to engage in the active practice of law in accordance with the laws of the jurisdiction(s) in which he or she is licensed to practice law. Licensee acknowledges his or her full responsibility and liability with respect to any acts or failures to act, or otherwise, with respect to legal services related in any way to use of the Licensed Property. Licensee is responsible for all compliance and disclosure related to the rules of professional lawyers for attorneys.

(b) Licensee shall indemnify, defend and hold harmless Licensor and its affiliates, and respective employees, representatives, directors, officers and agents (collectively, the "Indemnities") from and against any and all costs, liabilities and expenses, including, without limitation, interest, penalties, attorney and third party fees, and all amounts paid in the investigation, defense and/or settlement of any claim, demand or suit arising from or relating in any way to the unauthorized or improper practice of law by Licensee related to the Licensed Property.

14. NOTICES. Any notice, demand or communication required, permitted or desired to be given hereunder shall be deemed effectively given when personally delivered, when received by telegraphic or other electronic means (including telecopy and telex) or overnight courier, or five (5) days after being deposited in the United States mail, with postage prepaid thereon, certified mail, return receipt requested, addressed as follows:

LICENSEE:

Attorney at Law
Address:
Fax No.:

LICENSOR:
or to such other address or fax number, and to the attention of such other person or officer as any party may designate in writing.

15. WAIVER AND MODIFICATION. None of the terms of this Agreement can be waived or modified except by an agreement in writing signed by both parties. There are no representations, promises, warranties, covenants, or undertakings regarding the Licensed Property other than those contained in this Agreement, which represents the entire understanding of the parties with respect to the subject matter hereof. The failure of either party hereto to enforce, or the delay by either party in enforcing, any of its rights under this Agreement shall not be deemed a continuing waiver or a modification thereof and either party may, within the time provided by applicable law, commence appropriate legal proceedings to enforce any or all such rights. No person, firm, group or corporation other than Licensee and Licensor shall be deemed to have acquired any rights by reason of anything contained in this Agreement.

16. COMPLIANCE WITH LAWS; SEVERABILITY OF PROVISIONS. Both parties expressly agree that it is not the intention of either party to violate statutory or common law, and that, subject to the provisions of Section 8(c) hereof, if any provision hereof violates any law or is held to be invalid, illegal or unenforceable for any reason and in any respect, such invalidity, illegality or unenforceability shall in no event affect, prejudice or disturb the validity of the remainder of this Agreement which shall be and remain in full force and effect, enforceable in accordance with its terms.

17. HEADINGS. Paragraph headings used in this Agreement are not to be deemed to be part of this Agreement, but are for convenience only and do not affect or limit the meaning of the paragraphs associated therewith.

18. BINDING EFFECT; ASSIGNMENT PROHIBITED. This Agreement shall be binding on, and inure to the benefit of, the parties hereto and their respective successors. This Agreement is personal to the parties hereto, and neither it, not any portion thereof, can be assigned by either party without the prior written consent of the other party, except that Licensor shall be permitted to assign this Agreement without consent to any affiliated entity of Licensor which is subject to the control of Licensor or under common control with Licensor.

19. GOVERNING LAW. This Agreement shall be governed and construed in accordance with the laws of (insert state of venue), without regard to its choice of law rules, and by the laws of the United States of America.

20. COUNTERPARTS. This Agreement may be signed in one or more counterparts, each of which shall be deemed a duplicate original, binding on the parties hereto notwithstanding that the parties are not signatories to the original or same counterpart.

IN WITNESS WHEREOF, the parties have caused this License Agreement to be duly executed as of the day and year first above written.

LICENSOR:
    By:
LICENSEE:
    , Attorney at Law
       Bar License(s) No. (s)

APPENDIX F

ATTORNEY WELCOME LETTER

Dear NAME:

Congratulations! We're pleased to welcome you into the Trust Attorney Network.

Enclosed is a computer diskette containing the Trust Specimen Trust Agreement so that you can prepare the Trust for your clients. A paper copy of the Agreement also is enclosed. You also will find a summary sheet pertaining to the Agreement, which provides additional information for you.

About the Specimen Trust Agreement. The file includes several blank spaces for you to complete. You are welcome to modify the agreement based on the individual needs of your client, but please remember [name trustee] has agreed to serve as Trustee, and at no cost for the life of each client's trust, only if the Specimen Trust Agreement is used with no changes. Exception: you may modify the document to include Co-Grantors.

You also will find enclosed the following:

1. Trust Transmittal Form. Use this form to send to us a completed Specimen Trust Agreement and one-time contribution. If you prefer, you may give this form to your client for them to forward to us instead.

2. $150 Certificate Redemption Form. When you finish preparing each Trust, your client will make full or partial payment to you by submitting a Trust Certificate. Return the Certificate to us along with a completed copy of the Redemption Form, and we will send you $150. Treat these Certificates with care: like traveler's checks, each is numbered and can be replaced if lost. They never expire.

As you know, we are developing a variety of marketing materials to help you promote the Trust to your clients and prospective clients. These materials are near completion and you can expect to receive them within a few weeks. As a member of the Trust Attorney Network, you are eligible for the Trust Co-Op Marketing Program, which entitles you to 50% reimbursement for all expenses you incur when promoting the Trust. (Advance approval of all expenses is required.) Watch for more information about this exciting program soon!

If you have any questions about the Trust, feel free to call us at (insert phone number). We will be happy to assist you.

Regards,

What is claimed is:

1. A computer program product storing computer instructions therein for instructing a computer to perform a first process of at least one of administering and assisting in the administration of resources of a customer for the benefit of a beneficiary via the assistance of a user optionally including an administrator performing a second process, the program product comprising:

a recording medium readable by the computer; and the computer instructions stored on said recording medium instructing the computer to perform the first process, the instructions and the first and second processes including:

(a) receiving, by the user, a request from the customer to administer the resources in accordance with predetermined criteria;

(b) storing, by the computer, customer related data associated with the customer;

(c) at least one of receiving and acknowledging, by the user with the assistance of the computer, receipt of the resources from the customer, and entering the resources into the computer for administration;

(d) appointing, by the user, a trustee to administer and manage the resources;

(e) determining, by at least one of the user and the computer, a predetermined period of time based on an age of the beneficiary at which withdrawals do not incur a tax penalty;

(f) administering, by the trustee with the assistance of the computer, the resources including allocating of the resources in an annuity investment growing tax deferred for at least one of the predetermined period of time and until occurrence of a predetermined event, wherein the predetermined event enables withdrawals without incurring tax penalty;

(g) tracking performance of the resources;

(h) transmitting, by at least one of the trustee and the user with the assistance of the computer, details of the administration of the resources to at least one of the beneficiary and the customer;

(i) requesting, by the beneficiary, to at least one of the trustee and the user to withdraw the resources;

(j) determining, by the at least one of the trustee and the user with the assistance of the computer, whether an initial period of time has expired;

(k) rejecting, by at least one of the user and the trustee with the assistance of the computer, the request of the beneficiary when the initial period of time has expired and when the predetermined period of time has not expired and when the predetermined event has not occurred, and returning to said administering step (f), wherein at least one of the user and the trustee thereby prevents withdrawal of resources so that the resources may grow tax-deferred for at least one of the predetermined period of time and until the occurrence of the predetermined event, ensuring that the resources are not prematurely diverted and preventing the growth of the resources from being compromised;

(l) transmitting, by at least one of the user and the trustee with the assistance of the computer, the resources to the beneficiary when the initial period of time has not expired; and (m) transmitting, by at least one of the user and the trustee with the assistance of the computer, the resources in accordance with the predetermined criteria to the beneficiary when the initial period of time has expired and at least one of when the predetermined period of time has expired and when the predetermined event has occurred.

2. A computer program product storing computer instructions therein for instructing a computer to perform a first process of at least one of administering and assisting in the administration of resources of a customer for the benefit of a beneficiary via the assistance of a user optionally including an administrator performing a second process, the program product comprising:

a recording medium readable by the computer; and the computer instructions stored on said recording medium instructing the computer to perform the first process, the instructions and the first and second processes including:

(a) receiving a request from the customer to administer the resources in accordance with predetermined criteria;

(b) storing customer related data associated with the customer;

(c) at least one of receiving and acknowledging receipt of the resources from the customer, and entering the resources into the computer for administration;

(d) determining a predetermined period of time based on an age of the beneficiary at which withdrawals do not incur a tax penalty;

(e) administering the resources including allocating of the resources in an annuity investment for at least one of the predetermined period of time and until occurrence of a predetermined event;

(f) tracking performance of the resources;

(g) transmitting details of the administration of the resources to at least one of the beneficiary and the customer;

(h) receiving a request to withdraw the resources;

(i) determining whether an initial period of time has expired;

(j) rejecting the request of the beneficiary when the initial period of time has expired and when the predetermined period of time has not expired and when the predetermined event has not occurred, and returning to said administering step (e);

(l) transmitting the resources to the beneficiary when the initial period of time has not expired; and (m) transmitting the resources in accordance with the predetermined criteria to the beneficiary when the initial period of time has expired and when the at least one of predetermined period of time has expired and when the predetermined event has occurred.

3. A computer program product in accordance with claim 2, wherein the predetermined event enables withdrawals without incurring tax penalty.

4. A computer program product in accordance with claim 2, wherein the resources grow tax deferred for the predetermined period of time.

5. A computer program product in accordance with claim 2, wherein the rejecting (j) instruction prevents withdrawal of resources so that the resources may grow tax-deferred for the predetermined period of time or until the occurrence of the predetermined event, ensuring that the resources are not prematurely diverted, and preventing the growth of the resources from being compromised.

6. A computer program product storing computer instructions therein for instructing a computer to perform a first process of at least one of administering and assisting in the administration of resources of a customer for the benefit of a beneficiary via the assistance of a user optionally including an administrator performing a second process, the program product comprising:

a recording medium readable by the computer; and the computer instructions stored on said recording medium instructing the computer to perform the first process, the instructions and the first and second processes including:

(a) receiving, by the user, a request from the customer to administer the resources in accordance with predetermined criteria;

(b) storing, by the computer, customer related data associated with the customer;

(c) determining, by at least one of the user and the computer, a predetermined period of time based on an age of the beneficiary at which withdrawals do not incur a tax penalty;

(d) administering, by the trustee with the assistance of the computer, the resources including allocating of the resources in an annuity investment growing tax deferred for at least one of the predetermined period of time and until occurrence of a predetermined event;

(e) requesting, by the beneficiary, to at least one of the trustee and the user to withdraw the resources;

(f) rejecting, by at least one of the user and the trustee with the assistance of the computer, the request of the beneficiary when the initial period of time has expired and when the predetermined period of time has not expired and when the predetermined event has not occurred, and returning to said administering step (d); and (g) transmitting, by at least one of the user and the trustee with the assistance of the computer, the resources in accordance with the predetermined criteria to the beneficiary when the initial period of time has expired and when the at least one of predetermined period of time has expired and when the predetermined event has occurred.

7. A computer program product in accordance with claim 6, wherein the predetermined event enables withdrawals without incurring tax penalty.

8. A computer program product in accordance with claim 6, wherein the resources grow tax deferred for the predetermined period of time.

9. A computer program product in accordance with claim 6, wherein the rejecting (f) instruction prevents withdrawal of resources so that the resources may grow tax-deferred for the predetermined period of time or until the occurrence of the predetermined event, ensuring that the resources are not prematurely diverted, and preventing the growth of the resources from being compromised.

10. A computer program product storing computer instructions therein for instructing a computer to perform a first process of at least one of administering and assisting in the administration of resources of a customer for the benefit of a beneficiary via the assistance of a user optionally including an administrator performing a second process, the program product comprising:

a recording medium readable by the computer; and the computer instructions stored on said recording medium instructing the computer to perform the first process, the instructions and the first and second processes including:

(a) establishing, by the user, a network of approved providers;

(b) submitting, by the provider to the user, an application and fee to join the network of approved providers;

(c) providing, by the user to the provider, a specimen trust agreement;

(d) receiving, by the user, a request from the customer to administer the resources in accordance with predetermined criteria;

(e) preparing, by the provider for the customer, a trust agreement based on the specimen trust agreement;

(f) storing, by the computer, customer related data associated with the customer;

(g) determining, by at least one of the user and with assistance from the computer, a predetermined period of time based on an age of the beneficiary at which withdrawals do not incur a tax penalty; and (h) administering, by the trustee with assistance from the computer, the resources including allocating of the resources in an annuity investment growing tax deferred for at least one of the predetermined period of time and until occurrence of a predetermined event, and preventing withdrawal of the resources so that the resources may grow tax-deferred for the at least one of predetermined period of time and until the occurrence of the predetermined event, ensuring that the resources are not prematurely diverted, and preventing the tax-free growth of the resources from being compromised.

11. A computer program product storing computer instructions therein for instructing a computer to perform a first process of at least one of administering and assisting in the administration of resources of a customer for the benefit of a beneficiary via the assistance of a user optionally including an administrator performing a second process, the program product comprising:

a recording medium readable by the computer; and the computer instructions stored on said recording medium instructing the computer to perform the process, the instructions and the process including:

(a) establishing, by the user, a network of approved providers;

(b) submitting, by the provider to the user, an application and fee to join the network of approved providers;

(c) providing, by the user to the provider, a specimen trust agreement;

(d) receiving, by the user, a request from the customer to administer the resources in accordance with predetermined criteria;

(e) preparing, by the provider for the customer with assistance from the computer, a trust agreement based on the specimen trust agreement;

(f) storing, by the computer, customer related data associated with the customer;

(g) at least one of receiving and acknowledging, by the user with the assistance of the computer, receipt of the resources from the customer, and entering the resources into the computer for administration;

(h) appointing, by the user, a trustee to administer and manage the resources;

(i) determining, by at least one of the user and the computer, a predetermined period of time based on an age of the beneficiary at which withdrawals do not incur a tax penalty;

(j) administering, by the trustee with the assistance of the computer, the resources including allocating of the resources in an annuity investment growing tax deferred for at least one of the predetermined period of time and until occurrence of a predetermined event, wherein the predetermined event enables withdrawals without incurring tax penalty;

(k) tracking performance of the resources;

(l) transmitting, by at least one of the trustee and user with the assistance of the computer, details of the administration of the resources to at least one of the beneficiary and the customer;

(m) requesting, by the beneficiary, to at least one of the trustee and the user to withdraw the resources;

(n) determining, by at least one of the trustee and the user with the assistance of the computer, whether an initial period of time has expired;

(o) rejecting, by at least one of the user and the trustee with the assistance of the computer, the request of the beneficiary when the initial period of time has expired and when the predetermined period of time has not expired and when the predetermined event has not occurred, and returning to said administering step (f), wherein the user or the trustee thereby prevents withdrawal of resources so that the resources may grow tax-deferred for at least one of the predetermined period of time and until the occurrence of the predetermined event, ensuring that the resources are not prematurely diverted and preventing the growth of the resources from being compromised;

(p) transmitting, by at least one of the user and the trustee with the assistance of the computer, the resources to the beneficiary when the initial period of time has not expired; and (q) transmitting, by at least one of the user and the trustee with the assistance of the computer, the resources in accordance with the predetermined criteria to the beneficiary when the initial period of time has expired and when at least one of the predetermined period of time has expired and when the predetermined event has occurred.

12. A computer program product storing computer instructions therein for instructing a computer to perform a first process of at least one of administering and assisting in the administration of resources of a customer for the benefit of a beneficiary via the assistance of a user optionally including an administrator performing a second process, the program product comprising:

a recording medium readable by the computer; and the computer instructions stored on said recording medium instructing the computer to perform the process, the instructions and the process including:

(a) establishing, by the user, a network of providers;

(b) submitting, by at least one of the providers to the user, an application and an optional fee to join the network of the providers;

(c) providing, by the user to the at least one of the network of providers, a specimen trust agreement;

(d) receiving a request from the customer to administer the resources in accordance with predetermined criteria;

(e) preparing, by the at least one of the network of providers for the customer, a trust agreement based on the specimen trust agreement;

(f) storing customer related data associated with the customer;

(g) at least one of receiving and acknowledging receipt of the resources from the customer, and entering the resources into the computer for administration;

(h) determining a predetermined period of time based on an age of the beneficiary at which withdrawals do not incur a tax penalty;

(i) administering the resources including allocating of the resources in an annuity investment for at least one of the predetermined period of time and until occurrence of a predetermined event;

(j) tracking performance of the resources;

(k) transmitting details of the administration of the resources to at least one of the beneficiary and the customer;

(l) receiving a request to withdraw the resources;

(m) determining whether an initial period of time has expired;

(n) rejecting the request of the beneficiary when at least one of the initial period of time has expired and when the predetermined period of time has not expired, and when the predetermined event has not occurred, and returning to said administering step (d);

(o) transmitting the resources to the beneficiary when the initial period of time has not expired; and (p) transmitting the resources in accordance with the predetermined criteria to the beneficiary when at least one of the predetermined period of time has expired and the predetermined event has occurred.

13. A computer program product storing computer instructions therein for instructing a computer to perform a first process of at least one of administering and assisting in the administration of resources of a customer for the benefit of a beneficiary via the assistance of a user optionally including an administrator performing a second process, the program product comprising:

a recording medium readable by the computer; and the computer instructions stored on said recording medium instructing the computer to perform the process, the instructions and the process including:

(a) establishing, by the user, a network of approved providers;

(b) submitting, by at least one of the approved providers the user, an application and an optional fee to join the network of approved providers;

(c) providing, by the user to the at least one of the approved providers, a specimen trust agreement;

(d) receiving, by the user, a request from the customer to administer the resources in accordance with predetermined criteria;

(e) preparing, by the at least one of the approved service providers for the customer, a trust agreement based on the specimen trust agreement;

(f) storing, by the computer, customer related data associated with the customer;

(g) determining, by the user or the computer, a predetermined period of time based on an age of the beneficiary at which withdrawals do not incur a tax penalty;

(h) administering, by the trustee with the assistance of the computer, the resources including allocating of the resources in an annuity investment growing tax deferred for at least one of the predetermined period of time and until occurrence of a predetermined event;

(i) requesting, by at least one of the beneficiary, to the trustee and the user to withdraw the resources;

(j) rejecting, by at least one of the user and the trustee with the assistance of the computer, the request of the beneficiary when the initial period of time has expired and when the predetermined period of time has not expired and when the predetermined event has not occurred, and returning to said administering step (d); and (k) transmitting, by at least one of the user and the trustee with the assistance of the computer, the resources in accordance with the predetermined criteria to the beneficiary when the initial period of time has expired and when at least one of the predetermined period of time has expired and when the predetermined event has occurred.

14. A computer implemented and user assisted process instructing and implemented by a computer to perform a first process of at least one of administering and assisting in a program for the administration of resources of a customer for the benefit of a beneficiary via the assistance of a user performing a second process, the first and second processes comprising at least one of the sequential, non-sequential and sequence independent steps of:

(a) establishing, by a first company, a network of a plurality of approved providers;

(b) submitting, by the at least one provider to the first company, an application and an optional fee to join the network of approved providers;

(c) providing, by the first company to the at least one provider, a specimen trust agreement;

(d) delivering, by the first company, an information kit concerning the program, an application for the program, and information regarding a second company administering an annuity contract to a potential customer;

(e) delivering, by the potential customer to the first company, including the application, an initial investment, and an optional fee for the first company, the application including:

1) an optionally designated provider to be used, and when no optionally designated provider is provided, the first company will refer the potential customer to the at least one provider in the network, 2) the annuity contract the potential customer wants to use, and when no annuity contract is designated, the second company is used, 3) an investment advisor to be used for administering an investment application, and when no investment advisor is designated, the first company retains a third company to provide financial services on behalf of the potential customer, 4) a trust company to be used for administering a trust application, and when no trust company is designated, a fourth company is used, and an optional trust fee which is optionally waivable when the second company is used;

(f) performing, by the first company, the following:

1) forwarding the application to the at least one provider to initiate at least one of the administering and the assisting in the program for the administration of the resources of the potential customer for the benefit of the beneficiary, 2) optionally forwarding to the potential customer a certificate to compensate the at least one provider for an optional provider fee to be subsequently presented to the first company by the at least one provider for reimbursement thereby, 3) optionally preparing the investment and trust applications when the second company and the third company and the fourth company are used by the potential customer, 4) optionally retaining the resources for the beneficiary in escrow until notified by the at least one provider that the trust is in place;

(g) providing, by the at least one provider, the first company with the following:

1) transmitting a copy of the trust application executed by the potential customer, 2) transmitting a copy of the investment application, executed by the potential customer, and optionally any additional authorizations, and 3) instructing the first company to proceed with the investment of the resources as directed by the potential customer, (h) performing, by the first company, the following:

(1) forwarding the executed trust and investment applications, the application and the specimen trust agreement to the at least one provider, with instructions to open a customer account for the potential customer, and (2) forwarding one or more confirmations to the potential client that the customer account was successfully opened, (i) storing, by the computer, customer related data associated with the potential customer;

(j) at least one of receiving and acknowledging, by the at least one provider with the assistance of the computer, receipt of the resources from the potential customer, and entering the resources into the computer for administration thereof;

(k) tracking performance of the resources;

(l) transmitting, by the at least one provider, first company, second company, third company and fourth company, with the assistance of the computer, details of the administration of the resources to at least one of the beneficiary and the potential customer;

(m) disbursing, by the at least one provider, first company, second company, third company and fourth company, with the assistance of the computer, the resources in accordance with the predetermined criteria to the beneficiary.

15. A computer implemented process instructing and implemented by a computer to perform a process of administering or assisting in a program for the administration of resources of a customer for the benefit of a beneficiary, according to claim 14, wherein the at least one provider, the first company, the second company, the third company, and the fourth company comprise a unitary company, different subsidiaries of a same company, a combination of independent companies or different independent companies.

16. A computer implementing a first process of at least one of administering assisting in a program for the administration of resources of a customer for the benefit of a beneficiary via the assistance of a user performing a second process, the computer comprising:

(a) means for establishing, by a first company, a network of a plurality of approved providers;

(b) means for submitting, by the at least one provider to the first company, an application and an optional fee to join the network of approved providers;

(c) means for providing, by the first company to the at least one provider, a specimen trust agreement;

(d) means for delivering, by the first company, an information kit concerning the program, an application for the program, and information regarding a second company administering an annuity contract to a potential customer;

(e) means for delivering, by the potential customer to the first company, including the application, an initial investment, and an optional fee for the first company, the application including:
1) an optionally designated provider to be used, and when no optionally designated provider is provided, the first company will refer the potential customer to the at least one provider in the network,
2) the annuity contract the potential customer wants to use, and when no annuity contract is designated, the second company is used,
3) an investment advisor to be used for administering an investment application, and when no investment advisor is designated, the first company retains a third company to provide financial services on behalf of the potential customer,
4) a trust company to be used for administering a trust application, and when no trust company is designated, a fourth company is used, and an optional trust fee which is optionally waivable when the second company is used;

(f) means for performing, by the first company, the following:
1) forwarding the application to the at least one provider to initiate the at least one of administering and the assisting in the program for the administration of the resources of the potential customer for the benefit of the beneficiary,
2) optionally forwarding to the potential customer a certificate to compensate the at least one provider for an optional provider fee to be subsequently presented to the first company by the at least one provider for reimbursement thereby,
3) optionally preparing the investment and trust applications when the second company and the third company and the fourth company are used by the potential customer,
4) optionally retaining the resources for the beneficiary in escrow until notified by the at least one provider that the trust is in place;

(g) means for providing, by the at least one provider, the first company with the following:
1) transmitting a copy of the trust application executed by the potential customer,
2) transmitting a copy of the investment application, executed by the potential customer, and optionally any additional authorizations, and
3) instructing the first company to proceed with the investment of the resources as directed by the potential customer, (h) means for performing, by the first company, the following:
(1) forwarding the executed trust and investment applications, the application and the specimen trust agreement to the at least one provider, with instructions to open a customer account for the potential customer, and
(2) forwarding one or more confirmations to the potential client that the customer account was successfully opened, (i) means for storing, by the computer, customer related data associated with the potential customer;

(j) means for at least one of receiving and acknowledging, by the at least one provider with the assistance of the computer, receipt of the resources from the potential customer, and entering the resources into the computer for administration thereof;

(k) means for tracking performance of the resources;

(l) means for transmitting, by the at least one provider, first company, second company, third company and fourth company, with the assistance of the computer, details of the administration of the resources to at least one of the beneficiary and the potential customer; and (m) means for disbursing, by the at least one provider, at least one of first company, second company, third company and fourth company, with the assistance of the computer, the resources in accordance with the predetermined criteria to the beneficiary.

17. A computer implemented and user assisted process instructing and implemented by a computer to perform a first process of at least one of administering and assisting in a program for the administration of resources of a customer for the benefit of a beneficiary via the assistance of a user performing a second process, the first and second processes comprising at least one of the sequential, non-sequential and sequence independent steps of:

(a) establishing, by a first company, a network of a plurality of approved providers;

(b) submitting, by the at least one provider to the first company, an application and an optional fee to join the network of approved providers;

(c) providing, by the first company to the at least one provider, a specimen trust agreement;

(d) delivering, by the first company, an information kit concerning the program, an application for the program, and information regarding a second company administering an annuity contract to a potential customer;

(e) delivering, by the potential customer to the first company, including the application, an initial investment, and an optional fee for the first company, the application including:
1) a designated provider that may be optionally used, and when no designated provider is provided, the first company will refer the potential customer to the at least one provider in the network,
2) the annuity contract the potential customer wants to use, and when no annuity contract is designated, the second company is used,
3) an investment advisor to be used for administering an investment application, and when no investment advisor is designated, the first company retains a third company to provide financial services on behalf of the potential customer,
4) a trust company to be used for administering a trust application, and when no trust company is designated, a fourth company is used, and an optional trust fee which is optionally waivable when the second company is used;

(f) performing, by the first company, the following:
1) forwarding the application to the at least one provider to initiate at least one of the administering and the assisting in the program for the administration of the resources of the potential customer for the benefit of the beneficiary,
2) forwarding to the potential customer a certificate to compensate the at least one provider for an optional provider fee to be subsequently presented to the first company by the at least one provider for reimbursement thereby,
3) preparing the investment and trust applications when the second company and the third company and the fourth company are used by the potential customer, 4) retaining the resources for the beneficiary in escrow until notified by the at least one provider that the trust is in place;

(g) providing, by the at least one provider, the first company with the following:
 1) transmitting a copy of the trust application executed by the potential customer,
 2) transmitting a copy of the investment application, executed by the potential customer, and any additional authorizations, and
 3) instructing the first company to proceed with the investment of the resources as directed by the potential customer, (h) performing, by the first company, the following:
 (1) forwarding the executed trust and investment applications, the application and the specimen trust agreement to the at least one provider, with instructions to open a customer account for the potential customer, and
 (2) forwarding one or more confirmations to the potential client that the customer account was successfully opened, (i) storing, by the computer, customer related data associated with the potential customer;

(j) at least one of receiving acknowledging, by the at least one provider with the assistance of the computer, receipt of the resources from the potential customer, and entering the resources into the computer for administration thereof;

(k) tracking performance of the resources;

(l) transmitting, by the at least one provider, at least one of first company, second company, third company and fourth company, with the assistance of the computer, details of the administration of the resources to at least one of the beneficiary and the potential customer;

(m) disbursing, by the at least one provider, at least one of first company, second company, third company and fourth company, with the assistance of the computer, the resources in accordance with the predetermined criteria to the beneficiary.

18. A computer implemented and user assisted process instructing and implemented by a computer to perform a first process of at least one of administering and assisting in a program for the administration of resources of a customer for the benefit of a beneficiary via the assistance of a user performing a second process, the first and second processes comprising at least one of the sequential, non-sequential and sequence independent steps of:

(a) establishing, by a first company, a network of a plurality of approved providers;

(b) submitting, by the at least one provider to the first company, an application and an optional fee to join the network of approved providers;

(c) providing, by the first company to the at least one provider, a specimen trust agreement;

(d) delivering, by the first company, an information kit concerning the program, an application for the program, and information regarding a second company administering an annuity contract to a potential customer;

(e) delivering, by the potential customer to the first company, including the application, an initial investment, and an optional fee for the first company, the application including:

(f) performing, by the first company, the following:
 1) forwarding the application to the at least one provider to initiate at least one of the administering and the assisting in the program for the administration of the resources of the potential customer for the benefit of the beneficiary,
 2) preparing the investment and trust applications when the second company and the third company and the fourth company are used by the potential customer, (g) providing, by the at least one provider, the first company with the following:
 1) transmitting a copy of the trust application executed by the potential customer,
 2) transmitting a copy of the investment application, executed by the potential customer, and any additional authorizations, and
 3) instructing the first company to proceed with the investment of the resources as directed by the potential customer, (h) forwarding, by the first company, the executed trust and investment applications, the application and the specimen trust agreement to the at least one provider, with instructions to open a customer account for the potential customer;

(i) storing, by the computer, customer related data associated with the potential customer;

(j) at least one of receiving and acknowledging, by the at least one provider with the assistance of the computer, receipt of the resources from the potential customer, and entering the resources into the computer for administration thereof;

(k) tracking performance of the resources;

(l) transmitting, by the at least one provider, at least one of first company, second company, third company and fourth company, with the assistance of the computer, details of the administration of the resources to at least one of the beneficiary and the potential customer;

(m) disbursing, by the at least one provider, at least one of first company, second company, third company and fourth company, with the assistance of the computer, the resources in accordance with the predetermined criteria to the beneficiary.

19. A computer implemented and user assisted process instructing and implemented by a computer to perform a first process of at least one of administering and assisting in a program for the administration of resources of a customer for the benefit of a beneficiary via the assistance of a user performing a second process, the first and second processes comprising at least one of the sequential, non-sequential and sequence independent steps of:

(a) establishing, by a first company, a network of a plurality of approved providers;

(b) submitting, by the at least one provider to the first company, an application and an optional fee to join the network of approved providers;

(c) providing, by the first company to the at least one provider, a specimen trust agreement;

(d) delivering, by the first company, an information kit concerning the program, an application for the program, and information regarding a second company administering an annuity contract to a potential customer;

(e) delivering, by the potential customer to the first company, including the application, an initial investment, and an optional fee for the first company, the application including:

(f) performing, by the first company, the following:
1) forwarding the application to the at least one provider to initiate at least one of the administering and the assisting in the program for the administration of the resources of the potential customer for the benefit of the beneficiary,
2) preparing the investment and trust applications when the second company and the third company and the fourth company are used by the potential customer, (g) providing, by the at least one provider, the first company with the following:
1) transmitting a copy of the trust application executed by the potential customer,
2) transmitting a copy of the investment application, executed by the potential customer, and any additional authorizations, and
3) instructing the first company to proceed with the investment of the resources as directed by the potential customer; and (h) forwarding, by the first company, the executed trust and investment applications, the application and the specimen trust agreement to the at least one provider, with instructions to open a customer account for the potential customer.

* * * * *